(12) United States Patent
Sasaki

(10) Patent No.: US 10,992,942 B2
(45) Date of Patent: Apr. 27, 2021

(54) CODING METHOD, DECODING METHOD, AND CODING DEVICE

(71) Applicant: SOCIONEXT INC., Kanagawa (JP)

(72) Inventor: Eiichi Sasaki, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 0 days.

(21) Appl. No.: 16/856,938

(22) Filed: Apr. 23, 2020

(65) Prior Publication Data

US 2020/0252632 A1 Aug. 6, 2020

Related U.S. Application Data

(63) Continuation of application No. PCT/JP2017/038430, filed on Oct. 25, 2017.

(51) Int. Cl.
*H04N 19/176* (2014.01)
*H04N 19/117* (2014.01)
*H04N 19/157* (2014.01)
*H04N 19/167* (2014.01)
*H04N 19/182* (2014.01)

(52) U.S. Cl.
CPC ......... *H04N 19/176* (2014.11); *H04N 19/117* (2014.11); *H04N 19/157* (2014.11); *H04N 19/167* (2014.11); *H04N 19/182* (2014.11)

(58) Field of Classification Search
None
See application file for complete search history.

(56) References Cited

U.S. PATENT DOCUMENTS

| 2014/0301480 A1 | 10/2014 | Francois et al. |
| 2014/0369429 A1* | 12/2014 | Laroche ............... H04N 19/82 375/240.29 |
| 2015/0110410 A1 | 4/2015 | Sakamoto |
| 2016/0286213 A1 | 9/2016 | Lee et al. |

(Continued)

FOREIGN PATENT DOCUMENTS

| JP | 2014-534762 A | 12/2014 |
| JP | 2015-080115 A | 4/2015 |

OTHER PUBLICATIONS

ITU-T H.265, Telecommunication Standardization Sector of ITU, Series H: Audiovisual and Multimedia Systems, Infrastructure of audiovisual services—Coding of moving video, High efficiency video coding, International Telecommunication Union, Dec. 2016.

(Continued)

*Primary Examiner* — Lindsay J Uhl
(74) *Attorney, Agent, or Firm* — McDermott Will and Emery LLP

(57) ABSTRACT

A coding method by a computer is disclosed. The computer divides a block of a coding unit into a plurality of sub-blocks. The computer determines band positions of at least two first sub-blocks among the plurality of sub-blocks. The computer calculates among the plurality of sub-blocks, band positions of second sub-blocks other than the at least two first sub-blocks based on a positional relationship of the second sub-blocks with respect to the at least two first sub-blocks and the determined band positions for the at least two first sub-blocks in the block of the coding unit. A band offset is conducted for each of the sub-blocks by using the band positions determined or calculated for the at least two first sub-blocks and the second sub-blocks.

16 Claims, 35 Drawing Sheets

(56) References Cited

U.S. PATENT DOCUMENTS

2017/0099492 A1  4/2017 Byun
2020/0029080 A1* 1/2020 Kim ...................... H04N 19/82

OTHER PUBLICATIONS

Gary J. Sullivan et al., "Overview of the High Efficiency Video Coding (HEVC) Standard", IEEE Transactions on Circuits and Systems for Video Technology, vol. 22, No. 12, Dec. 2012, pp. 1649-1668.
Il-Koo Kim et al., JCTVC-L1002 v3, "High Efficiency Video Coding (HEVC) Test Model 10 (HM10) Encoder Description", Joint Collaborative Team on Video Coding (JCT-VC) of ITU-T SG16 WP3 and ISO/IEC JTC1/SC29/Wg11, Jan. 14-23, 2013, Geneva, CH.
Ya Chen et al., "Optimization of Sample Adaptive Band Offset in HEVC", 2017 Data Compression Conference, Apr. 2017, p. 434; cited in ISR for PCT/JP2017/038430.
Chih-Ming Fu et al., "Sample Adaptive Offset in the HEVC Standard", IEEE Transactions on Circuits and Systems for Video Technology, Dec. 2012, vol. 22, No. 12, pp. 1755-1764; cited in ISR for PCT/JP2017/038430.
International Search Report and Written Opinion issued in International Application No. PCT/JP2017/038430 dated Dec. 19, 2017; with partial English translation.

* cited by examiner

FIG.7
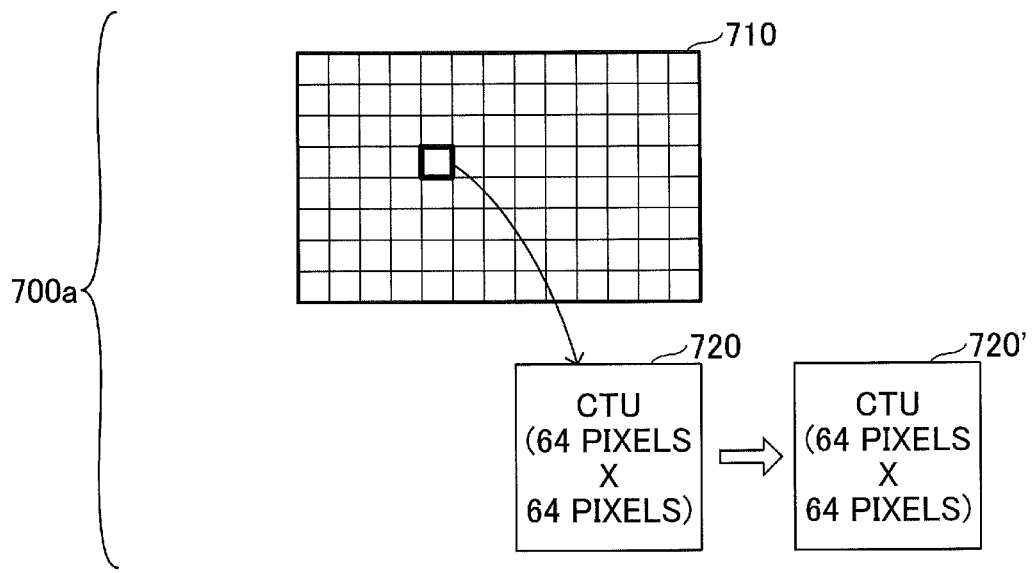
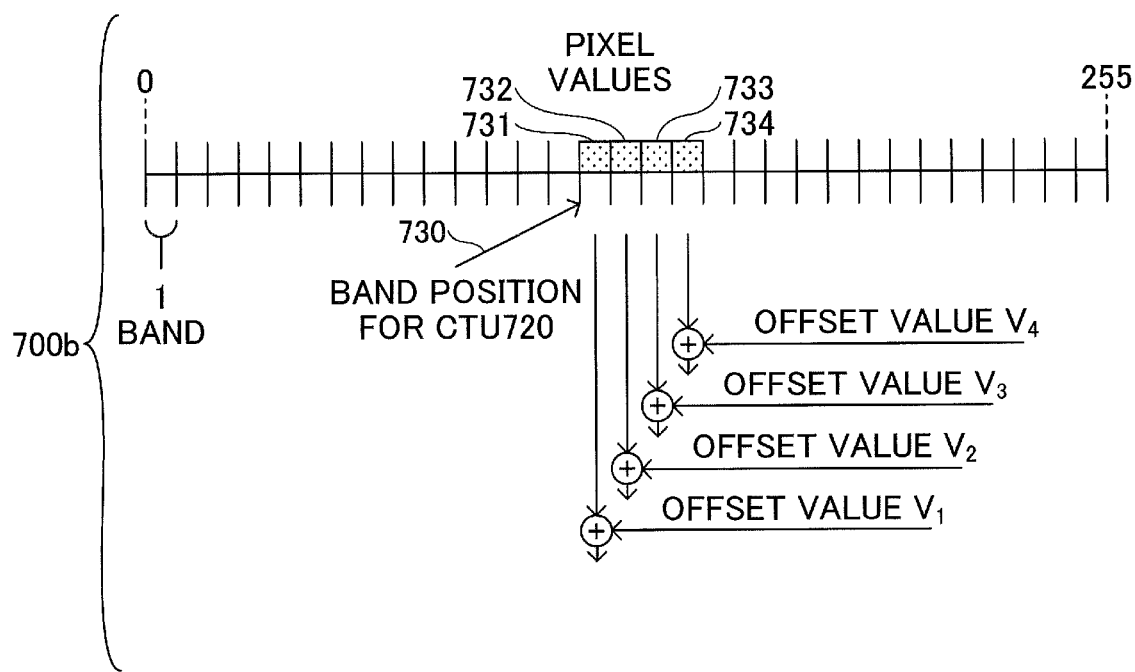

CODING METHOD, DECODING METHOD, AND CODING DEVICE

CROSS-REFERENCE TO RELATED APPLICATION

This application is a continuation application of International application PCT/JP2017/038430 filed on Oct. 25, 2017 and designated the U.S., the entire contents of which are incorporated herein by reference.

FIELD

The present invention relates to a coding method, a decoding method, and a coding device.

BACKGROUND

As an international standard for compression encoding of moving picture signals, H.265/HEVC is known. In H.265/HEVC, a Sample Adaptive Offset (SAO) is introduced as a loop filter technique for suppressing the deterioration of image quality at the time of compression encoding.

The sample adaptive offset introduced by H.265/HEVC includes an edge offset and a band offset, and either the edge offset or the band offset is able to be applied at the time of compression encoding. The band offset is regarded as a process that divides a gradation of pixel values into 32 bands, selects four bands having a successive gradation from among these bands, and then adds (or deducts) a predetermined offset value to pixel values belonging to the four bands.

By applying such a band offset, it is possible to adjust the pixel value for a specific successive gradation, and thus it is possible to reduce error in a compression encoding of an image.

Patent Document 1: Japanese National Publication of International Patent Application No. 2014-534762

SUMMARY

According to one aspect of an embodiment, a coding method by a computer includes dividing a block of a coding unit into a plurality of sub-blocks; determining band positions of at least two first sub-blocks among the plurality of sub-blocks; and calculating, among the plurality of sub-blocks, band positions of second sub-blocks other than the at least two first sub-blocks based on a positional relationship of the second sub-blocks with respect to the at least two first sub-blocks and the determined band positions for the at least two first sub-blocks in the block of the coding unit, wherein a band offset is conducted for each of the sub-blocks by using the band positions determined or calculated for the at least two first sub-blocks and the second sub-blocks.

The aforementioned steps may be performed by function components realizing respective steps, a method by a computer to perform a process to realize the respective steps, and a computer-readable recording medium storing a program, which causes the computer to perform the process to realize the respective steps.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

BRIEF DESCRIPTION OF DRAWINGS

FIG. 7 is a diagram for explaining a process content of a band offset process in the general encoder;

DESCRIPTION OF EMBODIMENT

Figure 1:
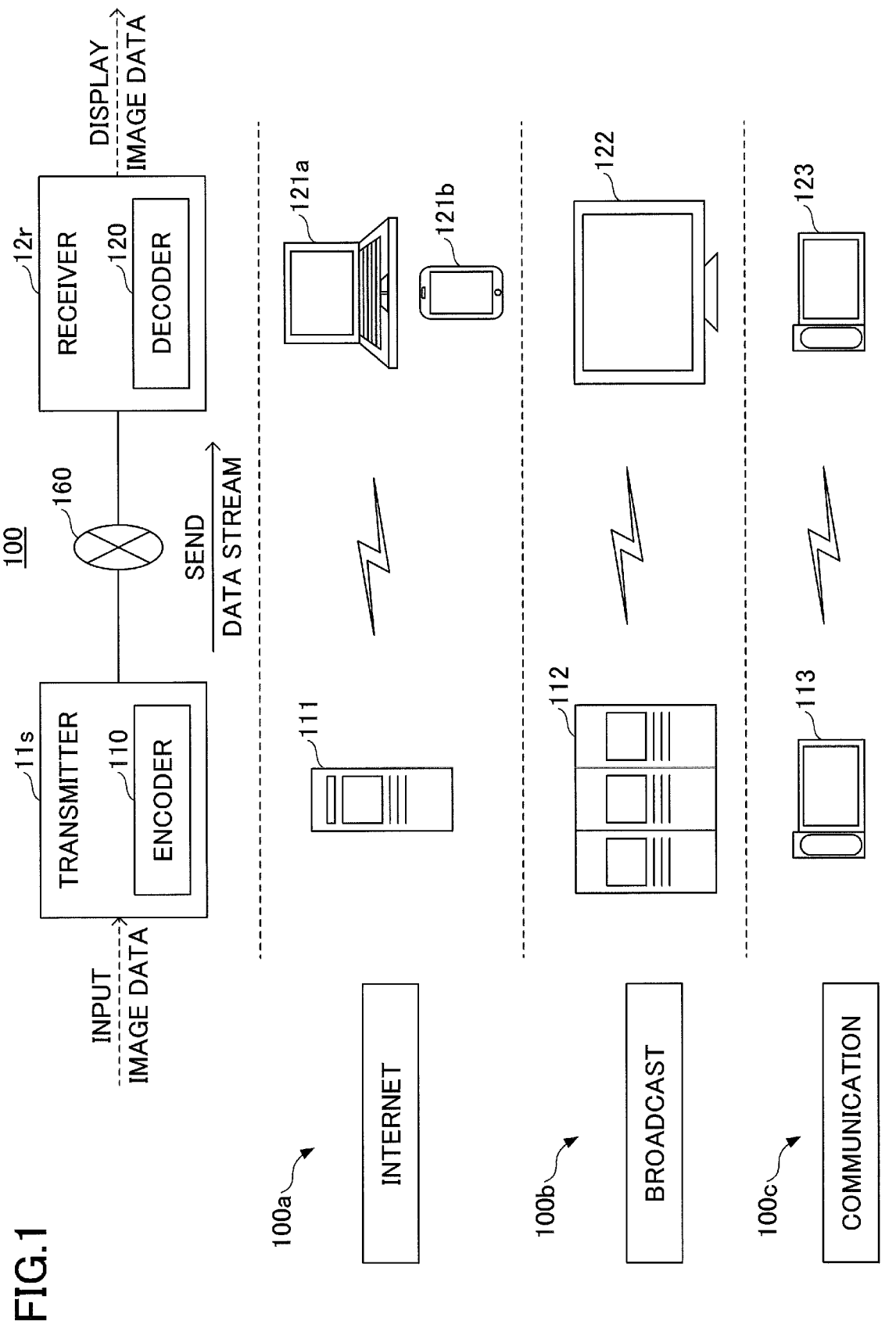
FIG. 1 is a diagram illustrating an application example of an encoder and a decoder.

In the conventional band offset, selection of four consecutive bands and addition (or subtraction) of a predetermined offset value are performed for each CTU (Coding Tree Unit), which is a block of a coding unit. For this reason, when the block size of the CTU is large, there is a problem that an effect of reducing deterioration of an image quality during a compression encoding (an effect of improving the image quality) is limited.

In addition, in a next-generation international standard for the compression coding, it is expected that a CTU having a block size larger than a CTU block size in H.265/HEVC will be defined, and such a problem is expected to become more prominent.

An embodiment will be described below for a purpose of improving effect of image quality improvement in a band offset.

Hereinafter, each embodiment will be described with reference to the accompanying drawings. In this specification and the drawings, components having substantially the same function and configuration are denoted by the same reference numerals, and redundant description is omitted.

First Embodiment

1. Application Examples of Encoder and Decoder

First, an application example of an encoder (coding device) and a decoder (decoding device) will be described.

FIG. 1 is a diagram illustrating an application example of the encoder and the decoder.

As illustrated in FIG. 1, the image processing system 100 may be formed by arranging an encoder 110 in a transmitter 11s and a decoder 120 in a receiver 12r and connecting them via a network 160.

In the image processing system 100, the encoder 110 arranged in the transmitter 11s generates a data stream by encoding the input image data. Moreover, the transmitter 11s transmits the generated data stream to the receiver 12r via the network 160.

The receiver 12r receives the data stream. In addition, the decoder 120 arranged in the receiver 12r generates and displays image data by decoding the data stream.

By forming the image processing system 100, the encoder 110 and the decoder 120 may be applied to various technical fields, for example, the technical fields of the Internet, broadcasting, and communications.

An application example 100a illustrates an example in which the image processing system 100 is applied to the Internet technical field. In the case of the application example 100a, the data stream transmitted from a server apparatus 111, which is an example of the transmitter 11s, is received and displayed by a personal computer 121a, a smart terminal 121b, or the like, which is an example of the receiver 12r. Thus, the user of the personal computer 121a or the smart terminal 121b is able to view the moving image data held by the server apparatus 111 via the Internet.

An application example 100b illustrates an example, in which the image processing system 100 is applied to the broadcasting technical field. In a case of the application example 100b, the data stream transmitted from a broadcast transmitter 112 which is an example of the transmitter 11s is received and displayed by a television 122, which is an example of the receiver 12r. Hence, for example, a user of the television 122 is able to view a broadcast content transmitted by the broadcast transmitter 112.

An application example 100c illustrates an example, in which the image processing system 100 is applied to a communications technical field. In a case of the application example 100c, the data stream transmitted from a videophone 113 as an example of the transmitter 11s is received and displayed by a videophone 123 as an example of the receiver 12r.

By this manner, a user of the videophone 123 is able to talk while looking at the face of another party.

Figure 2:
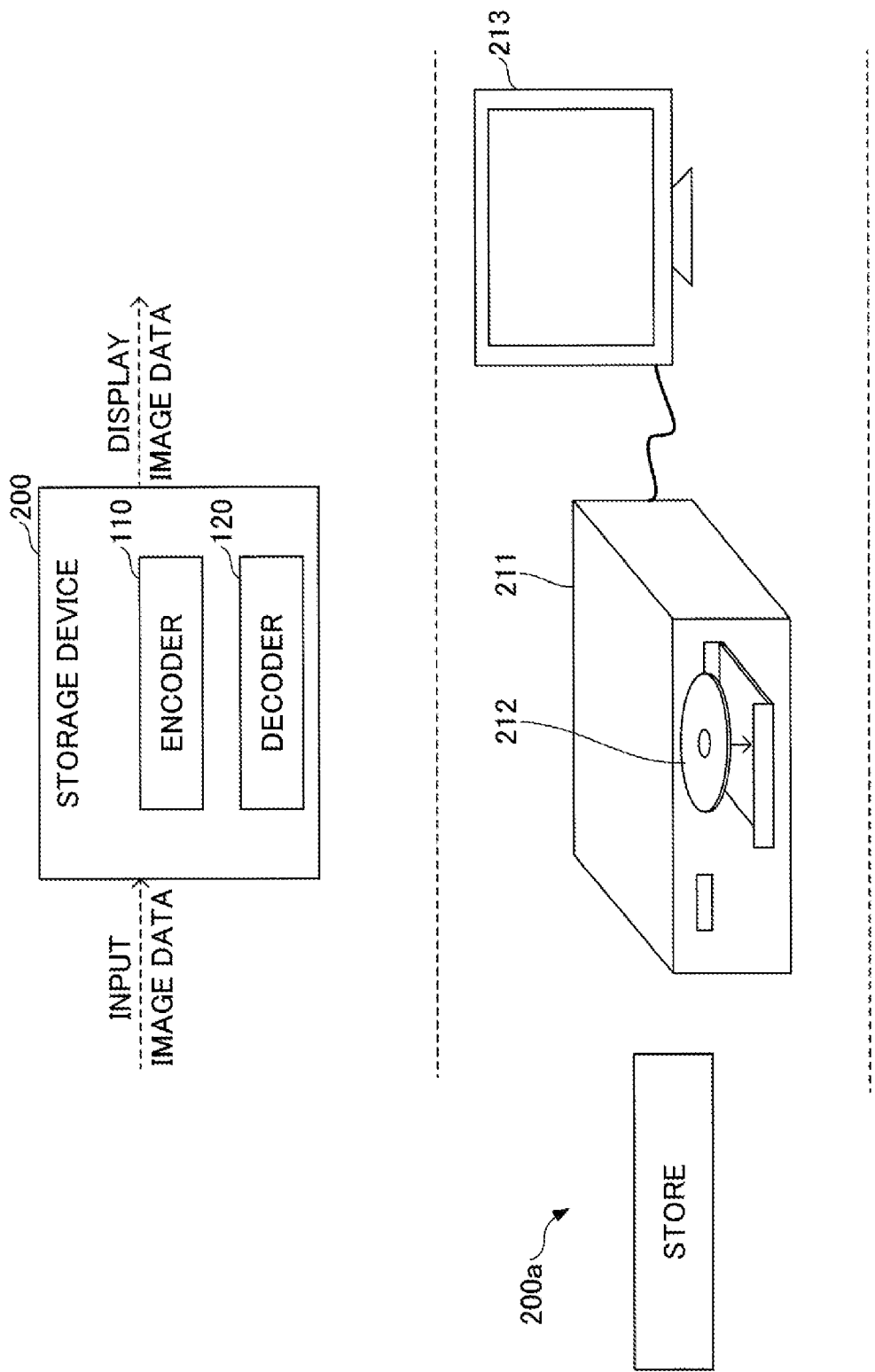
FIG. 2 is a diagram illustrating another application example of the encoder and the decoder.

FIG. 2 is a diagram illustrating another application example of the encoder and the decoder. As illustrated in FIG. 2, the storage device 200 is formed by integrally arranging the encoder 110 and the decoder 120.

In the storage device 200, the encoder 110 encodes input image data, and stores a generated data stream in a recording medium. In addition, the storage device 200 generates and displays image data by the decoder 120 decoding the data stream stored in the recording medium.

By forming the storage device 200, the encoder 110 and the decoder 120 may be applied to, for example, the storage field. An application example 200a illustrates an example in which the storage device 200 is applied to the storage field. In a case of the application example 200a, the video recorder 211, which is an example of the storage device 200, stores the data stream generated by the built-in encoder 110 encoding the image data in a recording medium 212. The video recorder 211 displays on a monitor 213 image data generated by the built-in decoder 120 decoding the data stream read from the recording medium 212. Thus, the user of the video recorder 211 is able to efficiently accumulate acquired moving image data.

<2. Hardware Configuration of Encoder and Decoder>

Next, a hardware configuration of the encoder and the decoder will be described. Because the encoder 110 and the decoder 120 have the same hardware configuration, the hardware configuration of the encoder 110 will be described here.

Figure 3:
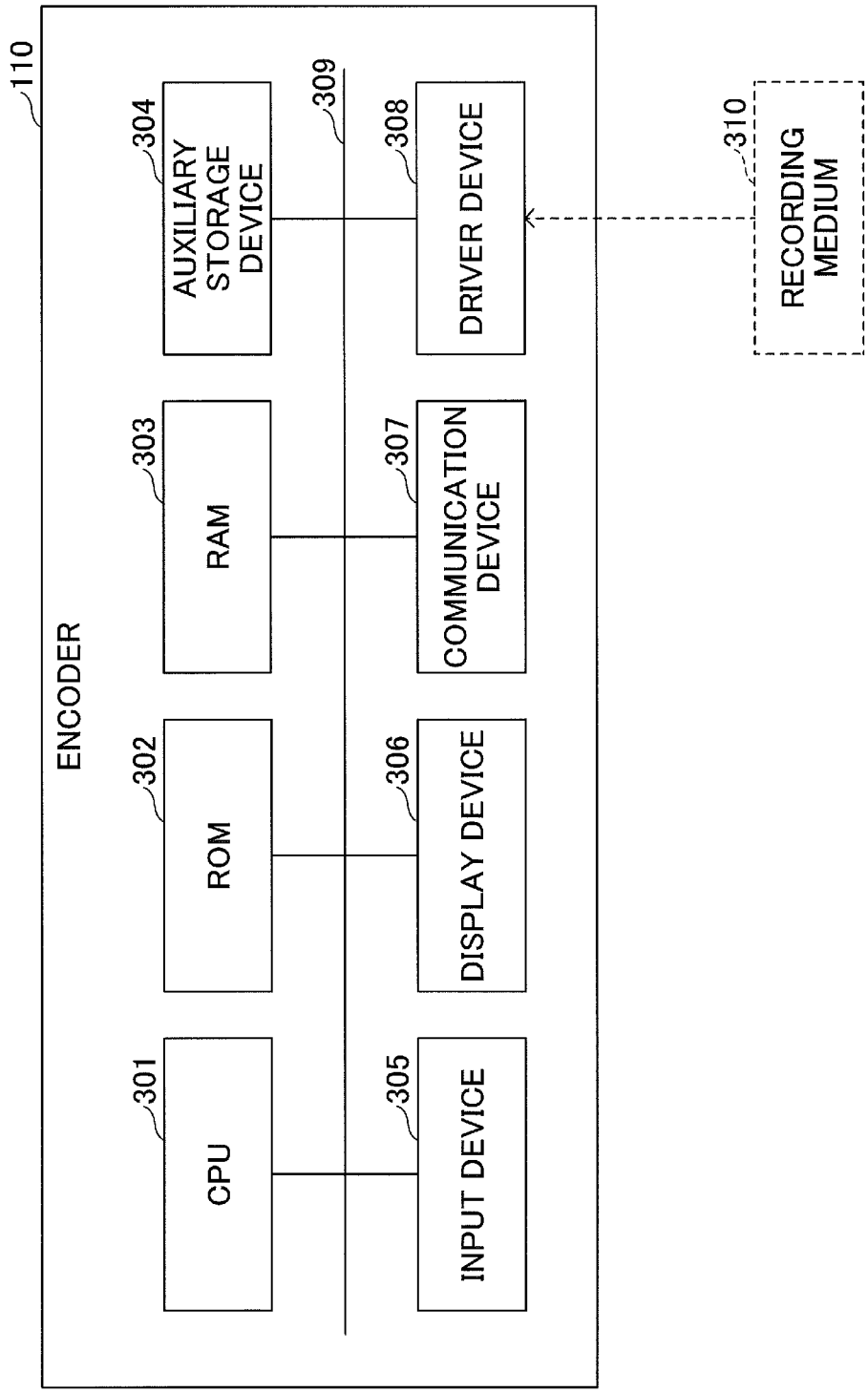
FIG. 3 is a diagram illustrating an example of a hardware configuration of the encoder.

FIG. 3 is a diagram illustrating an example of the hardware configuration of the encoder. As illustrated in FIG. 3, the encoder 110 includes a CPU (Central process Unit) 301 as a processor, a ROM (Read Only Memory) 302, and a RAM (Random Access Memory) 303. The CPU 301, the ROM 302, and the RAM 303 form a so-called computer. The encoder 110 includes an auxiliary storage device 304, an input device 305, a display device 306, a connection device 307, and a driver device 308. The hardware of the encoder 110 is mutually connected via a bus 309.

The CPU 301 executes various programs (for example, an encoding program) installed in the auxiliary storage device 304.

The ROM 302 is a nonvolatile memory. The ROM 302 functions as a main storage device that stores various programs, data, and the like necessary for the CPU 301 to execute various programs installed in the auxiliary storage device 304. Specifically, the ROM 302 stores a boot program such as a BIOS (Basic Input/Output System) and an EFI (Extensible Firmware Interface).

The RAM 303 is a volatile memory such as a dynamic random access memory (DRAM) and a static random access memory (SRAM). The RAM 303 functions as a main storage device that provides a work area developed when the CPU 301 executes various programs installed in the auxiliary storage device 304.

The auxiliary storage device 304 is an auxiliary storage device that stores installed various programs and information used when executing the various programs.

The input device 305 is an input device used to input various instructions to the encoder 110.

The display device 306 is a display device that displays internal information of the encoder 110. The connection device 307 is a communication device for connecting the encoder 110 to the decoder 120 and performing communication.

The driver device 308 is a device for setting a computer-readable recording medium 310. Here, the recording medium 310 includes a medium for optically, electrically, or magnetically recording information, such as a CD-ROM, a flexible disk, and a magneto-optical disk. Alternatively, the recording medium 310 may include a semiconductor memory that electrically records information, such as a ROM and a flash memory.

The various programs to be installed in the auxiliary storage device 304 may be installed, for example, by setting the recording medium 310 in the driver device 308 and reading out the various programs recorded in the recording medium 310 by the driver device 308.

Alternatively, various programs installed in the auxiliary storage device 304 may be installed by being downloaded from the network 160 via the connection device 307.

Note that the hardware configuration illustrated in FIG. 3 is merely an example, and some of the hardware illustrated in FIG. 3 may be excluded or replaced with other hardware depending on the application.

<3. Functional Configuration of Encoder>

Next, a functional configuration of the encoder 110 realized by executing the encoding program will be described.

Figure 4:
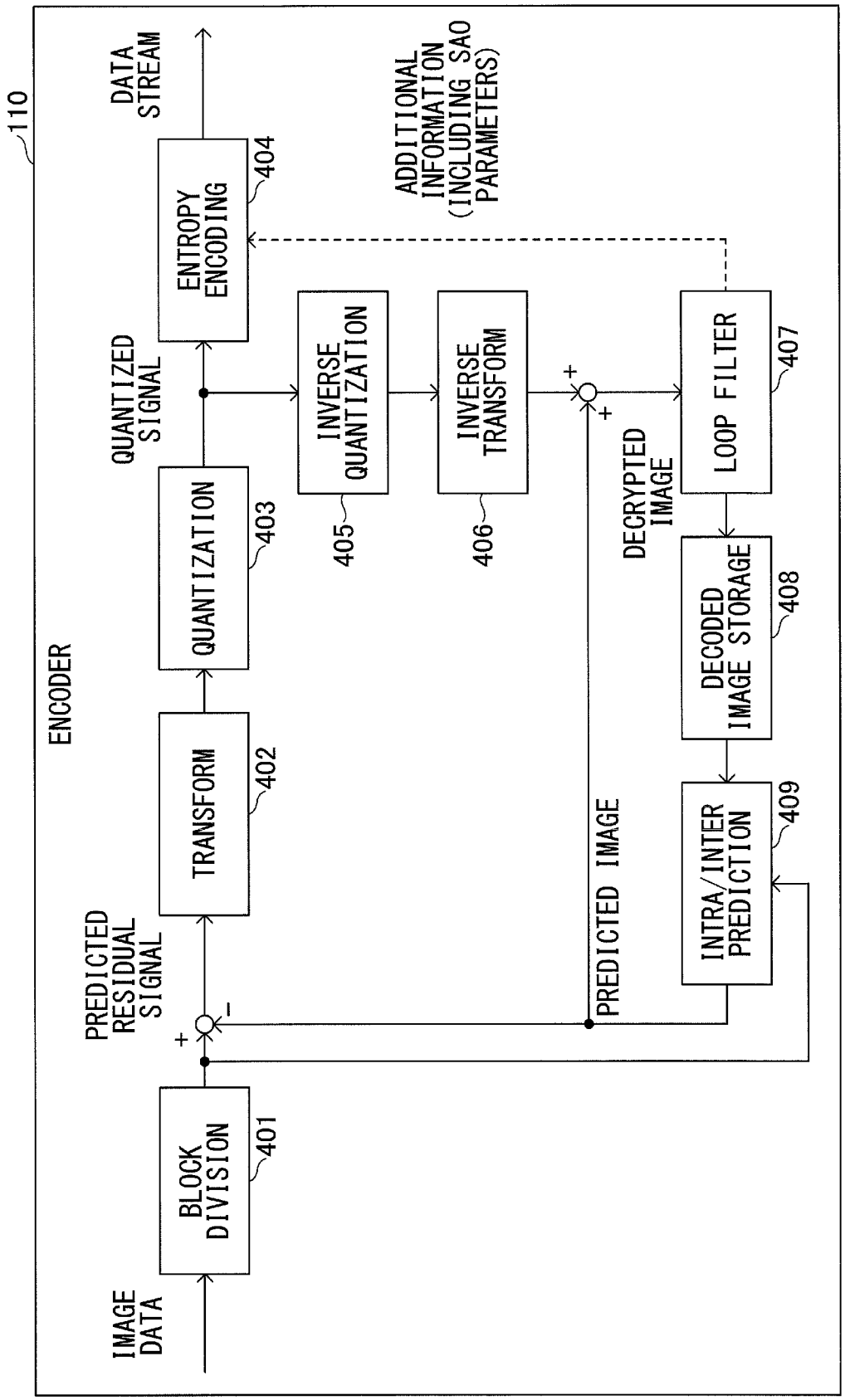
FIG. 4 is a diagram illustrating an example of a functional configuration of the encoder.

FIG. 4 is a diagram illustrating an example of a functional configuration of the encoder. As illustrated in FIG. 4, the encoder 110 includes a block division component 401, an orthogonal transformation component 402, a quantization component 403, and an entropy encoding component 404.

Also, the encoder 110 includes an inverse quantization component 405, an inverse orthogonal transform component 406, a loop filter component 407, a decoded image storage component 408, and an intra/inter prediction component 409.

The block division component 401 recursively divides input image data for each block of CTUs (Coding Tree Units) into blocks of CUs (Coding Units). In a general block division component (in H.265/HEVC), each CU is further divided into blocks of PUs (Prediction Units) and blocks of TUs (Transform Units). However, in the next-generation international standard for the compression encoding, PUs and TUs are discontinued and all are divided into CUs. Hence, in this embodiment, it is assumed that the block division component 401 divides all the blocks of the CTUs into CUs. In the next-generation international standard related to compression encoding, each size of the CTUs is 128 pixels×128 pixels or more, and therefore, the size of the CTU is described below as 128 pixels×128 pixels.

The orthogonal transform component 402 performs an orthogonal transform process on a prediction residual signal being input. The quantization component 403 generates a quantized signal by quantizing the prediction residual signal subjected to the orthogonal transform process, and outputs the generated quantized signal to the entropy encoding component 404 and the inverse quantization component 405.

The entropy encoding component 404 generates and outputs a data stream by entropy encoding the quantized signal.

The inverse quantization component 405 inversely quantizes the quantized signal and outputs the result to the inverse orthogonal transform component 406. The inverse orthogonal transform component 406 obtains a signal substantially equal to the input prediction residual signal by performing an inverse orthogonal transform process on the quantized signal, which is inversely quantized.

A signal obtained by the inverse orthogonal transform component 406 is added to, for example, a prediction image motion-compensated by the intra/inter prediction component 409 to generate a decoded image, and is input to the loop filter component 407.

The loop filter component 407 performs a filter process for reducing coding noise of a decoded image. By the loop filter component 407 performing the filter process, it is possible to prevent an image quality deterioration from propagating between frames of the decoded image. The loop filter component 407 further includes:

deblocking filter,
sample adaptive offset filter, and
adaptive loop filter, which will be described later. Parameters used when these parts included in the loop filter component 407 execute processes (for example, sample adaptive offset parameters used when the sample adaptive offset filter executes a sample adaptive offset process) are signaled. The parameters signaled by the loop filter component 407 are incorporated into the data stream by the entropy encoding component 404 as accompanied information.

The decoded image storage component 408 stores a decoded image, to which a filtering process is conducted.

The intra/inter prediction component 409 performs an intra prediction for generating blocks of a predicted image using each block of the decoded image. In addition, the intra/inter prediction component 409 performs motion compensation based on blocks of each frame of the decoded image, and performs an inter prediction for generating blocks of the predicted image.

Furthermore, the intra/inter prediction component 409 outputs a predicted image including either blocks generated by the intra prediction or blocks generated by the inter prediction.

The prediction image output from the intra/inter prediction component 409 is used for calculating a residual with respect to the input image data, and is input to the orthogonal transform component 402 as a prediction residual signal. Moreover, with respect to the predicted image output from the intra/inter prediction component 409, a signal similar to the prediction residual signal obtained by the inverse orthogonal transform component 406 is added for each block, and is input to the loop filter component 407 as a decoded image.

<4. Description of Loop Filter Part>

Subsequently, details of the loop filter component 407 of the encoder 110 will be described. In describing the details of the loop filter part 407 of the encoder 110 below, first, as a comparison target, the details of the loop filter component of a general (in H.265/HEVC) encoder will be described. Hereinafter, from sections "4.1" to "4.4", details of a loop filter component of a general encoder will be described. Subsequently, in sections "4.5" to "4.8", details of the loop filter component 407 of the encoder 110 according to the first embodiment will be described.

<4.1 Functional Configuration of Loop Filter Component of General Encoder>

Figure 5:
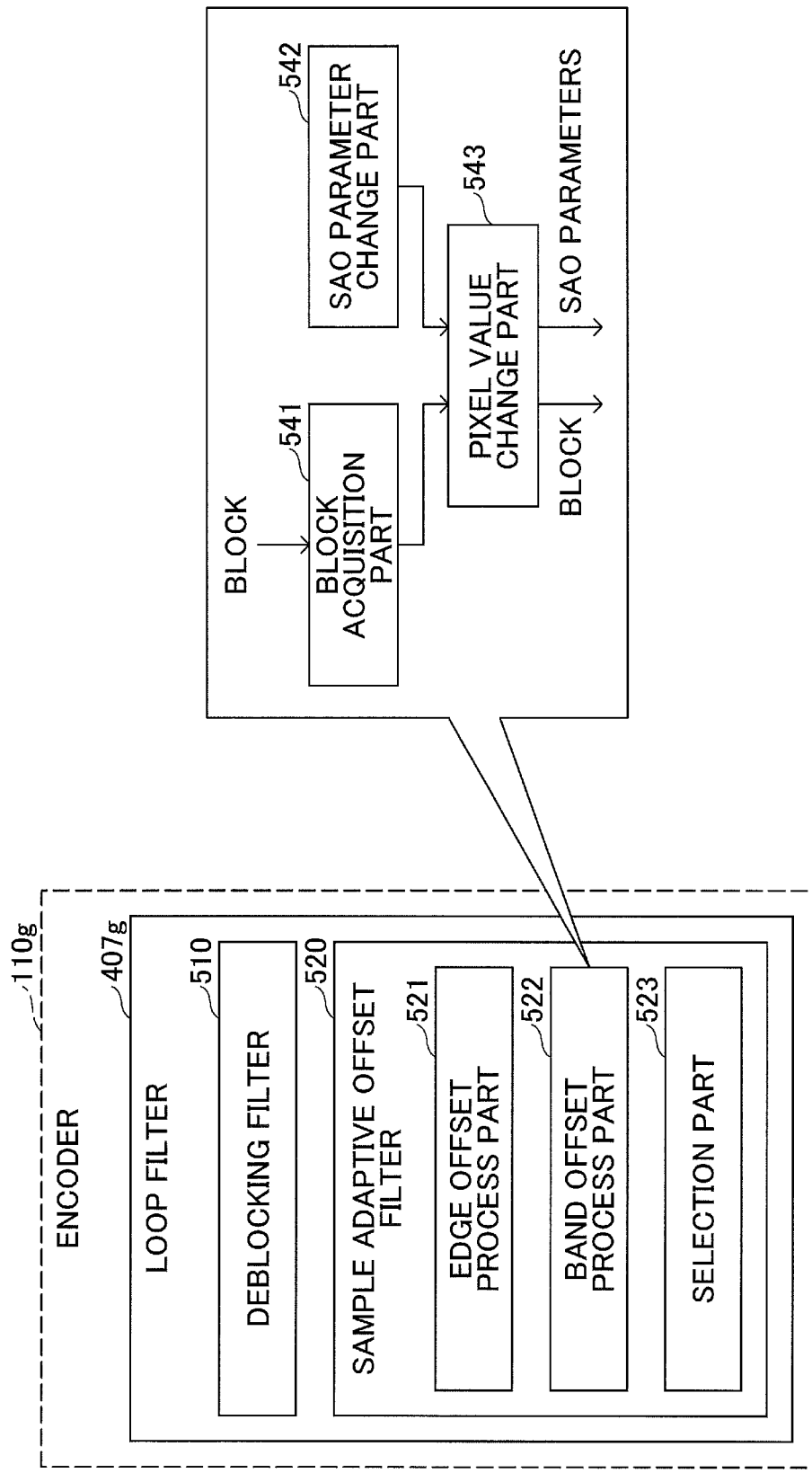
FIG. 5 is a diagram illustrating an example of a functional configuration of a loop filter part of a general encoder.

FIG. 5 is a diagram illustrating an example of a functional configuration of a loop filter component of a general encoder. As illustrated in FIG. 5, a loop filter component 407g of a general encoder 110g includes the deblocking filter 510, the sample adaptive offset filter 520.

The deblocking filter 510 conducts the filter process that filters each block of the decoded image to reduce distortion generated at a block boundary when each block of image data is encoded. The sample adaptive offset filter 520 classifies each block of the decoded image filtered by the deblocking filter 510 on a pixel basis, and adds an offset value corresponding to the classification to each pixel.

Note that the sample adaptive offset filter 520 further includes an edge offset process part 521, a band offset process part 522, and a selection part 523.

The edge offset process part 521 classifies the edge state according to a magnitude relation among three pixels that are successive in the direction designated as the edge offset class. Moreover, the edge offset process part 521 adds an offset value corresponding to the classification of an edge state to pixel values of each block of the decoded image. Further, the edge offset process part 521 notifies the selection part 523 of each block obtained by adding the offset value to the pixel values.

Note that the edge offset process part 521 executes an edge offset process including the above described steps for each of SAO parameters while changing the SAO parameters related to the edge offset process.

The band offset process part 522 divides the gradation of the pixel values, which are taken by the decoded image into 32 bands, selects four bands having a successive gradation based on the pixel values, and adds (or subtracts) the offset value to the pixel values belonging to the four bands.

Specifically, the band offset process part 522 includes a block acquisition part 541, an SAO parameter change part 542, and a pixel value change part 543, as illustrated in FIG. 5. The block acquisition part 541 reads a process target block acquired by the sample adaptive offset filter 520, and notifies the pixel value change part 543 of the read block. The SAO parameter change part 542 determines the SAO parameters related to a band offset process, and outputs the determined SAO parameters to the pixel value change part 543.

The pixel value change part 543 changes the pixel values of the process target block using the SAO parameters related to the band offset process output from the SAO parameter change part 542. Moreover, the pixel value change part 543 notifies the selection part 523 of each block, in which a pixel value is changed, together with the SAO parameters related to the band offset process.

Note that the band offset process part 522 executes the band offset process including the above described steps for each SAO parameter while changing the SAO parameters related to the band offset process.

The selection part 523 obtains a process result performed by the edge offset process part 521 and a process result performed by the band offset process part 522 on the process target block, respectively, and calculates a RD (Rate Distortion) cost. Moreover, the selection part 523 determines a process result with a lowest RD cost, and signals the SAO parameters used for calculating the lowest RD cost.

<4.2 Flow of Sample Adaptive Offset Process by Sample Adaptive Offset Filer of General Encoder>

Next, the flow of the sample adaptive offset process by the sample adaptive offset filter 520 of the general encoder will be described.

Figure 6:
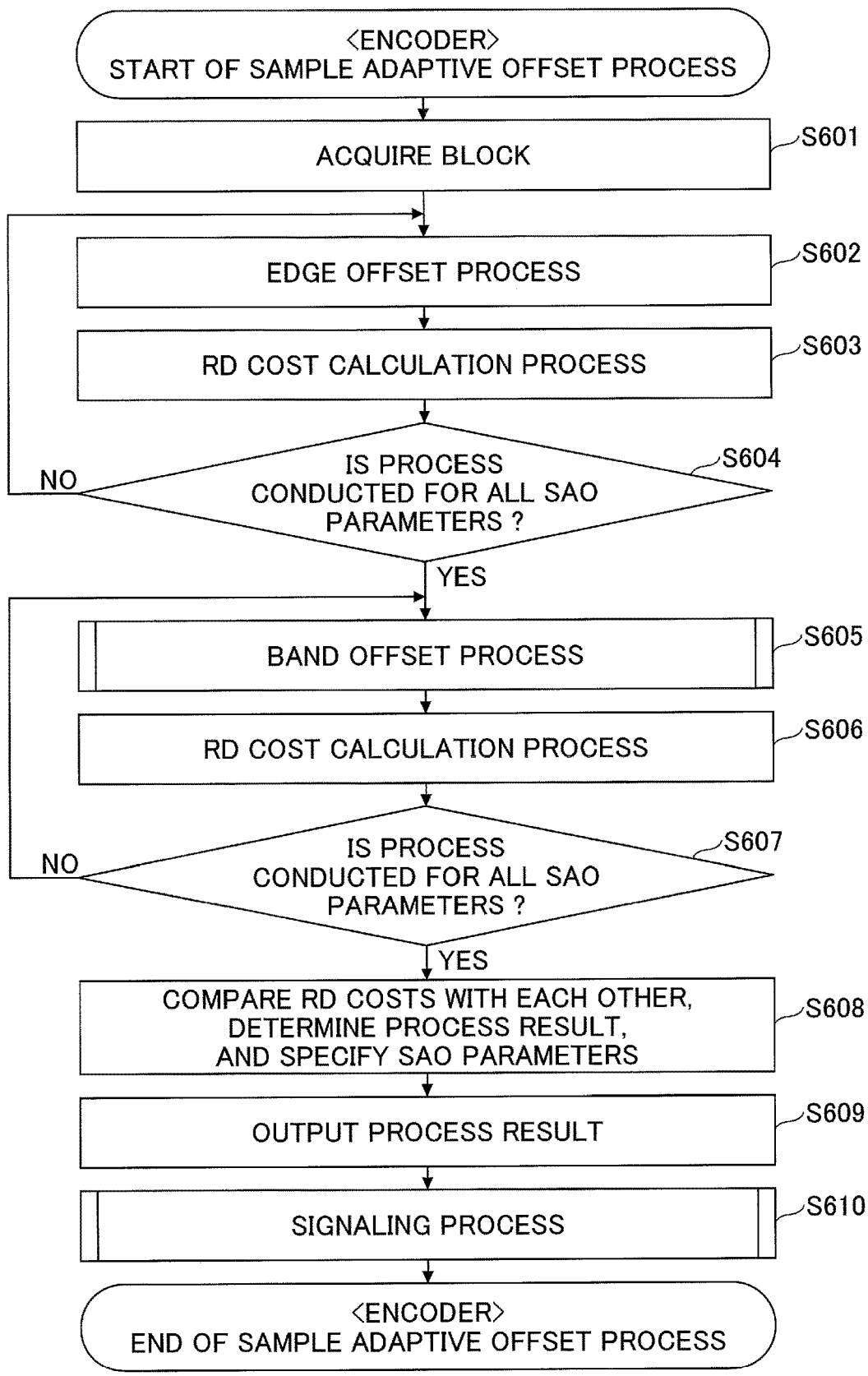
FIG. 6 is a flowchart illustrating a flow of a sample adaptive offset process by the general encoder.

FIG. 6 is a flowchart illustrating the flow of the sample adaptive offset process by the general encoder.

When the deblocking filter process by the deblocking filter 510 is completed for the process target block, the sample adaptive offset filter 520 starts the sample adaptive offset process illustrated in FIG. 6.

In step S601, the sample adaptive offset filter 520 acquires the process target block.

In step S602, the edge offset process part 521 reads the acquired process target block, and performs the edge offset process using a predetermined SAO parameter related to the edge offset process.

In step S603, the selection part 523 calculates an RD cost for a process result of the edge offset process in step S602.

In step S604, the edge offset process part 521 determines whether the edge offset process has been performed by using each of the SAO parameters related to the edge offset process within a predetermined range with respect to the block to be processed.

When the edge offset process part 521 determines in step S604 that there is an SAO parameter that is not used for executing the edge offset process (No in step S604), the edge offset process part 521 returns to step S602.

On the other hand, when the edge offset process part 521 determines in step S604 that the edge offset process has been performed using each of the SAO parameters within the predetermined range, the edge offset process part 521 advances to step S605.

In step S605, the band offset process part 522 performs the band offset process with respect to the process target block, using the predetermined SAO parameter related to the band offset process (details will be described later).

In step S606, the selection part 523 calculates an RD cost for a process result of the band offset process in step S606.

In step S607, the band offset process part 522 determines whether the band offset process has been performed using each of the SAO parameters (the SAO parameters related to the band offset process) within a predetermined range with respect to the block to be processed.

When the band offset process part 522 determines in step S607 that there is an SAO parameter that has not been used for performing the band offset process (No in step S607), the band offset process part 522 returns to step S605.

On the other hand, when the band offset process part 522 determines in step S607 that the band offset process has been performed using each of the SAO parameters within the predetermined range, the band offset process part 522 proceeds to step S608.

In step S608, the selection part 523 compares RD costs of process results performed by the edge offset process part 521 with RD costs of process results performed by the band offset process part 522, and determines which process results in the lowest RD cost. Moreover, the selection part 523 specifies the SAO parameter that was used in calculating the determined process result.

In step S609, the selection part 523 selects and outputs the determined process result as the process result of the sample adaptive offset process.

In step S610, the selection part 523 performs a signaling process for the specified SAO parameter (details will be described later).

<4.3 Details of Band Offset Process (Step S605) in General Encoder>

Next, the details of the band offset process (step S605) in the general encoder will be described.

(1) Process Contents of Band Offset Process

First, contents of the band offset process will be described.

FIG. 7 is a diagram for explaining the process content of the band offset process in the general encoder. Of these, the process example 700a in FIG. 7 illustrates a block to be processed. As illustrated in a process example 700a of FIG. 7, in the case of the general encoder, the band offset process is performed on a block by the CTU in a decoded image 710. The example of the process example 700a in FIG. 7 illustrates a state in which the band offset process is performed on a block of a CTU720 of 64×64 pixels, and the block of a CTU720' is generated as a process result.

A process example 700b in FIG. 7 illustrates a specific example of the band offset process. As illustrated by the process example 700b in FIG. 7, when the decoded image 710 has each of pixel values of 256 gradations from 0 to 255, the number of gradations per band becomes 8 by setting 32 bands.

Here, it is assumed that the SAO parameter change part 542 outputs the band position indicated by the arrow 730 as the band position for the CTU720. In this case, the pixel value change part 543 recognizes the bands 731 to 734 as four consecutive bands.

Then, the pixel value change part 543 adds an offset value $V_1$ to pixel values for the pixels belonging to the band 731 from among the pixels included in the block of the CTU720. Similarly, the pixel value change part 543 adds an offset value $V_2$ to pixel values for the pixels belonging to the band 732 from among the pixels included in the block of the CTU720. Similarly, the pixel value change part 543 adds an offset value $V_3$ to pixel values for the pixels belonging to the band 733 from among the pixels included in the block of the CTU720. Similarly, the pixel value change part 543 adds an offset value $V_4$ to pixel values for the pixels belonging to the band 734 from among the pixels included in the block of the CTU720.

As described above, the pixel value change part 543 performs the band offset process with respect to a block of the CTU720 by using the SAO parameter related to the band offset process=(band position indicated by the arrow 730, offset values $V_1$ to $V_4$). Accordingly, the pixel value change part 543 generates a block of the CTU720' as a process result of the band offset process.

Note that the offset values $V_1$ to $V_4$ added (or subtracted) to each of the four consecutive bands may be different values or the same value (one value).

(2) Flow of Band Offset Process

Next, a detailed flowchart of the band offset process (step S605) by the general encoder will be described.

Figure 8:
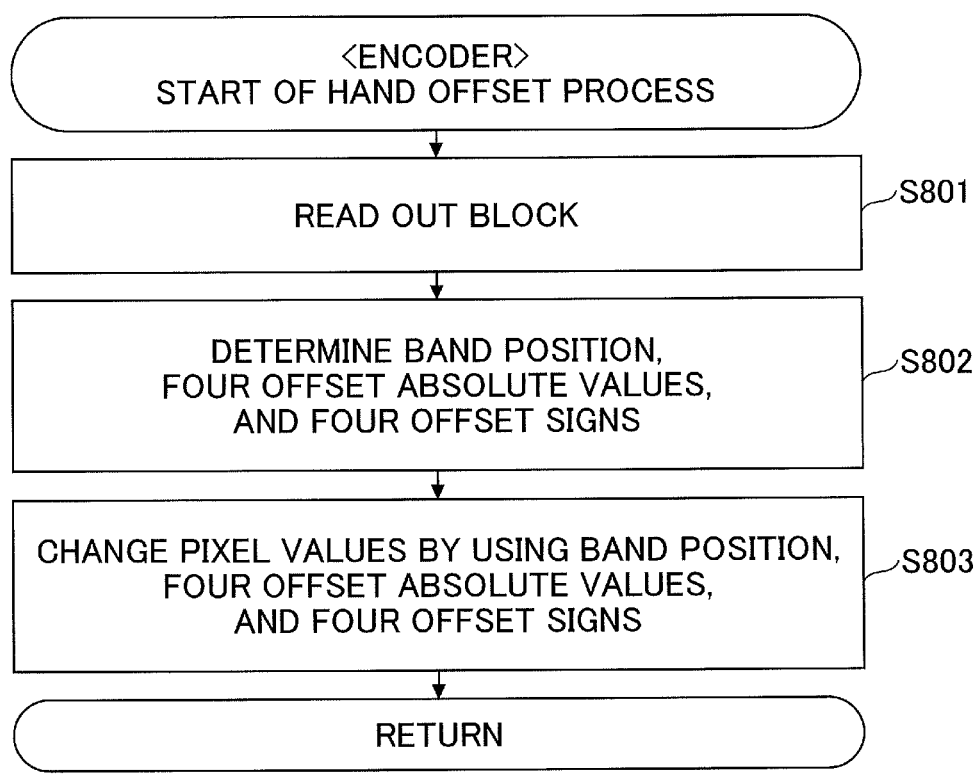
FIG. 8 is a flowchart illustrating a flow of the band offset process by the general encoder.

FIG. 8 is a flowchart illustrating a flow of the band offset process by the general encoder.

In step S801, the block acquisition part 541 reads out a process target block acquired by the sample adaptive offset filer 520.

In step S802, the SAO parameter change part 542 determines a "band position", an "absolute offset value" and an "offset sign" of four consecutive bands as SAO parameters related to band offset process. It is assumed that a range of the SAO parameter related to the band offset process determined by the SAO parameter change part 542 is defined beforehand, and the SAO parameter change part 542 sequentially determines the SAO parameters within the range. Moreover, the SAO parameter change part 542 sequentially outputs the determined SAO parameters related to the band offset process to the pixel value change part 543.

In step S803, the pixel value change part 543 changes the pixel values of the process target block read by the block obtaining part 541 using the SAO parameter, which is related to the band offset process and is output by the SAO parameter change part 542.

<4.4 Details of Signaling Process by General Encoder (Step S610)>

Next, details of the signaling process (step S610) by the general encoder will be described.

Figure 9:
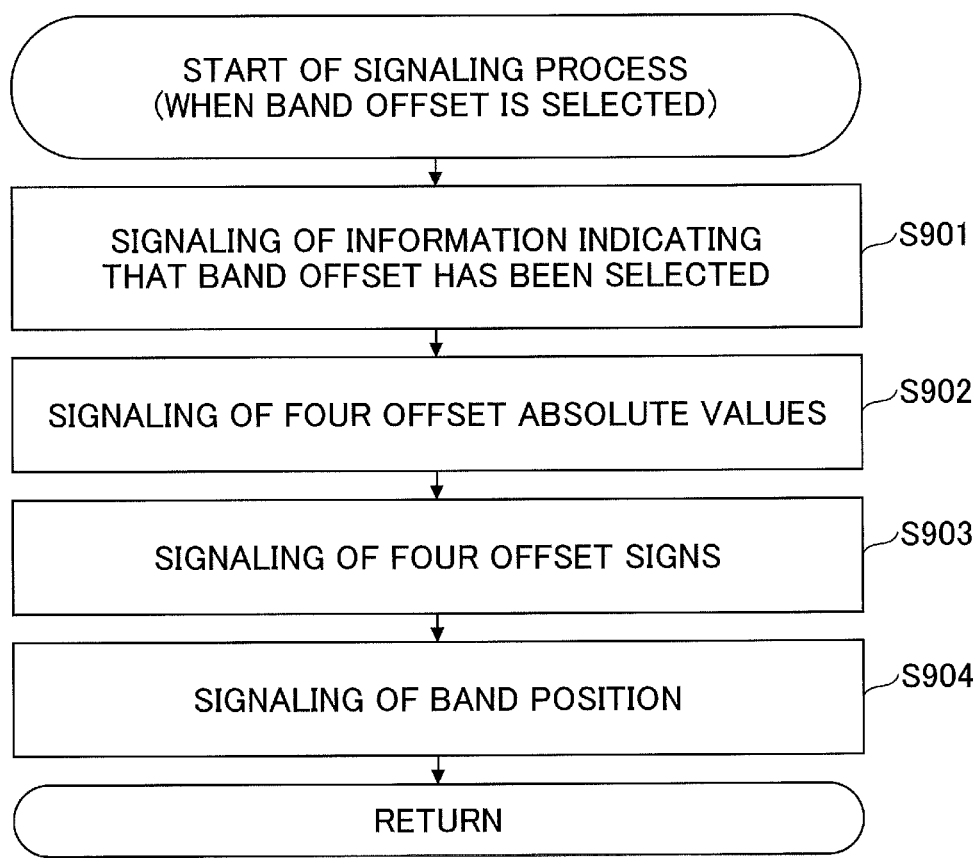
FIG. 9 is a flowchart illustrating a flow of a signaling process by the general encoder.

FIG. 9 is a flowchart illustrating a flow of the signaling process by the general encoder. Here, explanations will be given on an assumption that a process result of the band offset process using the predetermined SAO parameter related to the band offset process is determined to be a process result with the lowest RD cost by a RD cost comparison.

In step S901, the selection part 523 signals information indicating that the process result of the band offset process has been selected in the sample adaptive offset process.

In step S902, the selection part 523 signals four offset absolute values, which are SAO parameters related to the band offset process when the process result with the lowest RD cost is calculated.

In step S903, the selection part 523 signals the four offset signs (+ or −), which are SAO parameters related to the band offset process when the process result with the lowest RD cost is calculated.

In step S904, the selection part 523 signals a band position, which is an SAO parameter related to the band offset process when the process result with the lowest RD cost is calculated.

<4.5 Functional Configuration of the Loop Filter Part of Encoder According to the First Embodiment>

Subsequently, a functional configuration of the loop filter component 407 of the encoder 110 according to the first embodiment will be described.

Figure 10:
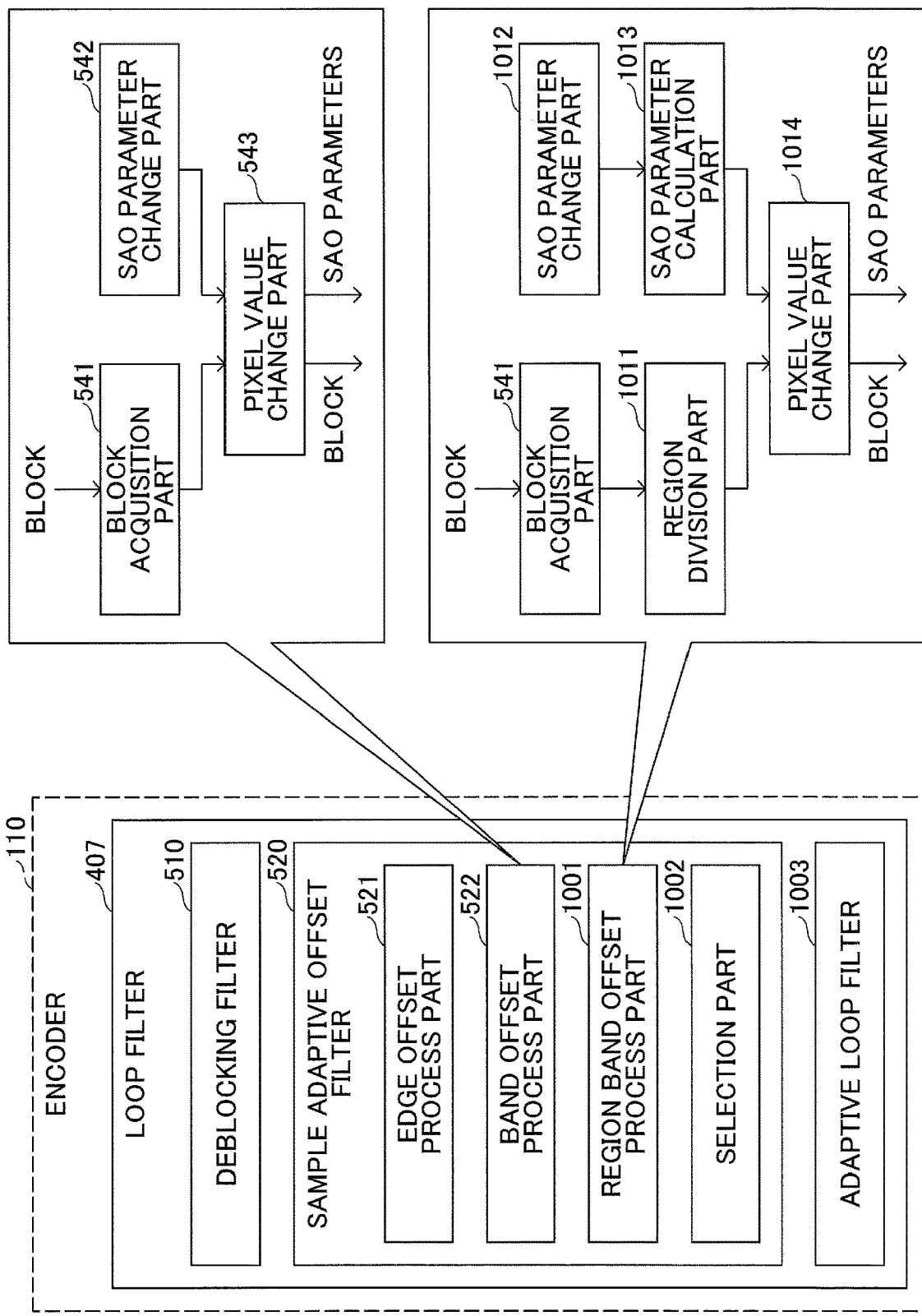
FIG. 10 is a diagram illustrating an example of a functional configuration of a loop filter part of the encoder according to a first embodiment.

FIG. 10 is a diagram illustrating an example of a functional configuration of a loop filter component of the encoder according to the first embodiment. The same functions as those of the loop filter component of the general encoder described with reference to FIG. 5 are denoted by the same reference numerals, and explanations thereof will be omitted.

Different from the functional configuration illustrated in FIG. 5, in the first embodiment, the sample adaptive offset filter 520 includes a region band offset process part 1001, a selection part 1002, and an adaptive loop filter 1003. Instead of performing the band offset process for each block by a CTU as performed by the band offset process part 522, the region band offset process part 1001 divides the CTU (one block) into a plurality of regions, and performs the band offset process. The band offset process for each region is referred to as "region band offset process".

In order to perform the band offset process in units of regions, the region band offset process part 1001 includes a block acquisition part 541, a region division part 1011, a SAO parameter change part 1012, a SAO parameter calculation part 1013, and a pixel value change part 1014.

Among these parts 1011 to 1014, the region division part 1011 is an example of a division part, and divides the process target block read by the block obtaining part 541 into 16 square regions (sub-blocks). The number of blocks to be processed may be more or less than 16 blocks. Also, the region division part 1011 sequentially outputs regions obtained by the division to the pixel value change part 1014.

The SAO parameter change part 1012 is an example of a determining part, and sequentially determines SAO parameters related to the region band offset process, and sequentially outputs the determined SAO parameters related to the region band offset process to the SAO parameter calculation part 1013. Note that the SAO parameter change part 1012 according to the first embodiment determines SAO parameters related to the region band offset process for two regions: a region located at a lower left corner and a region located at an upper left corner, in the 16 regions to be divided by the region division part 1011. It is assumed that SAO parameters related to process are determined. That is, the SAO parameter change part 1012 determines SAO parameters for two regions (first sub-blocks): a region including an upper left vertex and a region including a lower left vertex among four vertices of the process target block.

The SAO parameter calculation part 1013 is an example of a calculation part. The SAO parameter calculation part 1013 calculates SAO parameters related to the region band offset process with respect to remaining regions (second sub-blocks) other than the two regions (first sub-blocks). Specifically, the SAO parameter calculation part 1013 performs an interpolation process using the SAO parameters related to the region band offset process with respect to the determined two regions. When performing the interpolation process, the SAO parameter calculation part 1013 uses a positional relationship between the two regions and the remaining regions in the block to be processed.

In addition, the SAO parameter calculation part 1013 outputs the determined or calculated SAO parameters related to the region band offset process of each of the 16 regions to the pixel value change part 1014.

The pixel value change part 1014 changes pixel values of each region of the process target block using the SAO parameters related to the region band offset process output from the SAO parameter calculation part 1013. In addition, the pixel value change part 1014 outputs the process target block including the 16 regions, in which pixel values have been changed to the selection part 1002 as a process result of the region band offset process.

The pixel value change part 1014 changes the pixel values of the 16 regions each time the SAO parameters related to the determined region band offset process are output from the SAO parameter change part 1012. Then, the pixel value change part 1014 outputs the process target block including the 16 regions, in which the pixel values have been changed to the selection part 1002 as a process result of the region band offset process.

The selection part 1002 obtains each of process results performed by the edge offset process part 521, each of process results performed by the band offset process part 522, and each of process results performed by the region band offset process part 1001 with respect to the block to be processed, and calculates an RD cost. Moreover, the selection part 1002 determines a process result with a lowest calculated RD cost, selects the determined process result, and outputs the selected process result to the adaptive loop filter 1003. Furthermore, the selection part 1002 signals the SAO parameter used for calculating the determined process result.

The adaptive loop filter 1003 filters each block of the decoded image subjected to the offset process by the sample adaptive offset filter 520 to reduce an error from the input image.

<4.6 Flow of Sample Adaptive Offset Process by Sample Adaptive Offset Filter of Encoder According to the First Embodiment>

Next, a flow of the sample adaptive offset process by the sample adaptive offset filter 520 of the encoder 110 according to the first embodiment will be described.

Figure 11:
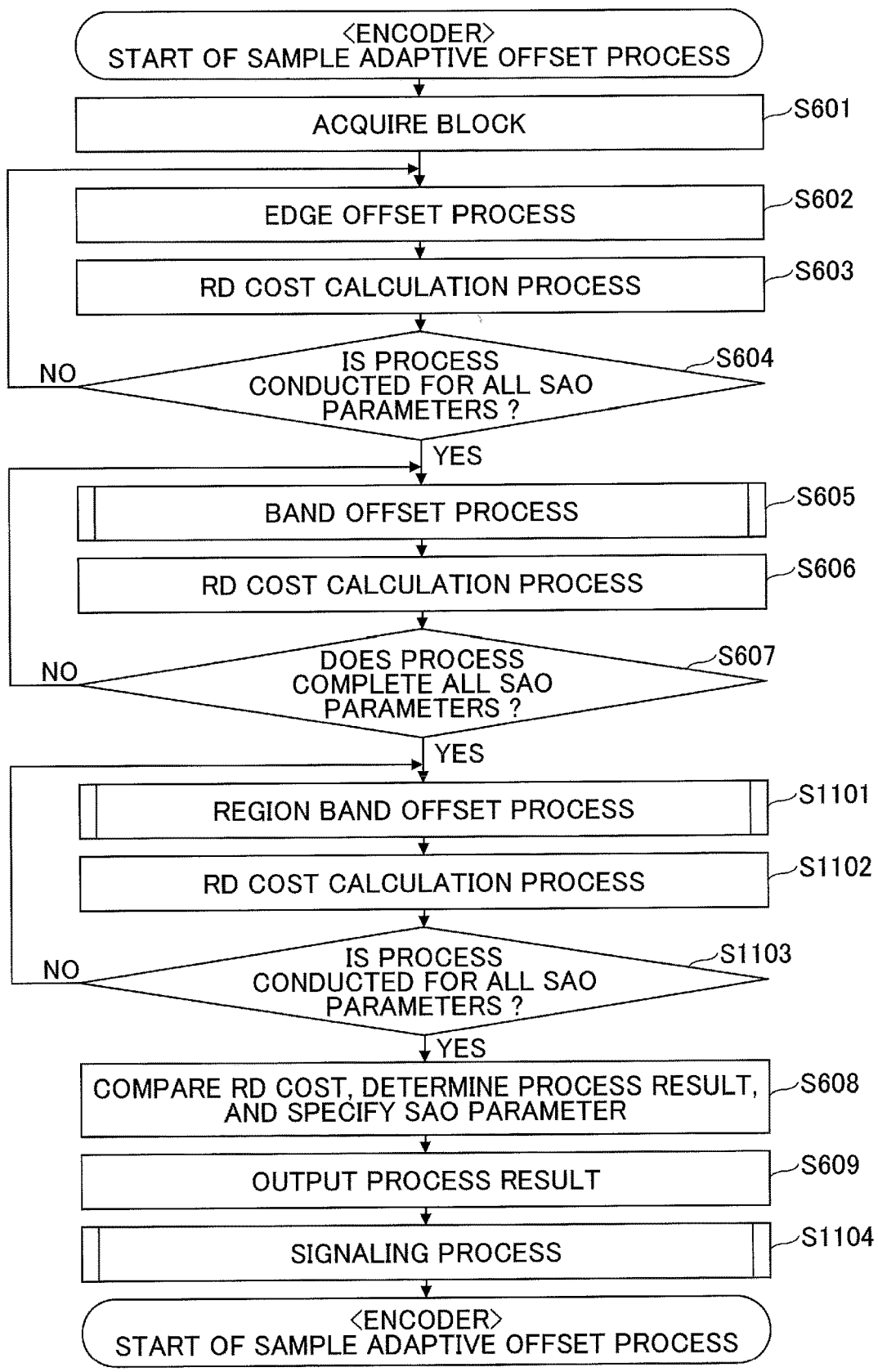
FIG. 11 is a flowchart illustrating a flow of a sample adaptive offset process performed by the encoder according to the first embodiment.

FIG. 11 is a flowchart illustrating a flow of the sample adaptive offset process performed by the encoder according to the first embodiment. Note that the same steps as those in the flowchart of the sample adaptive offset process performed by the general encoder described with reference to FIG. 6 are denoted by the same reference numerals, and explanations thereof will be omitted.

Different from FIG. 6, in the first embodiment, steps S1101 to S1103 and S1104 are conducted. In step S1101, the region band offset process part 1001 performs the region band offset process (details will be described later) on a process target block using the predetermined SAO parameters related to the region band offset process.

In step S1102, the selection part 523 calculates an RD cost for the process result of the region band offset process in step S1101.

In step S1103, the region band offset process part 1001 determines whether or not the region band offset process has been performed on the process target block using each of the SAO parameters within the predetermined range.

If the region band offset process part 1001 determines in step S1103 that there is an SAO parameter that has not been used to execute the region band offset process (No in step S1103), the region band offset process returns to step S1101.

On the other hand, if the region band offset process part 1001 determines in step S1103 that the region band offset process has been performed using each of the SAO parameters within the predetermined range, the process proceeds to step S608.

In step S1104, the selection part 1002 performs a signaling process (details will be described later) for the specified SAO parameter. When the selection part 1002 determines that a process result of the region band offset process indicates the lowest RD cost, the selection part 1002 signals the SAO parameters related to the region band offset process. In this case, the selection part 1002 signals the SAO parameters related to the region band offset process for the two regions output from the SAO parameter changing part 1012 among the SAO parameters related to the region band offset process.

<4.7 Details of Region Band Offset Process (Step S1101) in Encoder According to the First Embodiment>

Next, details of the region band offset process (step S1101) in the encoder 110 according to the first embodiment will be described.

(1) Process Contents of Region Band Offset Process

First, the contents of the band offset process will be described.

Figure 12:
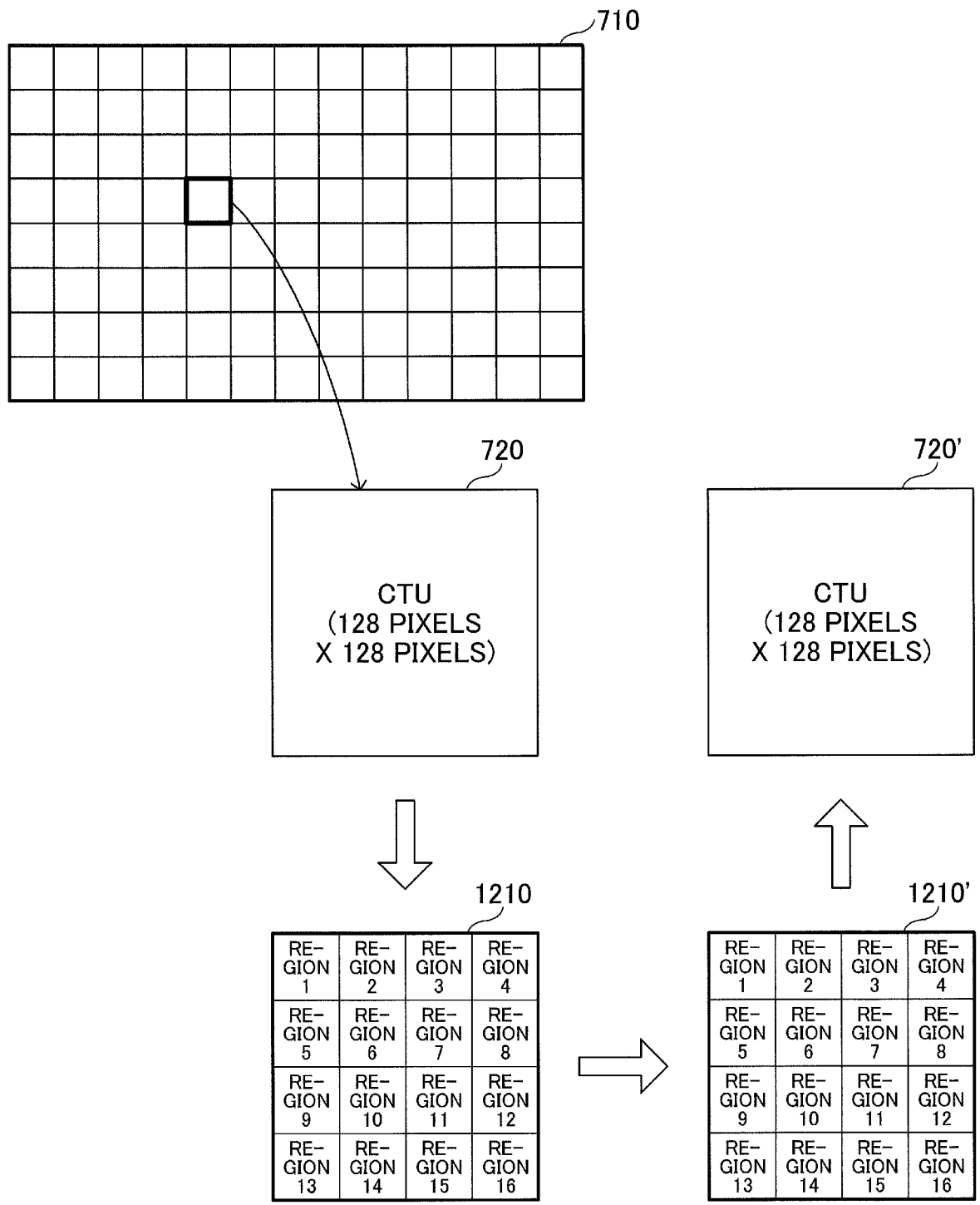
FIG. 12 is a first diagram for explaining a process content of a region band offset process in the encoder according to the first embodiment.

FIG. 12 is a first diagram for explaining the process contents of the region band offset process in the encoder according to the first embodiment.

As illustrated in FIG. 12, in the case of the encoder 110 according to the first embodiment, a block of the CTU720 included in the decoded image 710 is divided into 16 regions, and the region band offset process is performed by a region basis. The number of regions divided within the block of the CTU720 may be more or less than 16.

In the example depicted in FIG. 12, by dividing a block of the CTU720 having 128 pixels×128 pixels into 16 regions; that is, region_1 to region_16, a block of a CTU1210 is generated, and then, the region band offset process is successively performed.

Upon a completion of the region band offset process with respect to the region_16, a block of a CTU1210' is generated. The region band offset process part 1001 outputs the generated block of the CTU1210' to the selection part 1002 as a process result (the block of the CTU720') of the region band offset process with respect to the block of the CTU720.

(2) Specific Example of Region Band Offset Process

Figure 13:
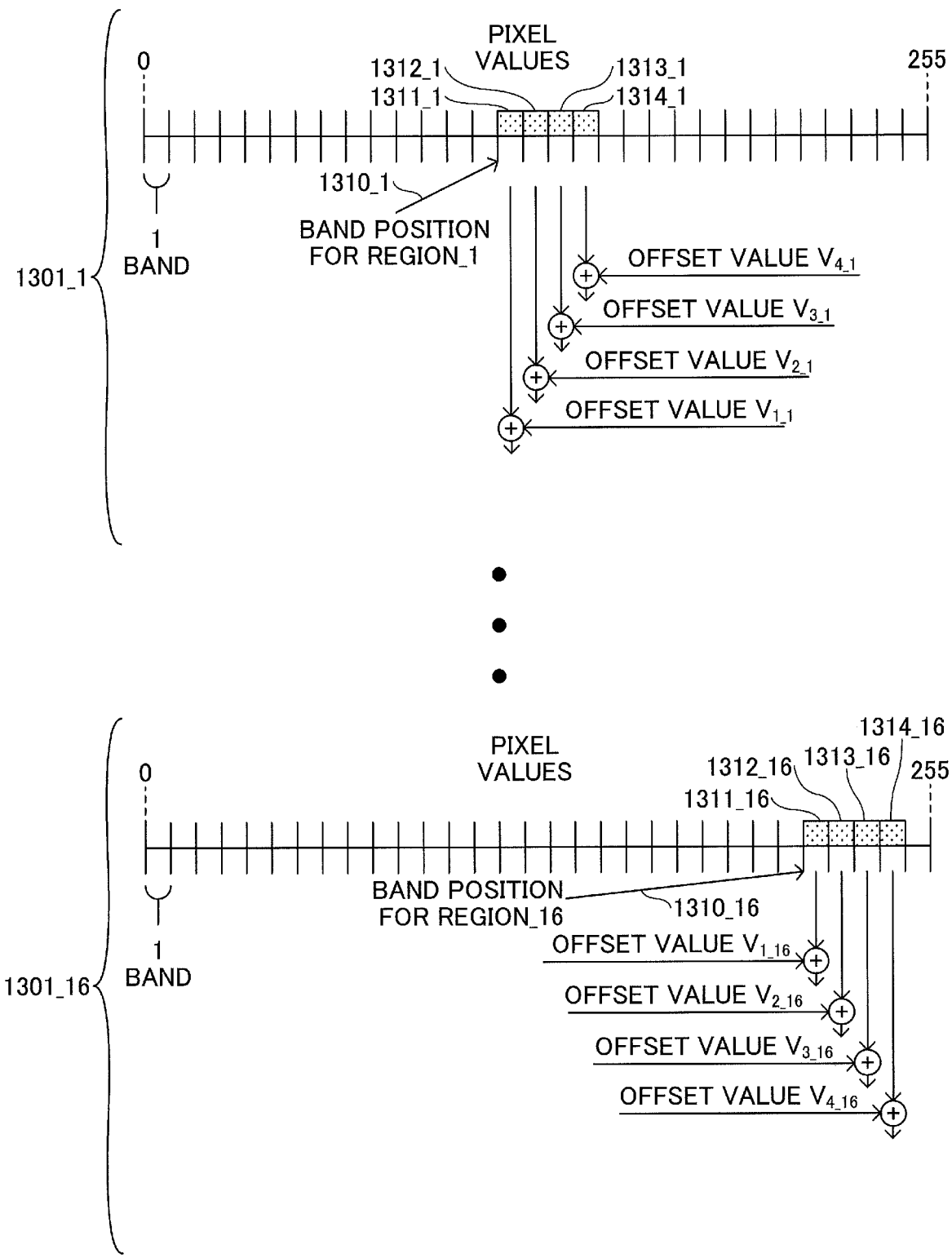
FIG. 13 is a second diagram for describing a process content of the region band offset process in the encoder according to the first embodiment.

FIG. 13 is a second diagram for describing the process content of the region band offset process in the encoder according to the first embodiment. As illustrated in FIG. 13, when the decoded image 710 has pixel values of 256 gradations from 0 to 255, the number of gradations per band is 8 by setting 32 bands.

A process example 1301_1 depicted in FIG. 13 illustrates a state, in which the SAO parameter change part 1012 outputs a band position indicated by an arrow 1310_1 as the band position for the region_1 of the block of the CTU1210. In this case, the pixel value change part 1014 recognizes bands 1311_1, 1311_2, 1311_3, and 1314_1 as four consecutive bands.

Next, the pixel value change part 1014 adds an offset value $V_{1\_1}$ to a pixel whose pixel value belongs to the band 1311_1 among pixels included in the region_1 of the block of the CTU1210. In the same manner, the pixel value change part 1014 adds an offset value $V_{2\_1}$ to a pixel whose pixel value belongs to the band 1312_1 among pixels included in the region_1 of the block of the CTU1210. In the same manner, the pixel value change part 1014 adds an offset value $V_{3\_1}$ to a pixel whose pixel value belongs to the band 1313_1 among pixels included in the region_1 of the block of the CTU1210. In the same manner, the pixel value change part 1014 adds an offset value $V_{4\_1}$ to a pixel whose pixel value belongs to the band 1314_1 among pixels included in the region_1 of the block of the CTU1210.

The region band offset process part 1001 performs a similar process with respect to the region_2 to the region_16. A process example 1301_16 depicted in FIG. 13 represents a state in which the SAO parameter change part 1012 outputs a band position indicated by an arrow 1310_16 as a band position for the region_16 of a block of the CTU1210. In this case, the pixel value change part 1014 recognizes bands 1311_16 to 1314_16 as four consecutive bands.

Then, the pixel value change part 1014 adds an offset value $V_{4\_16}$ to a pixel whose pixel value belongs to the band 1311_16 among pixels included in the region_16 of the block of the CTU1210. In the same manner, the pixel value change part 1014 adds an offset value $V_{2\_16}$ to a pixel whose pixel value belongs to the band 1312_16 among pixels included in the region_16 of the block of the CTU1210. In the same manner, the pixel value change part 1014 adds an offset value $V_{3\_16}$ to a pixel whose pixel value belongs to the band 1313_16 among pixels included in the region_16 of the block of the CTU1210. In the same manner, the pixel value change part 1014 adds an offset value $V_{4\_16}$ to a pixel whose pixel value belongs to the band 1314_16 among pixels included in the region_16 of the block of the CTU1210.

As described above, the pixel value change part 1014 conducts the region band offset process with respect to the block of the CTU1210 by using, as SAO parameters related to the region band offset process, band positions indicated by the arrows 1310_1 to 1310_16, absolute offset values of offset values $V_{1\_1}$ to $V_{4\_16}$, and offset signs of offset values $V_{1\_1}$ to $V_{4\_16}$.

Accordingly, the pixel value change part 1014 is able to generate the block of the CTU1210' as a process result of the region band offset process.

(3) Process Contents of SAO Parameter Calculation Part

Subsequently, a process content of the SAO parameter calculation part 1013 will be described. As described above, the SAO parameter calculation part 1013 calculates SAO parameters related to the region band offset process with respect to remaining regions other than two regions output from the SAO parameter change part 1012. Specifically, the SAO parameter calculation part 1013 performs the calculation by conducting the interpolation process using the SAO parameters related to the region band offset process with respect to the two regions. When performing the interpolation process, the SAO parameter calculation part 1013 uses a positional relationship between the two regions and the remaining regions in a block to be processed.

Figure 14:
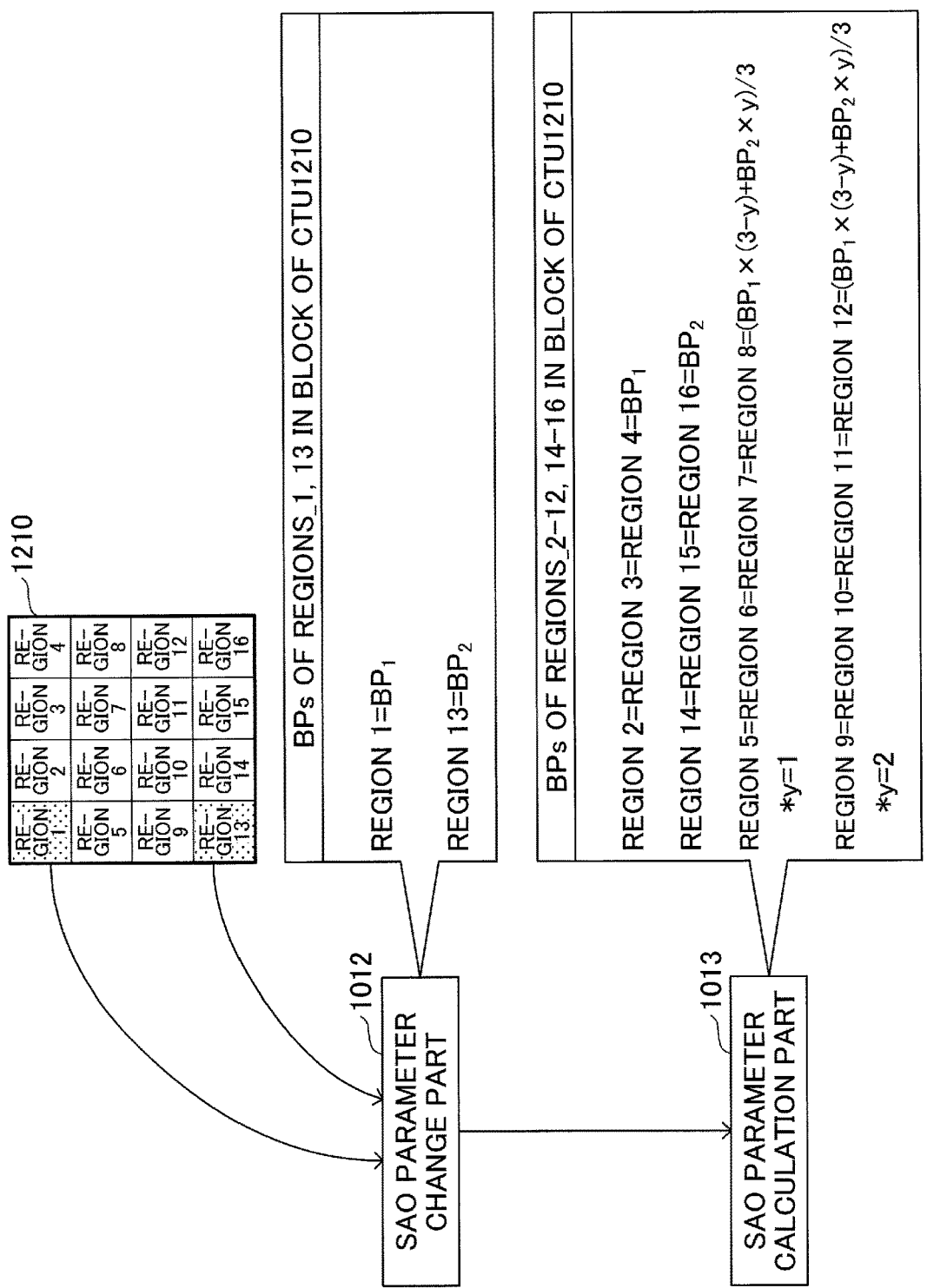
FIG. 14 is a diagram illustrating a calculation method for calculating a band position of each region in the region band offset process conducted by the encoder according to the first embodiment.

FIG. 14 is a diagram illustrating a calculation method for calculating a band position of each region in the region band offset process conducted by the encoder according to the first embodiment. As illustrated in FIG. 14, among the region_1 to the region_16 of the block of the CTU1210, the SAO parameter changing part 1012 outputs band positions "$BP_1$" and "$BP_2$" for the region_1 and the region_13.

The SAO parameter calculation part 1013 calculates each of band positions of the region_2, the region_3, and the region_4 based on the band position="$BP_1$" for the region_1 output from the SAO parameter change part 1012 (by Formula (1) below).

Moreover, the SAO parameter calculation part 1013 calculates each of band positions of the region_14, the region_15, and the region_16 based on the band position="$BP_2$" output from the SAO parameter change part 1012 (by Formula (2) below).

Moreover, the SAO parameter calculation part 1013 calculates each of band positions of the region_5, the region_6, the region_7, and the region_8 based on the band position="$BP_1$" (by Formula (3) below).

Furthermore, the SAO parameter calculation part 1013 calculates each of band positions of the region_9, the region_10, the region_11, and the region_12 based on the band positions="$BP_1$" and "$BP_2$" (by Formula (4) below).

band positions of region_2, region_3, and
region_4=band position of region_1      [Formula (1)]

band positions of region_14, region_15, and
region_16=band position of region_13      [Formula (2)]

band positions of region_5, region_6, region_7, and
region_8=$(BP_1 \times (3-y) + BP_2 \times y)/3$,      [Formula (3)]

where y is the number of regions counted from a region at a topmost row. Here, y=1.

band positions of region_9, region_10, region_11,
and region_12=$(BP_1 \times (3-y) + BP_2 \times y)/3$,      [Formula (4)]

where y is the number of regions counted from the region at the topmost region. Here, y=2.

(4) Flow of Region Band Offset Process

Subsequently, a detailed flowchart of the region band offset process (step S1101) by the encoder 110 according to the first embodiment will be described.

Figure 15:
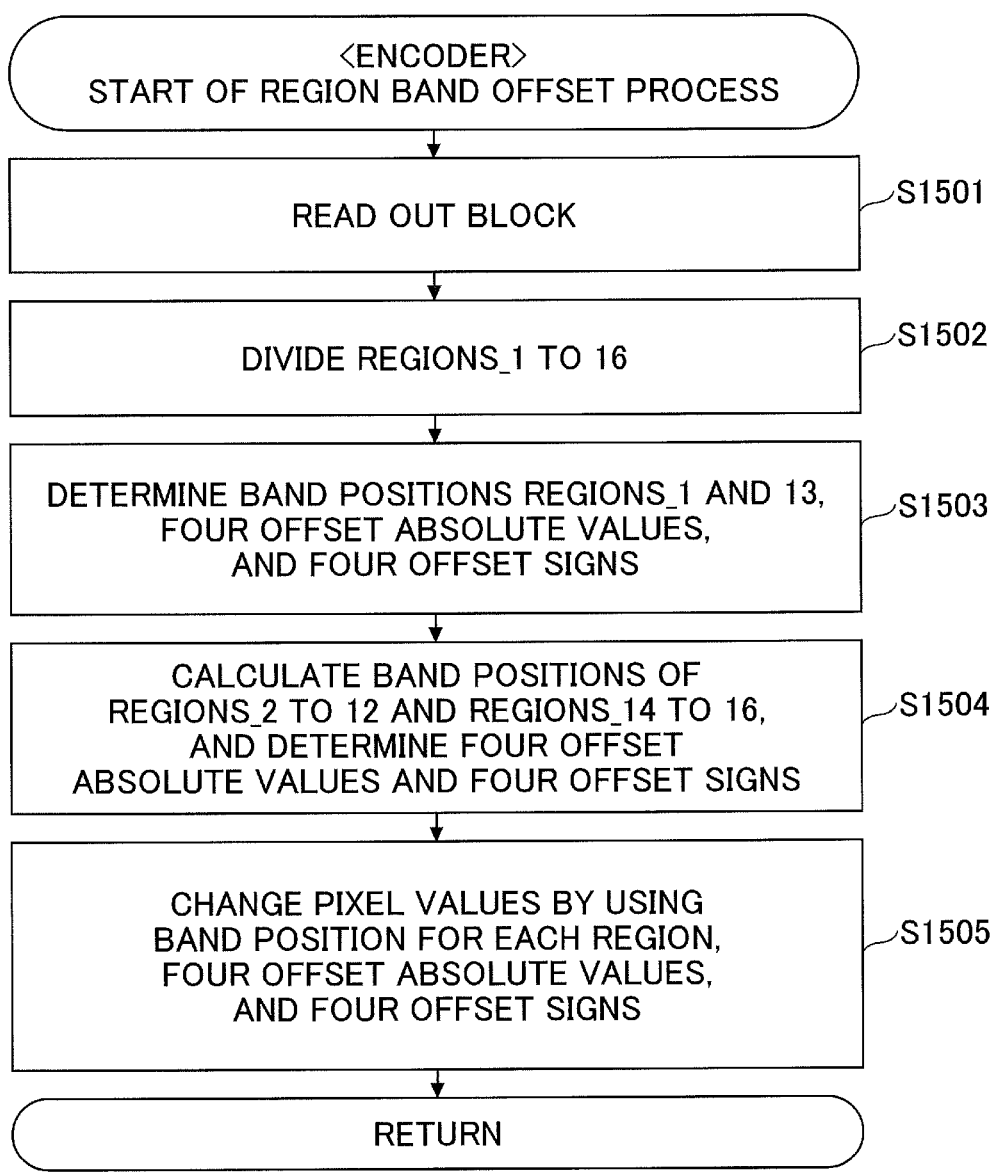
FIG. 15 is a flowchart illustrating a flow of the region band offset process performed by the encoder according to the first embodiment.

FIG. 15 is a flowchart illustrating a flow of the region band offset process performed by the encoder according to the first embodiment.

In step S1501, the block acquisition part 541 reads a block of a process target.

In step S1502, the region division part 1011 divides the block of the process target into the region_1 to the region_16.

In step S1503, SAO parameter changing part 1012 determines SAO parameters related to the region band offset process for each of the region_1 and the region_13. Specifically, the SAO parameter change part 1012 determines a band position, four offset absolute values, and four offset signs for each of the region_1 and the region_13. The SAO parameter change part 1012 outputs the determined SAO parameters related to the region band offset process to the SAO parameter calculation part 1013.

In step S1504, the SAO parameter calculation part 1013 calculates each of band positions of the region_2 to the region_12 and the region_14 to the region_16. In this case, the four offset absolute values and the four offset signs for each of the region_2 to the region_12 and the region_14 to the region_16 are determined to be the same values as those for the region_1 or the region_13. The four offset absolute values may be the same value (one value) and four offset signs may be the same value (one value).

In step S1505, the pixel value change part 1014 changes the pixel value for each of the 16 regions using the determined or calculated SAO parameters related to the region band offset process.

<4.8 Details of Signaling Process (Step S1104) by Encoder According to the First Embodiment>

Next, details of the signaling process (step S1104) by the encoder 110 according to the first embodiment will be described.

Figure 16:
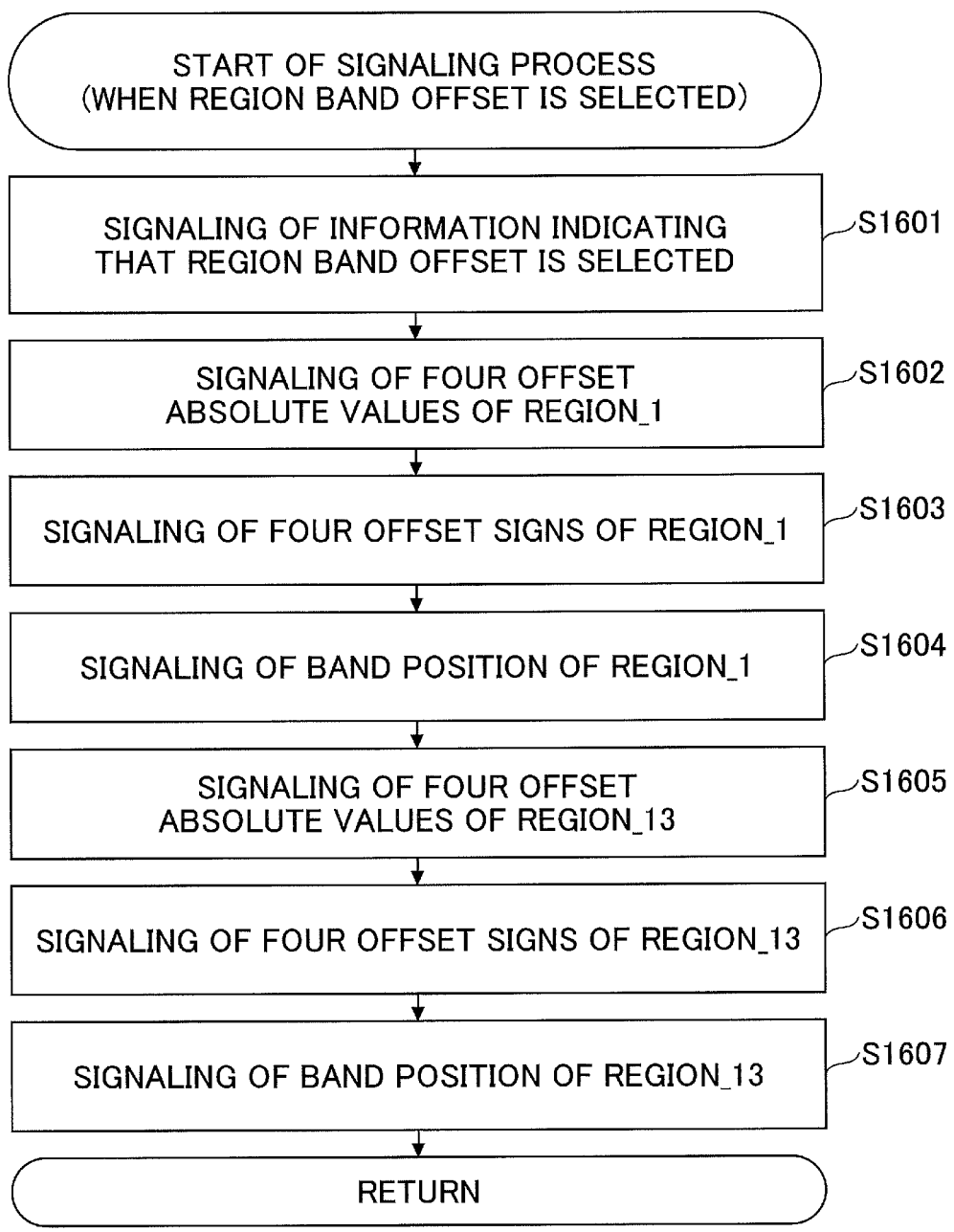
FIG. 16 is a flowchart illustrating a flow of a signaling process by the encoder according to the first embodiment.

FIG. 16 is a flowchart illustrating a flow of the signaling process by the encoder according to the first embodiment. Here, a case will be described in which, by a RD cost comparison performed by the selection part 1002, a process result of the region band offset process using the predetermined SAO parameter related to the region band offset process is determined as a lowest RD cost.

In step S1601, the selection part 1002 signals information indicating that the process result of the region band offset process is selected in the sample adaptive offset process.

In step S1602, the selection part 1002 signals four offset absolute values of the region_1 in the SAO parameters related to the region band offset process when the lowest RD cost is calculated as a process result.

In step S1603, the selection part 1002 signals four offset signs of the region_1 in the SAO parameters related to the region band offset process when the lowest RD cost is calculated as a process result.

In step S1604, the selection part 1002 signals a band position of the region_1 in the SAO parameters related to the region band offset process when the lowest RD cost is calculated as a process result.

In step S1605, the selection part 1002 signals four offset absolute values of the region_13 in the SAO parameters related to the region band offset process when the lowest RD cost is calculated as a process result.

In step S1606, the selection part 1002 signals four offset signs of the region_13 in the SAO parameters related to the region band offset process when the lowest RD cost is calculated as a process result.

In step S1607, the selection part 1002 signals a band position of the region_13 in the SAO parameters related to the region band offset process when the lowest RD cost is calculated as a process result.

<5. Functional Configuration of Decoder>

Next, a functional configuration of the decoder 120 realized by executing a decoding program will be described.

Figure 17:
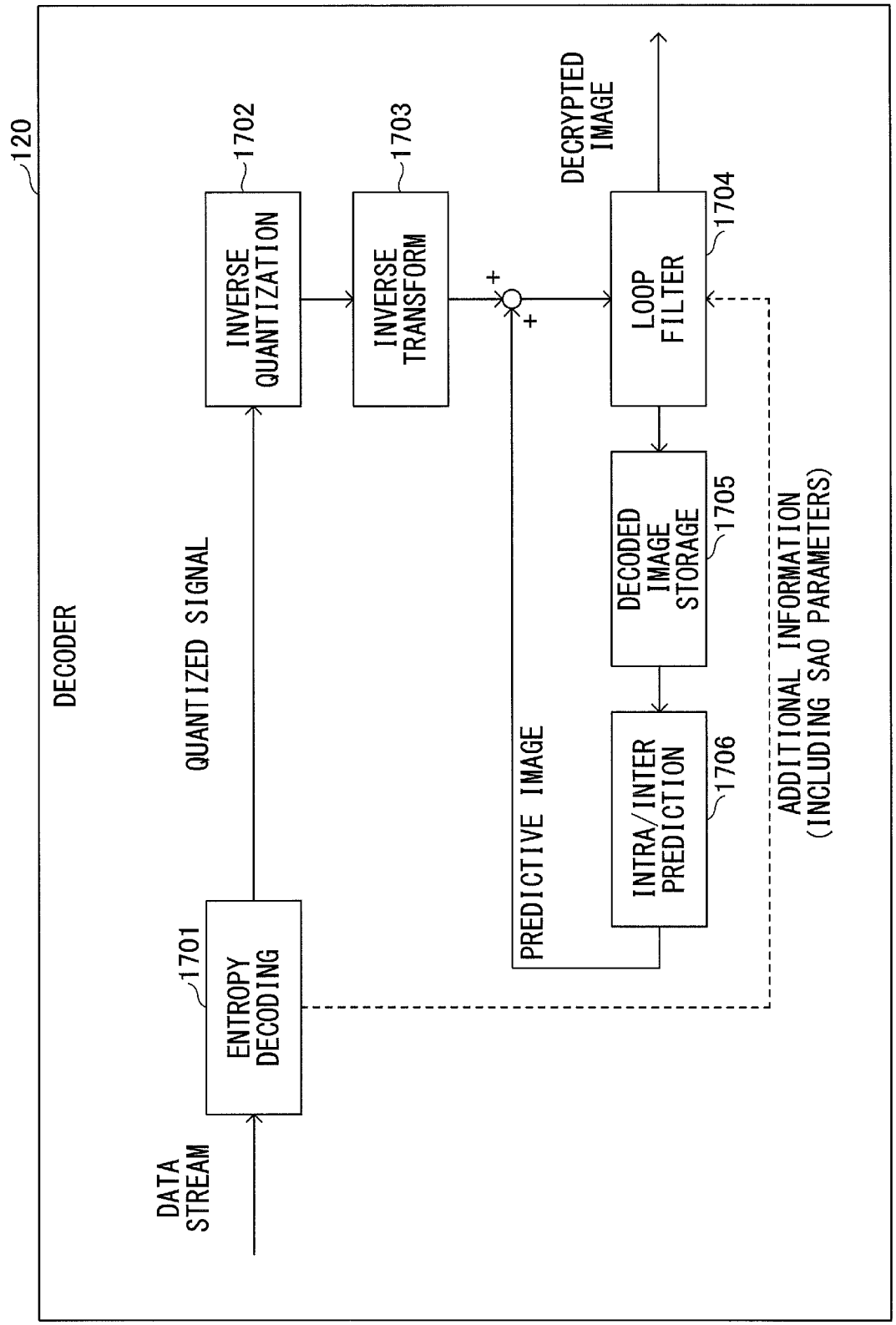
FIG. 17 is a diagram illustrating an example of a functional configuration of a decoder according to the first embodiment.

FIG. 17 is a diagram illustrating an example of a functional configuration of the decoder. As illustrated in FIG. 17, the decoder 120 includes an entropy decoding component 1701, an inverse quantization component 1702, an inverse transform component 1703, a loop filter component 1704, a decoded image storage component 1705, and an intra/inter prediction component 1706.

The entropy decoding component 1701 decodes a received data stream and outputs a quantized signal. In addition, the entropy decoding component 1701 extracts accompanied information (including SAO parameters used by the loop filter component 1704) from the received data stream, and notifies the loop filter component 1704 of the extracted information.

The inverse quantization component 1702 inversely quantizes the quantized signal and outputs the inversely quantized signal to the inverse transform component 1703. The inverse transform component 1703 obtains a predicted residual signal by performing an inverse orthogonal transform process with respect to the inversely quantized signal.

For example, the predicted residual signal obtained by the inverse transform component 1703 is added to a block of a predicted image, to which a motion-compensation is conducted by the intra/inter prediction component 1706 to generate a decoded image, and input to the loop filter component 1704.

The loop filter component 1704 performs a filter process for reducing coding noise of an input decoded image using the accompanied information received from the entropy decoding component 1701. By the loop filter component 1704 performing the filter process, it is possible to prevent image quality deterioration from propagating between frames of the decoded images. Note that the loop filter component 1704 further includes a deblocking filter 1810, a sample adaptive offset filter 1820, and an adaptive loop filter 2002 (details will be described later with reference to FIG. 18 and FIG. 20).

Moreover, the loop filter component 1704 outputs the decoded image, to which the filter process is conducted, as a decoding result, and stores the decoded image in the decoded image storage component 1705.

The intra/inter prediction component 1706 performs the intra prediction for generating a block of a predicted image using each block of the decoded image. Also, the intra/inter prediction component 1706 performs the motion compensation with respect to blocks of frames of the decoded images, and performs the inter prediction to generate blocks of the predicted images.

Furthermore, the intra/inter prediction component 1706 outputs a predicted image including either blocks generated by intra prediction or blocks generated by inter prediction. The predicted residual signal obtained by the inverse transform component 1703 is added to the output predicted image, and is input as a decoded image into the loop filter component 1704 as a decoded image.

<6. Description of Loop Filter>

Next, details of the loop filter component 1704 of the decoder 120 will be described. In the following, in explaining details of the loop filter component 1704 of the decoder 120, first, details of a general loop filter component 1704g (H.265/HEVC) of a decoder 120g will be described as a comparison target. Hereinafter, from a section "6.1" to a section "6.2", the details of the loop filter component of the general decoder 120g will be described. Thereafter, in a section "6.3" to a section "6.5", details of the loop filter component 1704 of the decoder 120 according to the first embodiment will be described.

<6.1 Functional Configuration of Loop Filter Component of General Decoder>

Figure 18:
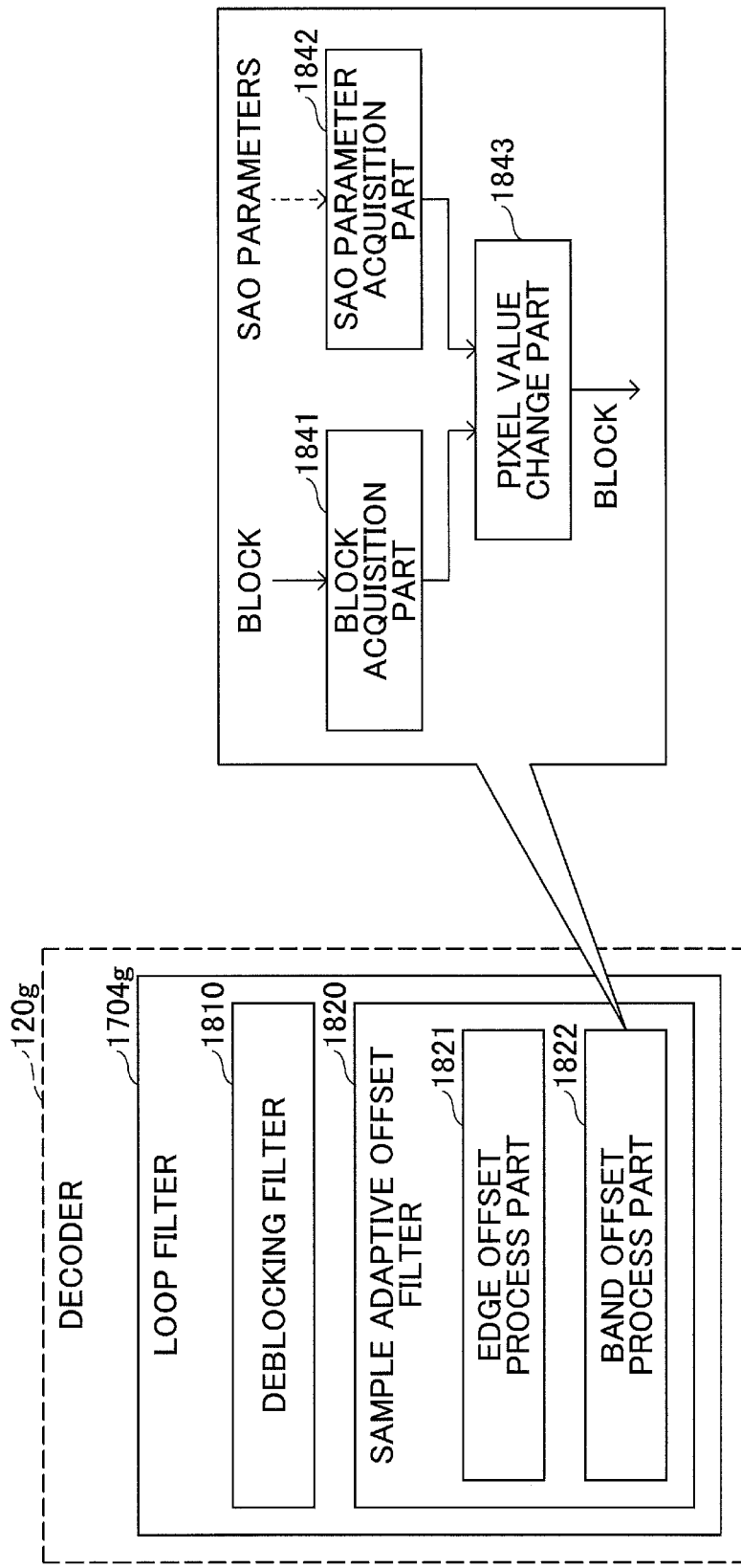
FIG. 18 is a diagram illustrating an example of the functional configuration of the loop filter part of the general decoder.

FIG. 18 is a diagram illustrating an example of the functional configuration of the loop filter component of the general decoder. As illustrated in FIG. 18, the general decoder 120g of the loop filter component 1704g includes a deblocking filter 1810 and the sample adaptive offset filter 1820.

The deblocking filter 1810 performs a filter process on each block of the decoded image to reduce distortion generated at a block boundary when the encoder 110 encodes each block of the image data. The sample adaptive offset filter 1820 classifies each block of the decoded image, to which the deblocking filter 1810 conducted the filter process, on a pixel basis, and adds an offset value corresponding to the classification to each pixel.

Note that the sample adaptive offset filter 1820 further includes an edge offset process part 1821 and a band offset process part 1822, and executes any one of the process parts 1821 and 1822 based on the accompanied information received from the entropy decoding part 1701.

The edge offset process part 1821 classifies an edge state according to a magnitude relation among three pixels that are continuous in a direction designated as an edge offset class. Moreover, the edge offset process part 1821 adds an offset value corresponding to the classification of the edge state to a pixel value of each block of the decoded image.

The band offset process part 1822 divides the gradation of the pixel value, which is able to be taken by the decoded image into 32 bands, selects four bands having a continuous gradation from among the 32 bands, and adds (or subtracts) a predetermined offset value to (or from) pixel values belonging to any one of four bands.

Specifically, the band offset process part 1822 further includes a block acquisition part 1841, an SAO parameter acquisition part 1842, and a pixel value change part 1843. The block acquisition part 1841 reads a block of a process target acquired by the sample adaptive offset filter 1820, and notifies the pixel value change part 1843 of the read block. The SAO parameter acquisition part 1842 acquires SAO parameters related to band offset process included in the accompanied information and outputs the SAO parameters to the pixel value change part 1843.

The pixel value change part 1843 changes pixel values of the block of the process target using the SAO parameters related to the band offset process output from the SAO parameter acquisition part 1842. Moreover, the pixel value change part 1843 outputs the block whose pixel values are changed.

<6.2 Flow of Sample Adaptive Offset Process by Sample Adaptive Offset Filter of General Decoder>

Next, a flow of the sample adaptive offset process by the sample adaptive offset filter 1820 of the general decoder will be described.

Figure 19:
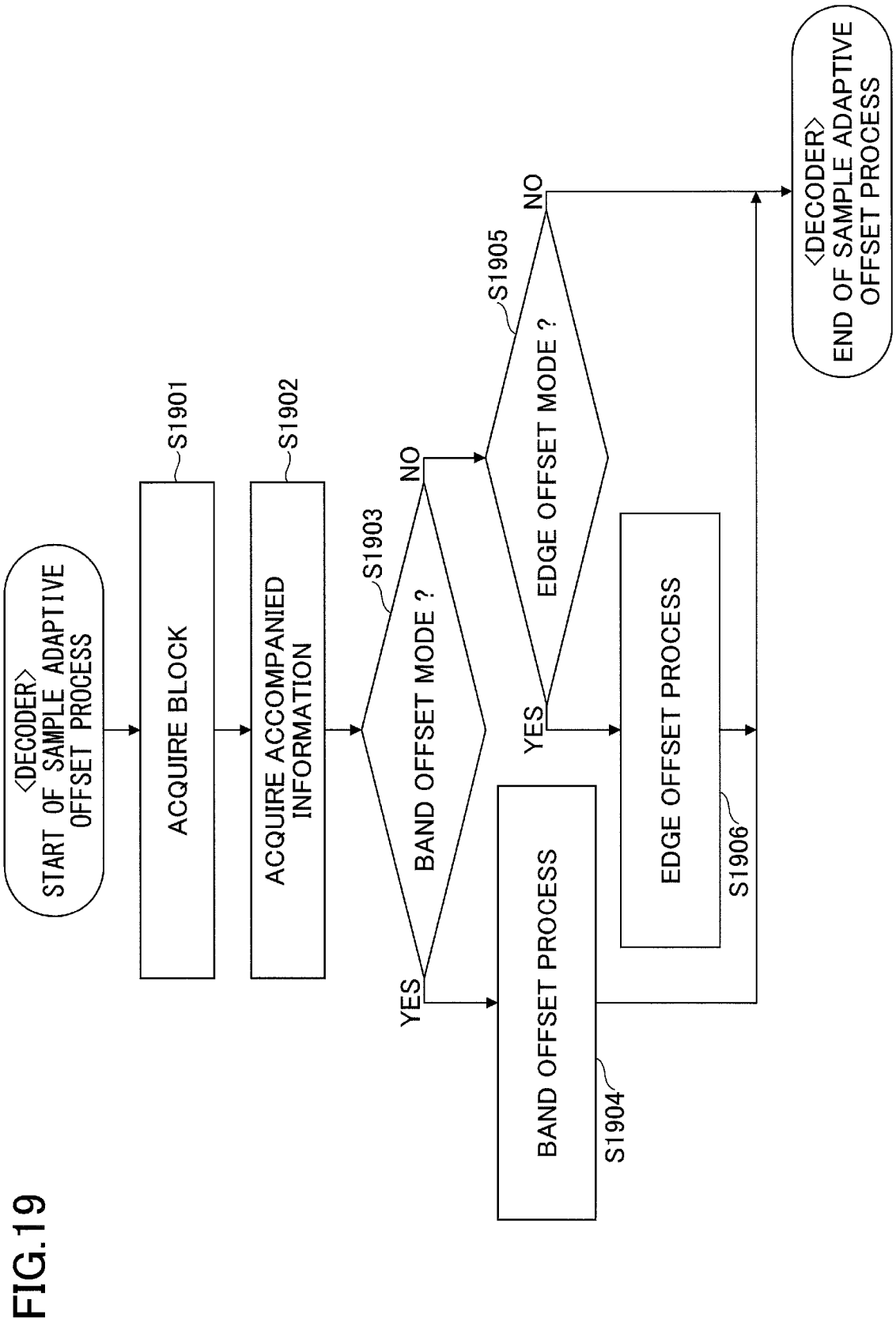
FIG. 19 is a flowchart illustrating a flow of the sample adaptive offset process by the general decoder.

FIG. 19 is a flowchart illustrating a flow of the sample adaptive offset process by the general decoder.

In response to a completion of the deblocking filter process by the deblocking filter 1810 with respect to the block of the process target, the sample adaptive offset filter 1820 starts the sample adaptive offset process illustrated in FIG. 19.

In step S1901, the sample adaptive offset filter 1820 acquires the block of the process target.

In step S1902, the sample adaptive offset filter 1820 acquires accompanied information from the entropy decoding part 1701.

In step S1903, the sample adaptive offset filter 1820 determines whether an offset mode is a band offset mode based on the acquired accompanied information. If the sample adaptive offset filter 1820 determines in step S1903 that a current mode is the band offset mode (Yes in step S1903), the sample adaptive offset filter 1820 advances to step S1904.

In step S1904, the band offset process part 1822 executes the band offset process using the SAO parameters related to the band offset process included in the accompanied information. Specifically, the SAO parameter acquisition part 1842 acquires the SAO parameters related to the band offset process included in the accompanied information, and the block acquisition part 1841 reads the acquired block of the process target. Furthermore, the pixel value change part 1843 changes the pixel values of the block of the process target.

Conversely, if the SAO parameter acquisition part 1842 determines in step S1903 that the current mode is not the band offset mode (No in step S1903), the SAO parameter acquisition part 1842 advances to step S1905.

In step S1905, the sample adaptive offset filter 1820 determines whether the offset mode is an edge offset mode. If the sample adaptive offset filter 1820 determines in step S1905 that the current mode is the edge offset mode (Yes in step S1905), the sample adaptive offset filter 1820 advances to step S1908.

In step S1909, the edge offset process part 1821 performs the edge offset process using SAO parameters related to the edge offset process included in the accompanied information.

Conversely, if the edge offset process part 1821 determines in step S1905 that the current mode is not the edge offset mode (No in step S1905), the edge offset process part 1821 determines that the offset mode is off, and the sample adaptive offset process with respect to the block of the process target is terminated.

<6.3 Functional Configuration of Loop Filter Component of Decoder According to the First Embodiment>

Next, a functional configuration of the loop filter component 1704 of the decoder 120 according to the first embodiment will be described.

Figure 20:
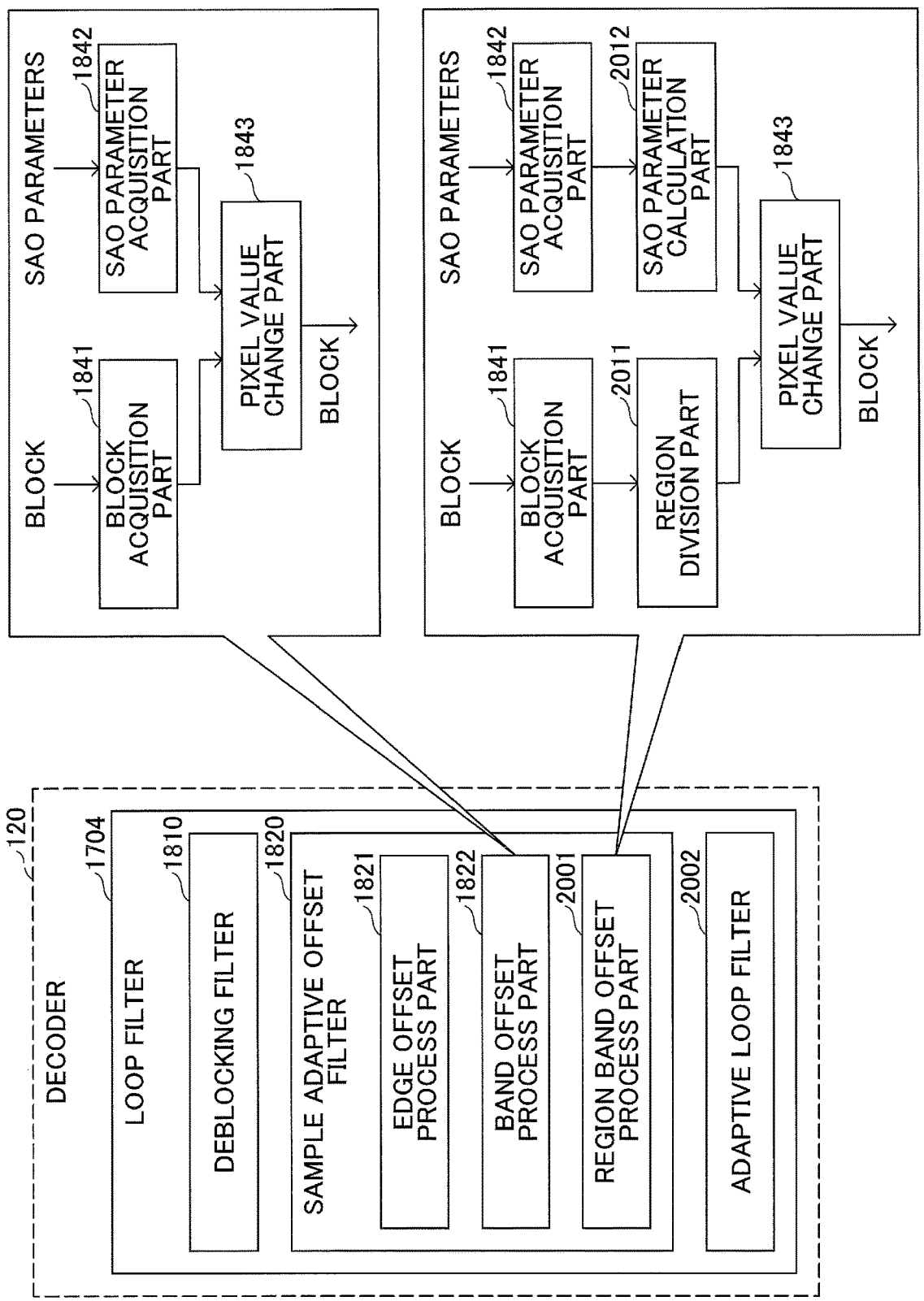
FIG. 20 is a diagram illustrating an example of a functional configuration of the loop filter part of the decoder according to the first embodiment.

FIG. 20 is a diagram illustrating an example of a functional configuration of the loop filter component of the decoder according to the first embodiment. The same functions as those of the loop filter component of the general decoder described with reference to FIG. 18 are denoted by the same reference numerals, and explanations thereof will be omitted.

Different from FIG. 18, the sample adaptive offset filter 1820 includes a region band offset process part 2001 and an adaptive loop filter 2002. The sample adaptive offset filter 1820 causes any one of the edge offset process part 1821, the band offset process part 1822, and the region band offset process part 2001 to execute based on the accompanied information received from the entropy decoding part 1701.

Instead of performing the band offset process for each block by the CTU as performed by the band offset process part 1822, the region band offset process part 2001 performs the band offset process by a region basis (a sub-block basis), which is acquired by dividing a block of the CTU into a plurality of regions (sub-blocks).

In order to perform the band offset process by the region basis, the region band offset process part 2001 includes the block acquisition part 1841, a region division part 2011, the SAO parameter acquisition part 1842, a SAO parameter calculation part 2012, and the pixel value change part 1843.

Among these parts 1841, 2011, 1842, 2012, and 1843, the region division part 2011 divides the process target block read by the block acquisition part 1841 into 16 square regions (sub-blocks). The number of blocks to be processed may be more or less than 16 blocks. The region division part 2011 sequentially outputs the regions obtained by dividing the block to the pixel value change part 1843.

The SAO parameter acquisition part 1842 acquires SAO parameters related to the region band offset process. In the first embodiment, the SAO parameter acquisition part 1842 acquires SAO parameters related to the region band offset process with respect to two regions of the 16 regions divided by the region division part 2011: a region located at an upper left corner and a region located at a lower left corner. That is, the SAO parameter acquisition part 1842 acquires SAO parameters related to the region band offset process with respect to two regions (first sub-blocks): a region including an upper left vertex and a region including a lower left vertex from among four vertices of the block of the process target.

The SAO parameter calculation part 2012 calculates SAO parameters related to the region band offset process with respect to remaining regions (second sub-blocks) other than the two regions (the first sub-blocks). Specifically, the SAO parameter calculation part 2012 calculates the SAO parameters for the remaining regions by performing the interpolation process using the SAO parameters related to the region band offset process with respect to two regions. When performing the interpolation process, the SAO parameter calculation part 2012 uses a positional relationship between the two regions and the remaining regions in the block of the process target. The SAO parameter calculation part 2012 outputs the acquired or calculated SAO parameters related to the region band offset process for each of the 16 regions to the pixel value change part 1843.

The pixel value change part 1843 changes the pixel value for each region of the block of the process target using the SAO parameters related to the region band offset process output from the SAO parameter calculation part 2012. Furthermore, the pixel value change part 1843 outputs the block, in which the pixel values of each of the 16 regions are changed, to the adaptive loop filter 2002.

The adaptive loop filter 2002 performs a filter process for each block of the decoded image, to which the offset process is conducted by the sample adaptive offset filter 520 in order to reduce errors from the input image.

<6.4 Flow of Sample Adaptive Offset Process by Sample Adaptive Offset Filter of Decoder According to the First Embodiment>

Next, a flow of the sample adaptive offset process by the sample adaptive offset filter 1820 of the decoder 120 according to the first embodiment will be described.

Figure 21:
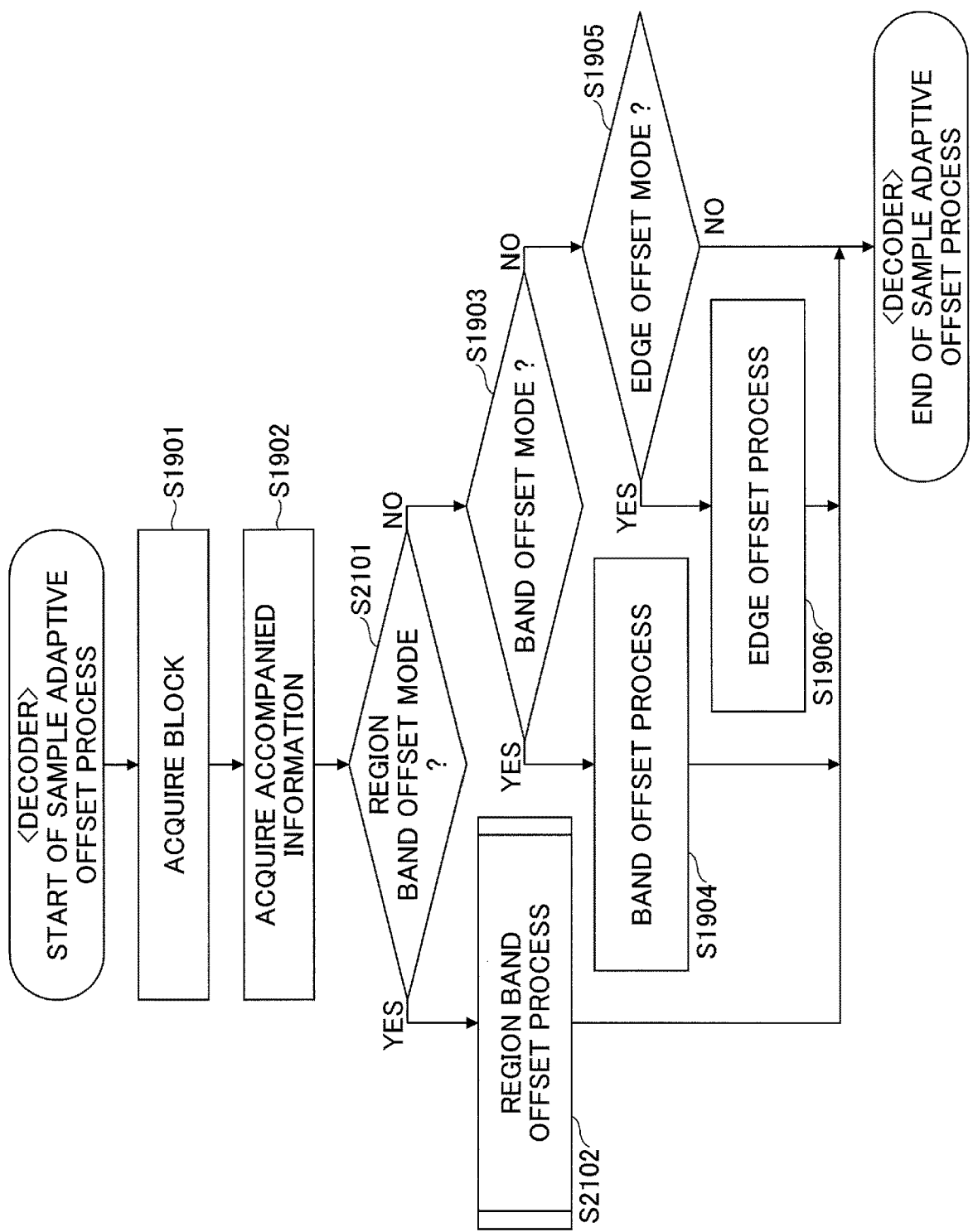
FIG. 21 is a flowchart illustrating a flow of a sample adaptive offset process performed by the decoder according to the first embodiment.

FIG. 21 is a flowchart illustrating a flow of the sample adaptive offset process performed by the decoder according to the first embodiment. Note that the same steps as those in the flowchart of the sample adaptive offset process by the general decoder described with reference to FIG. 19 are denoted by the same reference numerals, and description thereof will be omitted.

Different from FIG. 19, steps S2101 to S2102 are conducted. In step S2101, the sample adaptive offset filter 1820 determines whether the offset mode is the region band offset mode based on the acquired accompanied information. If the sample adaptive offset filter 1820 determines in step S2101 that the offset mode is the region band offset mode (if Yes in step S2101), the process advances to step S2102.

In step S2102, the region band offset process part 2001 performs the region band offset process with respect to the process target block. The region band offset process by the decoder 120 will be described in detail below.

<6.5 Details of Region Band Offset Process (Step S2102) by Decoder According to the First Embodiment>

Figure 22:
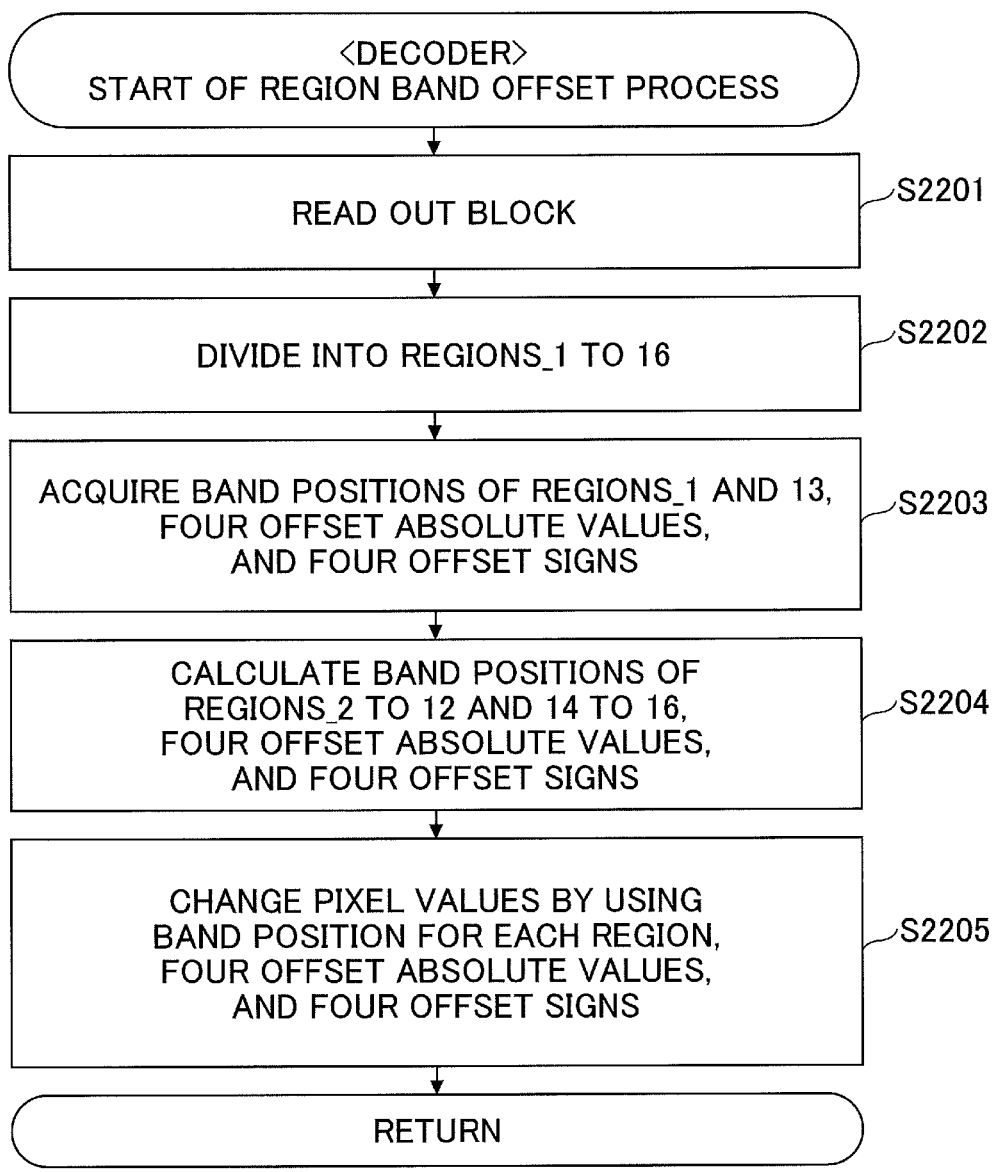
FIG. 22 is a flowchart illustrating a flow of the region band offset process by the decoder according to the first embodiment.

FIG. 22 is a flowchart illustrating a flow of the region band offset process by the decoder according to the first embodiment.

In step S2201, the block acquisition part 1841 reads the block of the process target.

In step S2202, the region division part 2011 divides the block of the process target into 16 regions, the region_1 to the region_16.

In step S2203, the SAO parameter acquisition part 1842 acquires SAO parameters related to the region band offset process included in the accompanied information. Specifically, the SAO parameter acquisition part 1842 acquires band positions of the region_1 and the region_13 of the block of the process target, four offset absolute values, and the four offset signs.

In step S2204, the SAO parameter calculation part 2012 calculates band positions of the region_2 through the region_12 and the region_14 through the region_16 based on the acquired region_1 and region_13. Moreover, the SAO parameter calculation part 2012 determines four offset absolute values and four offset signs for each of the region_2 through the region_12 and the region_14 through the region_16, by using four offset absolute values and four offset signs for the region_1 or the region_13 acquired by the SAO parameter acquisition part 1842.

In step S2205, the pixel value change part 1843 changes pixel values for each of the region_1 through the region_16 of the block of the process target by using the band position, the four offset absolute value, and the four offset signs for each of the region_1 through the region_16, which are determined by the SAO parameter calculation part 2012.

<7. Summary>

As is clear from the above description, the sample adaptive offset filter 520 of the encoder 110 according to the first embodiment includes the region band offset process part 1001 in addition to the edge offset process part 521 and the band offset process part 522. The region band offset process part 1001 performs:

dividing a block of the coded unit into 16 regions (sub-blocks) and determining band positions with respect to two regions (a region of an upper left corner and a lower left corner), calculating band positions of remaining regions by performing an interpolation process using the determined positions of the two regions, executing a band offset process (region band offset process) with respect to each of the 16 regions by using band positions of the 16 regions, which are determined or calculated, and signaling band positions of the two regions among band positions of the 16 regions used for a calculation of the determined process result. Then, the SAO parameters, which are related to the region band offset process and include the signaled band positions, are sent to the decoder 120 as accompanied information.

Moreover, the sample adaptive offset filter 1820 of the decoder 120 according to the first embodiment includes the region band offset process part 2001 in addition to the edge offset process part 1821 and the band offset process part 1822. The sample adaptive offset filter 1820 performs:

dividing a block of a decoded unit and acquiring band positions of two regions included in the accompanied information, calculating band positions of remaining regions by conducting the interpolation process using the acquired band positions of the two regions, and executing the band offset process (the region band offset process) with respect to each of 16 regions by using the acquired or calculated band positions corresponding to the 16 regions.

As described above, the encoder 110 and the decoder 120 according to the first embodiment conduct the band offset process (the region band offset process) by the region basis. Therefore, according to the encoder 110 and the decoder 120 in the first embodiment, compared with general encoder 110g and decoder 120g, it is possible for the sample adaptive offset filter 1820 to improve effect of image quality improvement even in a case in which a block size of the CTU is large.

Moreover, the encoder 110 according to the first embodiment signals the band positions of the two regions, instead of signaling each of the band positions of the 16 regions. According to the encoder 110 according to the first embodiment, it is possible to reduce an increase in an amount of the accompanied information even in a case in which the band offset process is performed by the region basis.

Second Embodiment

In the first embodiment, when a block of a coding unit is divided into 16 regions, the SAO parameter change part 1012 determines band positions for two regions (a region at an upper left corner and a region at a lower left corner).

However, the method for determining the band position is not limited to this manner, and the band position may be determined for three regions (a region at an upper left corner, a region at a lower left corner, and a region at an upper right corner). That is, the band positions may be determined for the three regions (first sub-blocks) of a region including an upper left vertex, a region including an upper right vertex, and a region including a lower left vertex among four vertices of a process target block.

Hereinafter, the second embodiment will be described focusing on the region band offset process (step S1101) in the encoder 110, which is different from the first embodiment (explanations of the decoder 120 will be omitted).

<1. Details of Region Band Offset Process (Step S1101) in Encoder According to the Second Embodiment>

(1) Process Contents of SAO Parameter Calculation Part

In the second embodiment, the SAO parameter change part 1012 determines band positions of three regions. Moreover, the SAO parameter calculation part 1013 uses the band positions of the three regions output from the SAO parameter change part 1012 to calculate the band positions of remaining regions.

Specifically, the SAO parameter calculation part 1013 calculates the band positions of the remaining regions by performing the interpolation process using the band positions of the three regions. When performing the interpolation process, the SAO parameter calculation part 1013 uses a positional relationship between the three regions in the process target block and the remaining regions.

Figure 23:
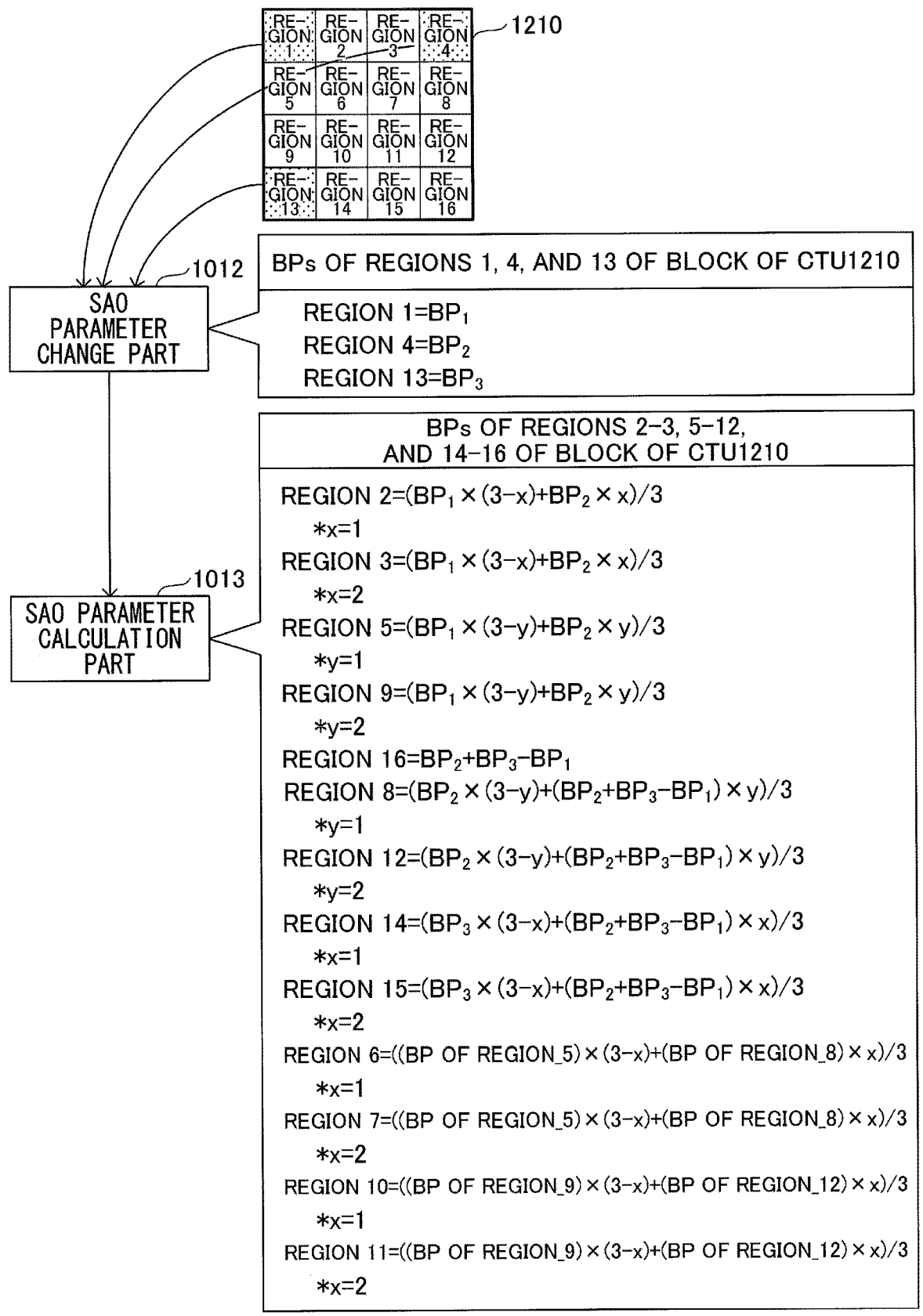
FIG. 23 is a diagram illustrating a calculation method for calculating a band position for each region in a region band offset process performed by the encoder according to a second embodiment.

FIG. 23 is a diagram illustrating a calculation method for calculating a band position for each region in a region band offset process performed by the encoder according to the second embodiment. As depicted in FIG. 23, the SAO parameter change part 1012 determines band positions "$BP_1$", "$BP_2$", and "$BP_3$" for a region_1, a region_4, and a region_13 among 16 regions, that is, the region_1 through a region_16 of a block of the CTU1210.

The SAO parameter calculation part 1013 calculates band positions of remaining regions (a region_2, a region_3, a region_5 to a region_12, and a region_14 to the region_16), based on the band position "$BP_1$", "$BP_2$", and the "$BP_3$" output from the SAO parameter change part 1012, as follows:

$$\text{band position of region\_2} = (BP_1 \times (3-x) + BP_2 \times x)/3, \quad \text{[Formula (5)]}$$

where x is the number of regions counted from a region at a leftmost column. Here, x=1.

$$\text{band position of region\_3} = (BP_1 \times (3-x) + BP_2 \times x)/3, \quad \text{[Formula (6)]}$$

where x is the number of regions counted from the region at the leftmost column. Here, x=2.

$$\text{band position of region\_5} = (BP_1 \times (3-y) + BP_2 \times y)/3, \quad \text{[Formula (7)]}$$

where y is the number of regions counted from the region at a topmost row. Here, y=1.

$$\text{band position of region\_9} = (BP_1 \times (3-y) + BP_2 \times y)/3, \quad \text{[Formula (8)]}$$

where y is the number of regions counted from the region at the topmost row. Here, y=2.

$$\text{band position of region\_10} = (BP_2 + BP_3 - BP_1) \quad \text{[Formula (9)]}$$

$$\text{band position of region\_8} = (BP_2 + BP_3 - BP_1) = (BP_2 \times (3-y) + (BP_2 + BP_3 - BP_1) \times y)/3, \text{ here, } y=1. \quad \text{[Formula (10)]}$$

$$\text{band position of region\_8} = (BP_2 \times (3-y) + (BP_2 + BP_3 - BP_1) \times y)/3, \text{ here, } y=2. \quad \text{[Formula (11)]}$$

$$\text{band position of region\_14} = (BP_3 \times (3-x) + (BP_2 + BP_3 - BP_1) \times x)/3, \text{ here, } x=1. \quad \text{[Formula (12)]}$$

$$\text{band position of region\_15} = (BP_3 \times (3-x) + (BP_2 + BP_3 - BP_1) \times x)/3, \text{ here, } x=2. \quad \text{[Formula (13)]}$$

$$\text{band position of region\_6} = ((BP \text{ of region\_5}) \times (3-x) + (BP \text{ of region\_8}) \times x)/3, \text{ here, } x=1. \quad \text{[Formula (14)]}$$

$$\text{band position of region\_7} = ((BP \text{ of region\_5}) \times (3-x) + (BP \text{ of region\_8}) \times x)/3, \text{ here, } x=2. \quad \text{[Formula (15)]}$$

$$\text{band position of region\_10} = ((BP \text{ of region\_9}) \times (3-x) + (BP \text{ of region\_12}) \times x)/3, \text{ here, } x=1. \quad \text{[Formula (16)]}$$

band position of region_11=((BP of region_9)×(3−x)+(BP of region_12)×x)/3, here, x=2.  [Formula (17)]

(2) Flow of Region Band Offset Process

Subsequently, a detailed flowchart of the region band offset process (step S1101) by the encoder 110 according to the second embodiment will be described.

Figure 24:
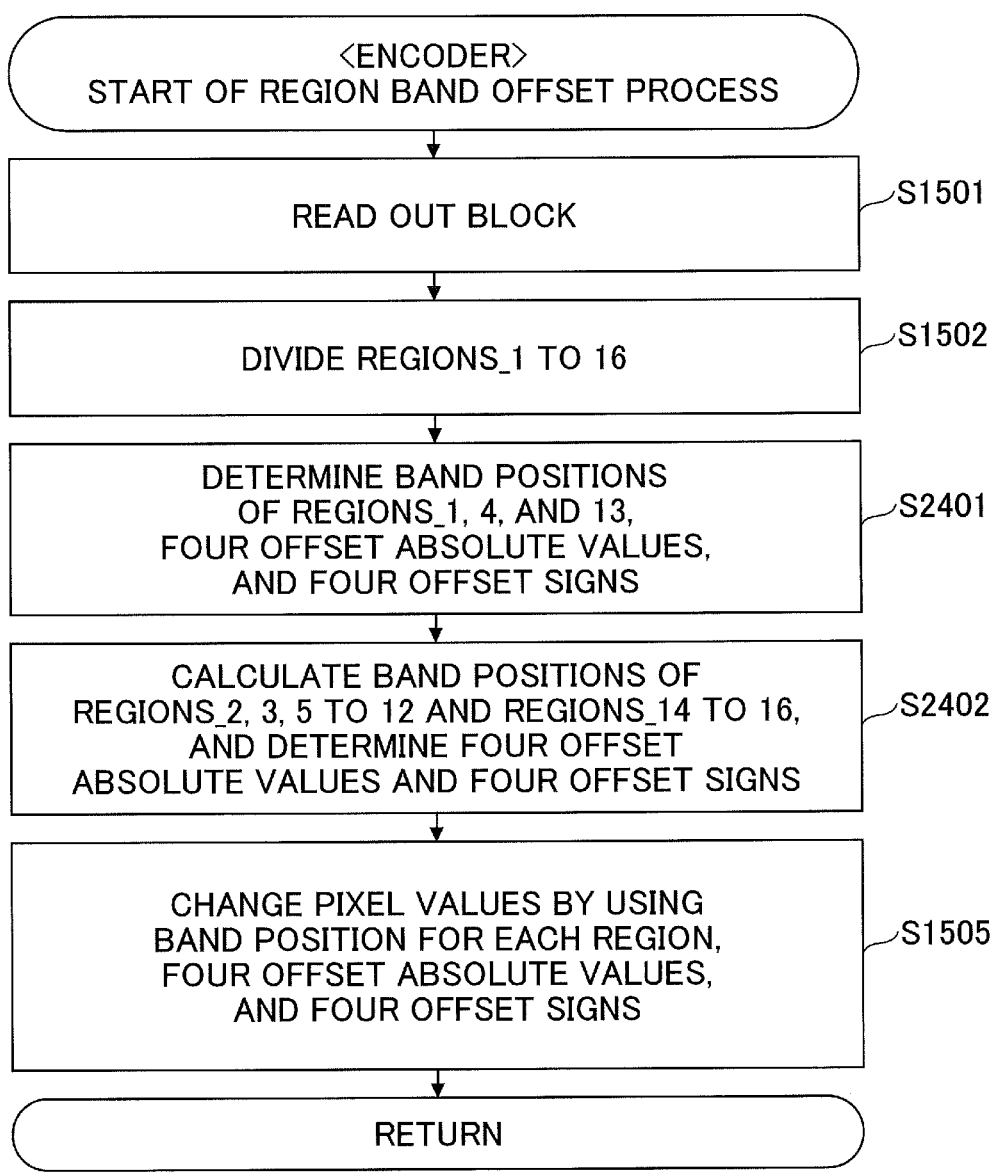
FIG. 24 is a flowchart illustrating a flow of the region band offset process performed by the encoder according to the second embodiment.

FIG. 24 is a flowchart illustrating a flow of the region band offset process performed by the encoder according to the second embodiment. Different from the region band offset process by the encoder 110 according to the first embodiment in FIG. 15, steps S2401 and S2402 are conducted, instead of steps S1503 and S1504.

In step S2401, the SAO parameter change part 1012 determines the SAO parameters related to the region band offset process for each of the region_1, the region_4, and the region_13. Specifically, the SAO parameter change part 1012 determines band positions, four offset absolute values and four offset signs for each of the region_1, the region_4, and the region_13. The SAO parameter change part 1012 outputs the determined SAO parameters related to the region band offset process to the SAO parameter calculation part 1013.

In step S2402, the SAO parameter calculation part 1013 calculates a band position for each of the region_2, the region_3, region_5 to the region_12, and the region_14 to the region_16. Four offset absolute values and four offset signs for each of the region_2, the region_3, the region_5 to the region_12, and the region_14 to the region_16 are defined as the same values as any one of the region_1, region_4, and region_13, that is, a single value for the four offset absolute values and a single value for the four offset signs are defined.

<2. Details of Signaling Process (Step S1104) by Encoder According to the Second Embodiment>

Next, details of the signaling process (step S1104) by the encoder 110 according to the second embodiment will be described.

Figure 25:
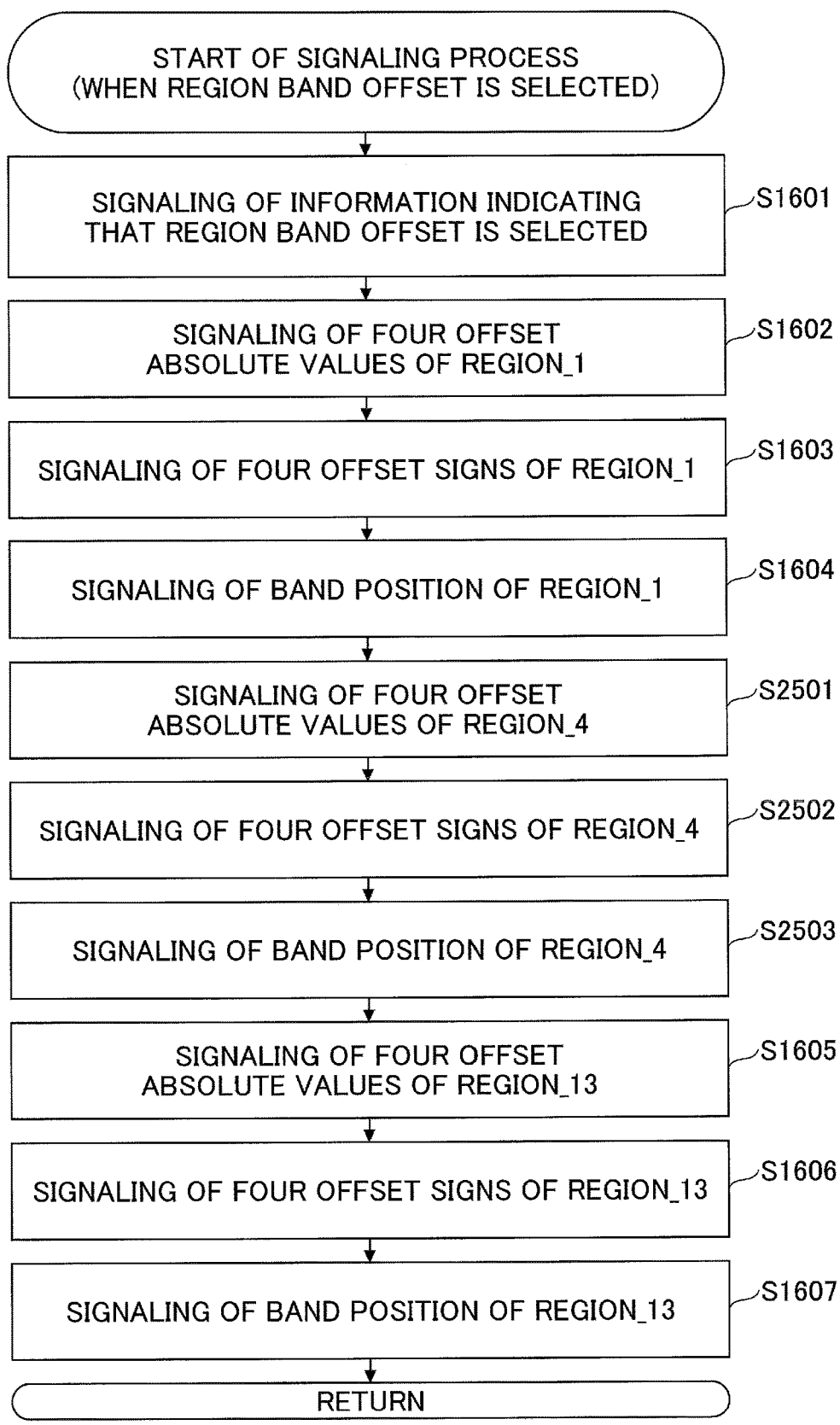
FIG. 25 is a flowchart for explaining a flow of the signaling process performed by the encoder according to the second embodiment.

FIG. 25 is a flowchart for explaining a flow of the signaling process performed by the encoder according to the second embodiment.

Here, a description will be given on an assumption that a process result of the region band offset process using predetermined SAO parameters related to the region band offset process is determined as a result with the lowest RD cost based on the RD cost comparison. Different from the signaling process (step S1104) by the encoder 110 according to the first embodiment in FIG. 16, steps S2501 to S2503 are additionally conducted in the second embodiment. Thus, steps S2501 to S2503 will be described below.

In step S2501, the selection part 1002 signals four offset absolute values for the region_4, which are SAO parameters related to the region band offset process in a case in which a processing result with the lowest RD cost is calculated.

In step S2502, the selection part 1002 signals four offset signs for the region_4, which are the SAO parameters related to the region band offset process in a case in which a processing result with the lowest RD cost is calculated.

In step S2503, when a process result with the lowest RD cost is calculated, the selection part 1002 signals the band position of the region_4 as one of the SAO parameters related to the region band offset process.

<3. Summary>

As is clear from the above description, the sample adaptive offset filter of the encoder 110 according to the second embodiment includes the region band offset process part 1001 in addition to the edge offset process part 521 and the band offset process part 522, and conducts the following processes:

dividing a block of a coding unit into 16 regions (sub-blocks) and determining band positions for three regions (a region at an upper left corner, a region at an upper right corner, and a region at a lower left corner), calculating the band positions of remaining regions by conducting an interpolation process using the determined band positions of the three regions, and signaling band positions of the three regions (the region at the upper left corner, the region at the upper right corner, and the region at the lower left corner).

Subsequently, the SAO parameters related to the region band offset process including the signaled band positions are sent as accompanied information to the decoder 120.

As described above, the encoder 110 according to the second embodiment signals band positions of three regions instead of signaling all band positions of 16 regions. Therefore, according to the encoder 110 according to the second embodiment, even in a case in which the band offset process is performed on a region basis (that is, even in a case in which the region band offset process is performed), it is possible to reduce an increase in an information amount of the accompanied information.

In the above explanation, the sample adaptive offset filter 1820 of the decoder 120 is omitted; however, the same as in the first embodiment, processes other than a process in which the band positions of the remaining regions are calculated using the band positions of the three regions are the same as those in the first embodiment. That is, in a case of the encoder 110 and the decoder 120 according to the second embodiment, it is possible to obtain the same effects as those of the encoder and the decoder according to the first embodiment. In the first embodiment and the second embodiment, a block of a coding unit is divided into 16 regions (sub-blocks) and band positions are determined for two regions or three regions. However, the number of regions for determining the band position may be three or more.

Third Embodiment

In the first and second embodiments, when performing the band offset process, band positions of two or three regions among 16 regions are determined separately for each process target block.

However, the band position determination method is not limited to this. For example, in a determination method of the band positions, the band position, which is used when performing the region band offset process on a neighboring block of the CTU adjacent at an upper side or a left side, may be used.

Note that a mode using the band position used when the region band offset process is performed on neighboring block of the CTU adjacent to the upper side or the lower side is referred to as a "merge mode".

Hereinafter, a third embodiment will be described focusing on differences from the second embodiment.

In the following, in describing the details of the region band offset process in the merge mode, first, as a comparison target, the details of the band offset process in the general encoder 110g (in H.265/HEVC) in the merge mode will be described. Hereinafter, the band offset process in the merge mode in the general encoder 110g will be described in detail from section <1.> to section <4.>. Subsequently, details of the region band offset process in the merge mode in the encoder 110 according to the third embodiment will be described from section <5.> to section <8.>.

<1. Details of Band Offset Process (Step S605) by Merge Mode in General Encoder>

(1) Specific Example of Band Offset Process by Merge Mode in General Encoder

Figure 26:
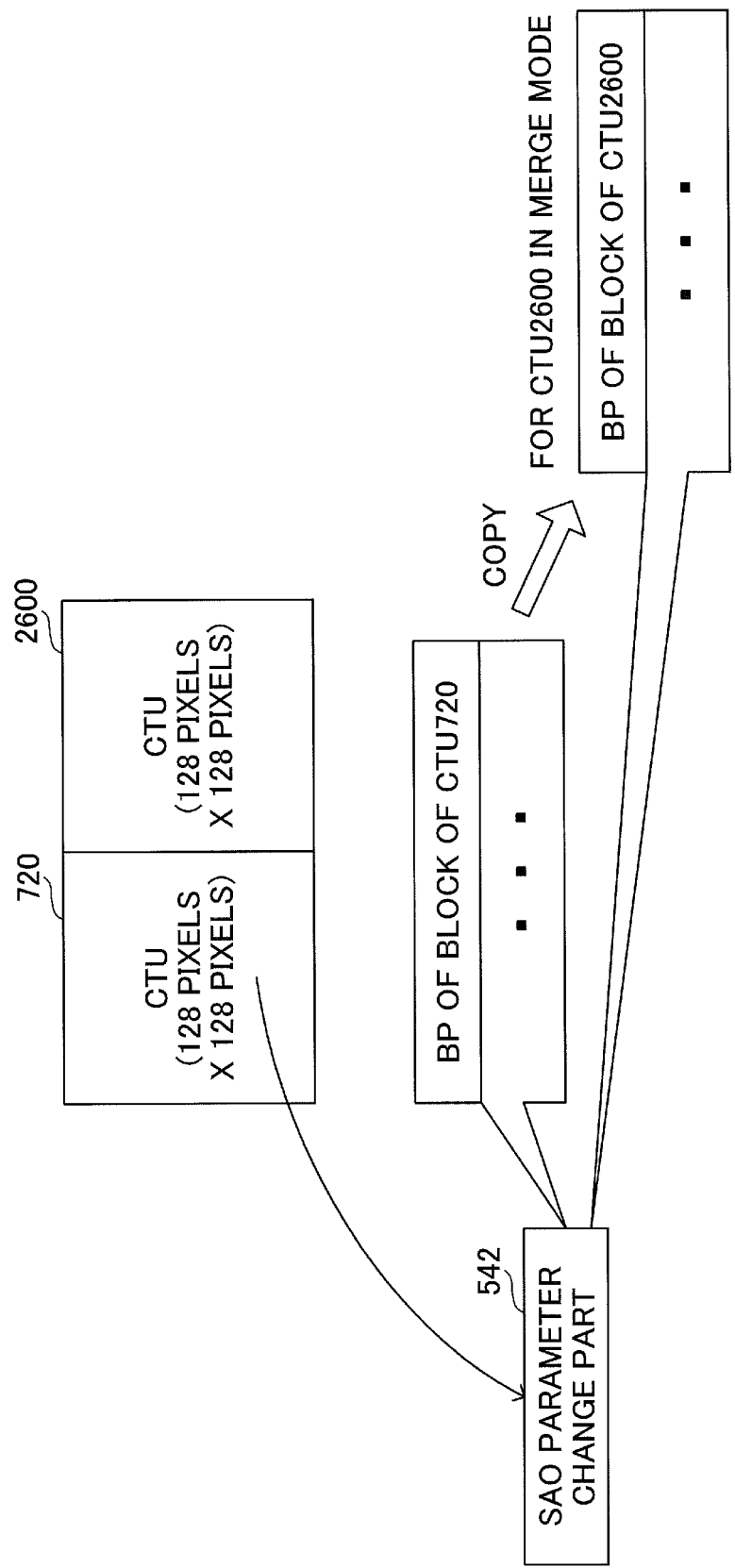
FIG. 26 is a diagram illustrating a determination method for determining a band position in the band offset process in a merge mode in the general encoder.

FIG. 26 is a diagram illustrating a determination method for determining a band position in band offset process in the merge mode in the general encoder. As illustrated in FIG. 26, the SAO parameter changing part 542 determines band positions for the block of the CTU720. Also, it is assumed that the pixel value change part 543 executes the band offset process using the determined band positions for the block of the CTU720, and the lowest RD cost is acquired as a process result.

In this case, the selection part 523 signals the band positions for the block of the CTU720, which are determined by the SAO parameter changing part 542.

Subsequently, it is assumed that the process target has shifted to the block of a CTU2600. At this time, it is assumed that the SAO parameter change part 542 applies the merge for the determination of the band positions for the block of the CTU2600.

In this case, the SAO parameter change part 542 copies and outputs the band position of the block of the CTU720 as the band position of the block of the CTU2600.

(2) Flow of Band Offset Process Including Merge Mode

Next, a detailed flowchart of band offset process (step S605) by the general encoder 110g in any one of modes including the merge mode will be described.

Figure 27:
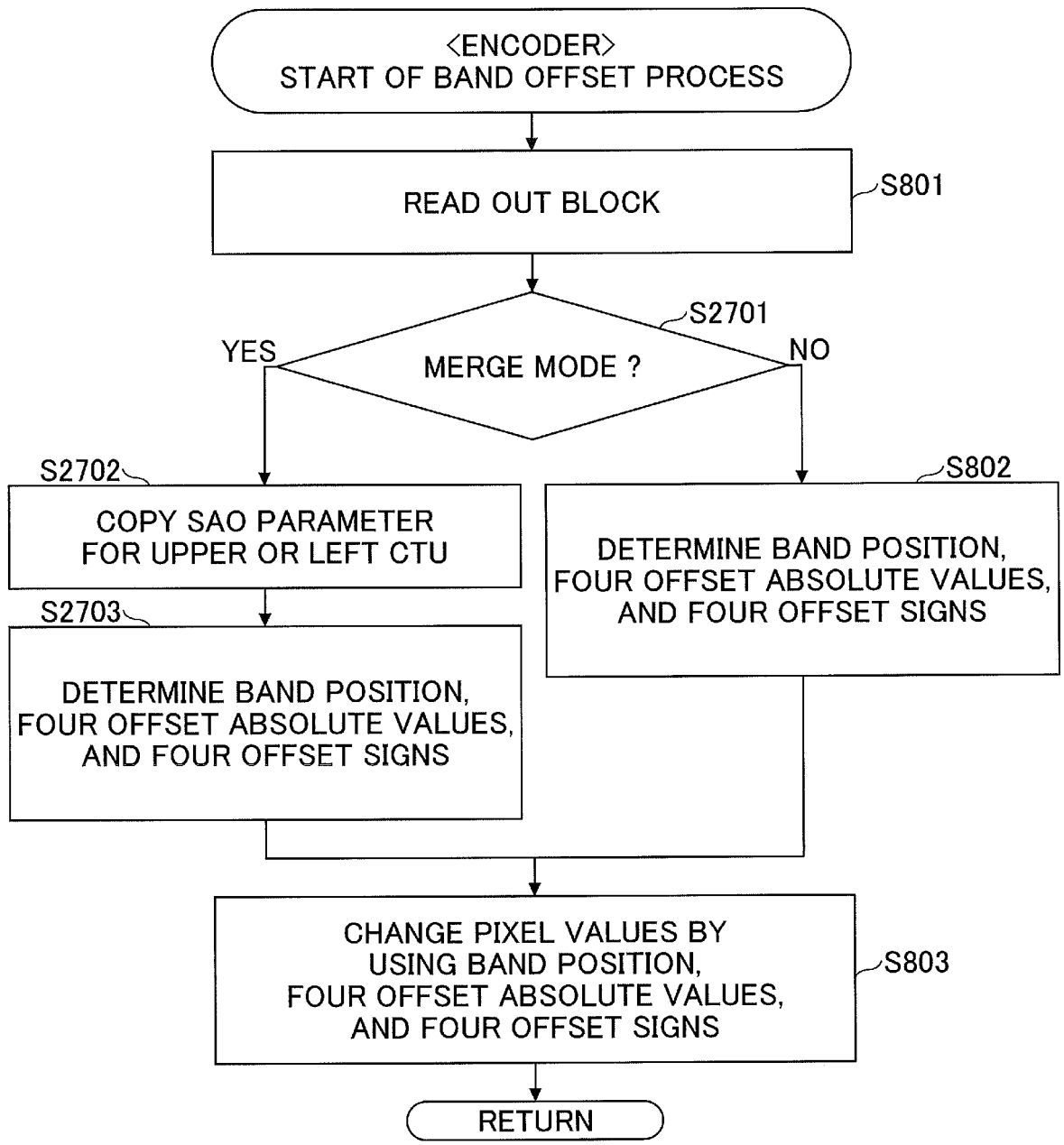
FIG. 27 is a flowchart for explaining a flow of the band offset process by the general encoder in any one of modes including the merge mode.

FIG. 27 is a flowchart for explaining a flow of the band offset process by the general encoder in any one of modes including the merge mode. Note that difference from the band offset process by the general encoder 110g described with reference to FIG. 8, steps S2701 to S2703 are conducted.

In step S2701, the SAO parameter change part 542 determines whether or not to conduct the band offset process in the merge mode for the process target block. When the SAO parameter change part 542 determines in step S2701 to conduct the band offset process (Yes in step S2701), the SAO parameter change part 542 advances to step S2702.

In step S2702, the SAO parameter change part 542 copies SAO parameters related to the band offset process for a neighboring block of the CTU adjacent at an upper side or for a neighboring block of the CTU adjacent at a left side.

In step S2703, the SAO parameter change part 542 determines SAO parameters related to the band offset process of the process target block based on the copied SAO parameters related to the band offset process. Specifically, the SAO parameter change part 542 determines band positions, four offset absolute values, and four offset signs for the process target block.

In a case of performing the band offset process in the merge mode, steps S602 to S604 and steps S606 to S608 depicted in the sample adaptive offset process in FIG. 6 are not performed, and a process result of the band offset process in the merge mode is output.

<2. Details of Signaling Process (Step S610) Including Merge Mode by General Encoder>

Next, details of the signaling process (step S610) by the general encoder 110g in any one of modes including the merge mode will be described. Here, it is assumed that, in a case in which the merge mode is not applied, a process for signaling SAO parameters related to the band offset process is conducted.

Figure 28:
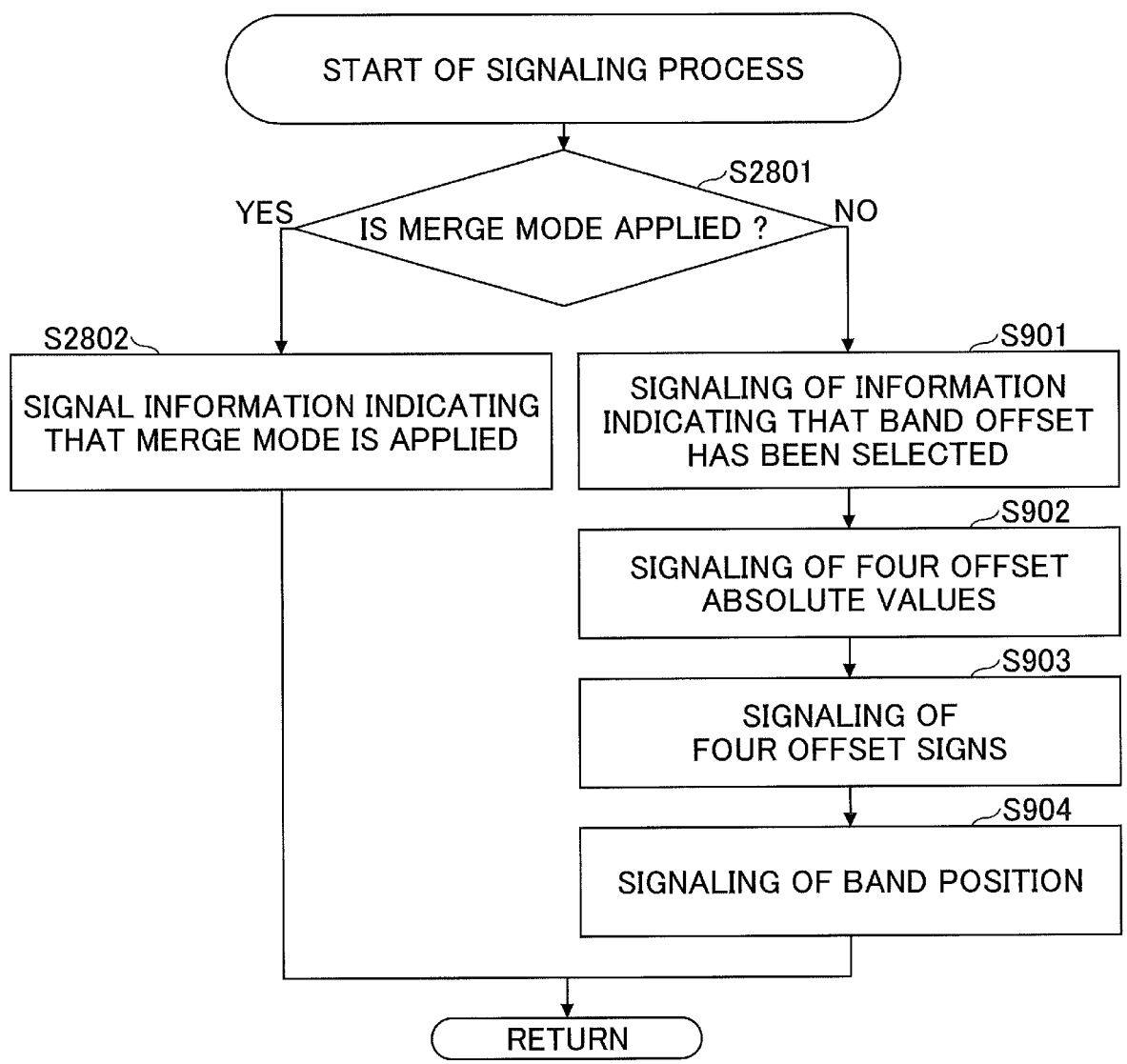
FIG. 28 is a flowchart for explaining a flow of a signaling process including the merge mode by a general encoder.

FIG. 28 is a flowchart for explaining a flow of a signaling process including the merge mode by the general encoder. Different from the signaling process described with reference to FIG. 9 in the first embodiment, steps S2801 to S2802 are conducted in the third embodiment.

In step S2801, the selection part 523 determines whether the merge mode is applied.

When the selection part 523 determines in step S2801 that the merge mode is applied, the selection part 523 advances to step S2802. In step S2802, the selection part 523 signals information indicating that the merge mode is applied.

<3. Flow of Sample Adaptive Offset Process Including Merge Mode by Sample Adaptive Offset Filter of General Decoder>

Next, the sample adaptive offset process including the merge mode by the sample adaptive offset filter 1820 of the general decoder 120g (in H.265/HEVC) will be described.

Figure 29:
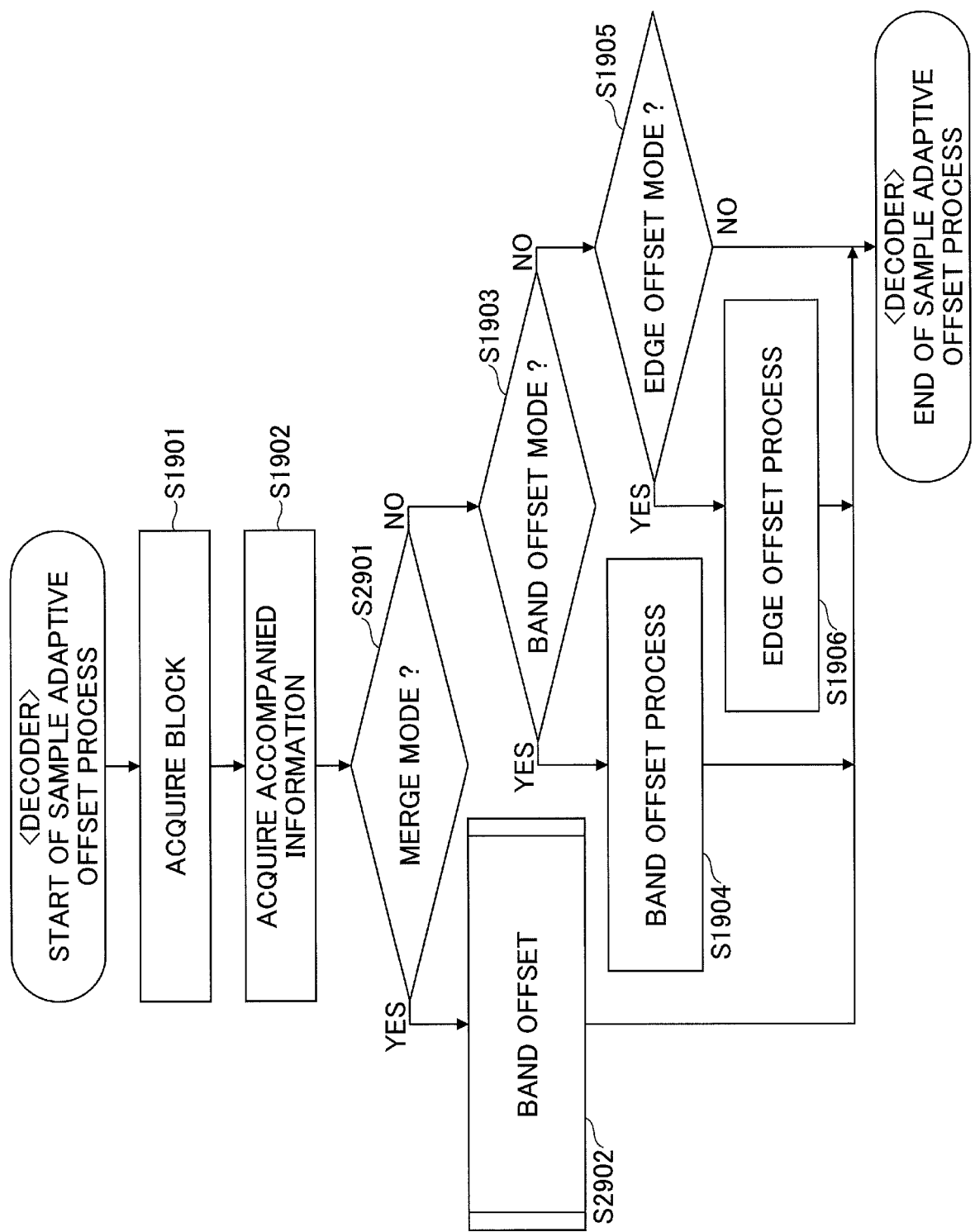
FIG. 29 is a flowchart for explaining a flow of the sample adaptive offset process including the merge mode by the general decoder.

FIG. 29 is a flowchart for explaining a flow of the sample adaptive offset process including the merge mode by the general decoder. Different from the sample adaptive offset process by the general decoder 120g described with reference to FIG. 19, steps S2901 and S2902 are conducted.

In step S2901, the sample adaptive offset filter 1820 determines based on the acquired accompanied information whether the merge mode is applied to the process target block. When the sample adaptive offset filter 1820 determines in step S2901 that the merge mode is applied (in the case of Yes in step S2901), the sample adaptive offset filter 1820 advances to step S2902.

In step S2902, the band offset process part 1822 executes band offset (in the case of the merge mode) process. Details of the band offset process (in a case of the merge mode) will be described below.

<4. Flow of Band Offset Process by Merge Mode in General Decoder>

Next, details of the band offset process (step S2902) in the merge mode in the general decoder 120g will be described.

Figure 30:
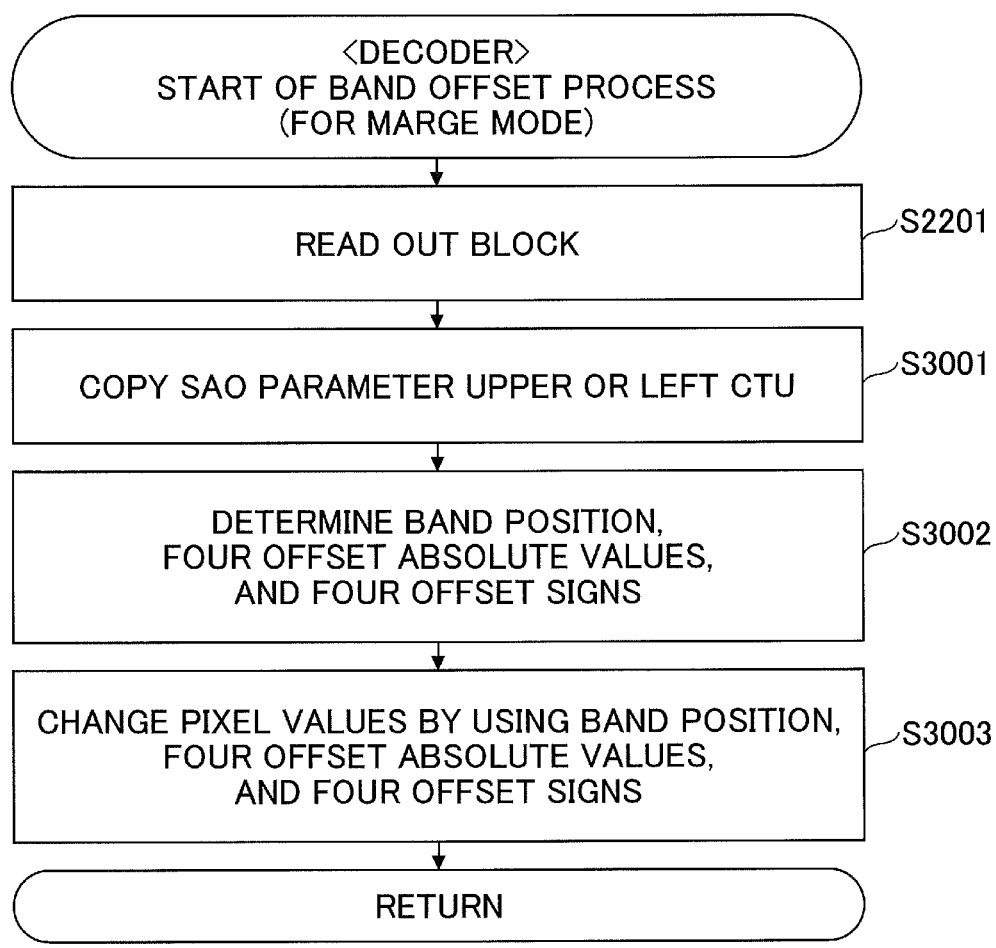
FIG. 30 is a flowchart for explaining details of the band offset process in the merge mode in the general decoder.

FIG. 30 is a flowchart for explaining details of the band offset process in the merge mode in the general decoder 120g.

In step S2201, the block acquisition part 1841 reads a block to be processed.

In step S3001, the SAO parameter acquisition part 1842 acquires SAO parameters related to band offset process of a block of the CTU adjacent to an upper side or a left side.

In step S3002, the SAO parameter acquisition part 1842 determines a band position, four offset absolute values, and four offset signs of a process target block using the acquired SAO parameters related to the band offset process.

In step S3003, the pixel value change part 1843 changes the pixel value of the process target block using the band position, the four offset absolute values, and the four offset signs.

<5. Details of Region Band Offset Process (Step S1101) by Merge Mode in Encoder According to the Third Embodiment>

(1) Process Content of Region Band Offset Process in Merge Mode

Next, details of the region band offset process (step S1101) in the merge mode in the encoder 110 according to the third embodiment will be described.

Figure 31:
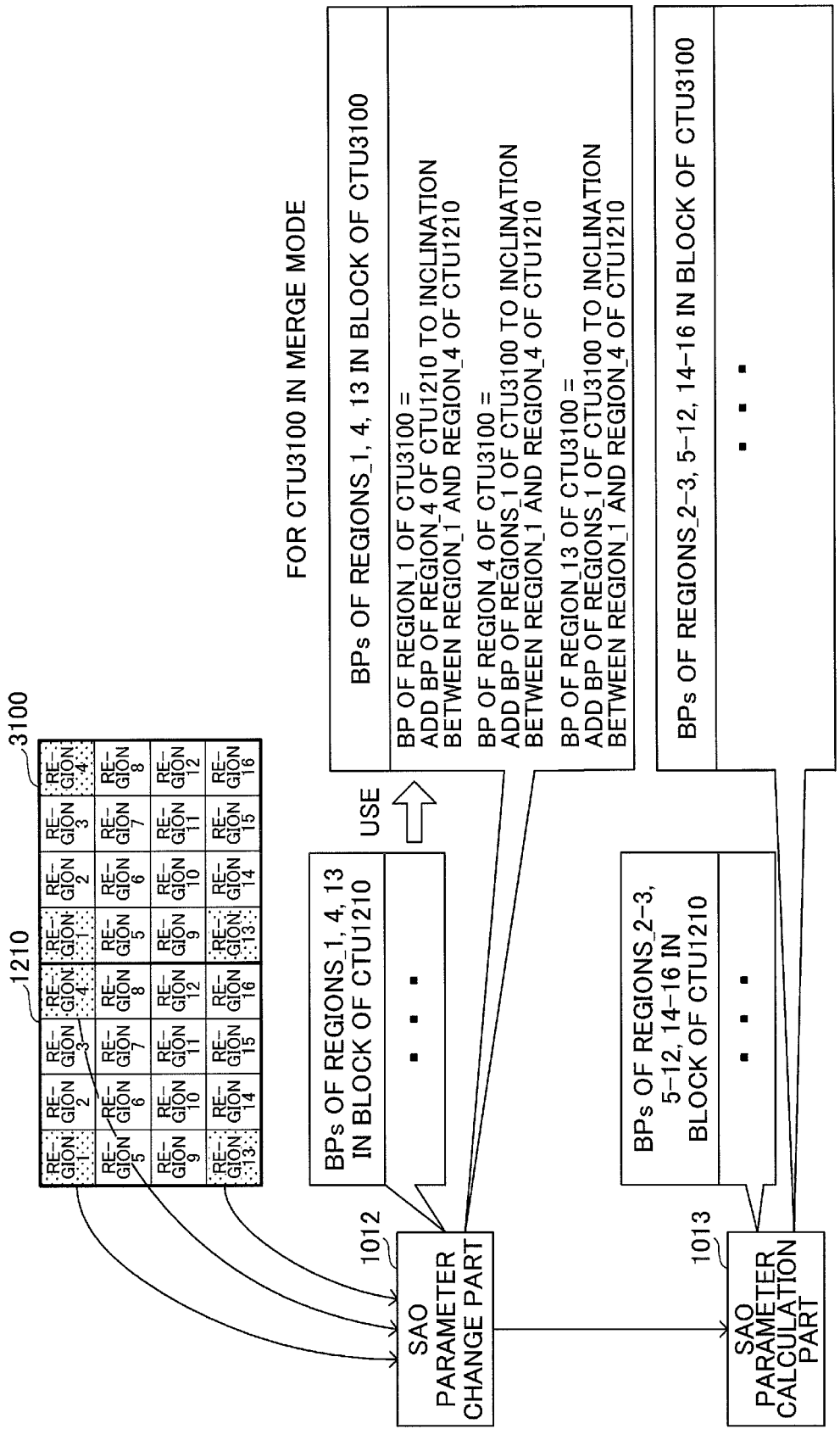
FIG. 31 is a diagram illustrating a calculation method for calculating a band position of each region in the region band offset process in the merge mode in the encoder according to a third embodiment.

FIG. 31 is a diagram illustrating a calculation method for calculating a band position of each region in the region band offset process in the merge mode in the encoder according to the third embodiment.

In the example of FIG. 31, it is assumed that, among two blocks of the CTU (the CTU1210 and a CTU3100), the region band offset process is conducted to the block of the CTU1210, regardless of the merge mode.

In particular, it is assumed that band positions of the region_1, the region_4, and the regions_13 of the block of the CTU1210 are determined by the SAO parameter change part 1012.

band positions of the region_2, the region_3, the region_5 to the region_12, and the region_14 to the region_16 of the block of the CTU1210 are calculated by the SAO parameter calculation part 1013, a process result of the region band offset process using these band positions is determined as a result with the lowest RD cost, and band positions of the region_1, the region_4, and the region_13 are signaled.

In such a state, a case in which the region band offset process is conducted with respect to the CTU3100 in the merge mode will be described. As depicted in FIG. 31, the SAO parameter change part 1012 calculates band positions of the region_1, the region_4, and the region_13 of the block of the CTU3100, based on the region_1, region_4, and region_13 of the block of the CTU1210.

Specifically, the SAO parameter change part 1012 calculates the band position of the region_1 of the block of the CTU3100 by the following procedure:

calculate a difference (an average value) between the band positions based on a slope between a band position of the region_1 and a band position of the region_4 of the block of the CTU1210, and add a band position of the region_4 of the block of the CTU1210 to the calculated slope.

Moreover, the SAO parameter change part 1012 calculates the band position of the region_4 of the block of the CTU3100 by the following procedure:

calculate a difference between the band position of the region_1 and the band position of the region_4 of the block of the CTU1210, and calculate the band position of the region_1 of the block of the CTU3100 to the calculated difference.

Moreover, the SAO parameter change part 1012 calculates the band position of the region_13 of the CTU3100 by the following procedure:

calculate a difference between the band position of the region_1 and the band position of the region_13 of the block of the CTU3100, and add the band position of the region_1 of the block of the CTU3100 to the calculated difference.

Upon calculating the band positions of the region_1, the region_4, and the region_13 of the block of the CTU3100 by the SAO parameter change part 1012, the SAO parameter calculation part 1013 calculates band positions of remaining the region_2 to the region_3, the region_5 to the region_12, and the regions 14 to the region_16. Note that a calculation method of band positions of the region_2 to the region_3, the region_5 to the region_12, and the region_14 to the region_16 is the same as that of the band positions of the region_2 to the region_3, the region_5 to the region_12, and the regions 14 to the region_16, and explanations thereof will be omitted.

(2) Flow of Region Band Offset Process Including Merge Mode

Next, a detailed flowchart of the region band offset process including the merge mode (step S1101) by the encoder 110 according to the third embodiment will be described.

Figure 32:
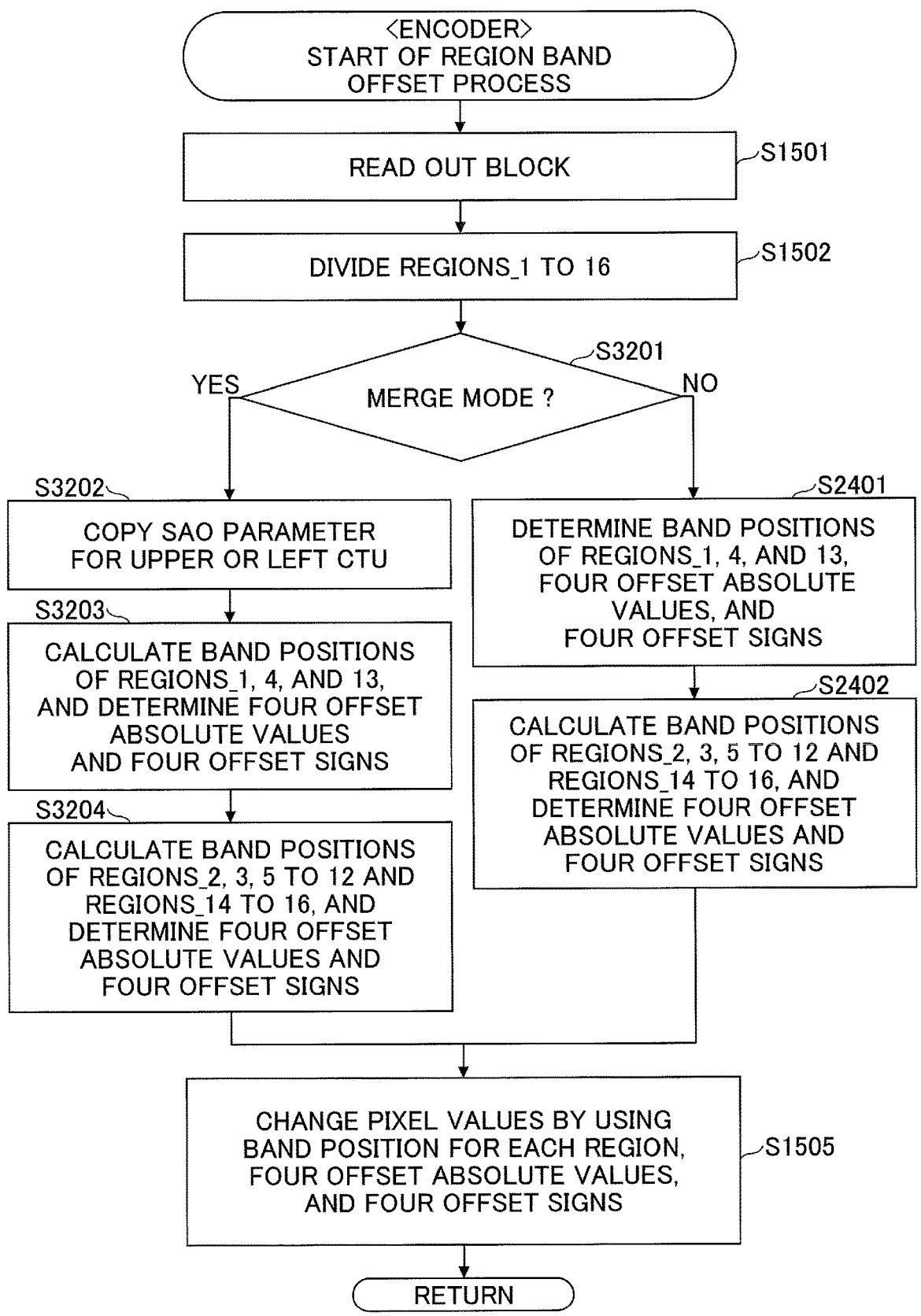
FIG. 32 is a flowchart illustrating a flow of a region band offset process including a merge mode performed by the encoder according to the third embodiment.

FIG. 32 is a flowchart illustrating a flow of a region band offset process including a merge mode performed by the encoder according to the third embodiment. Different from the region band offset process by the encoder 110 according to the second embodiment described with reference to FIG. 24, steps S3201 to S3204 are conducted in the third embodiment.

In step S3201, the SAO parameter change part 1012 determines whether to apply the merge mode to the process target block. The SAO parameter change part 1012 determines in step S3201 that the merge mode is to be applied, the SAO parameter change part 1012 advances to step S3202.

In step S3202, the SAO parameter change part 1012 copies the SAO parameters related to the region band offset process of a neighboring block of the CTU adjacent to an upper side or a neighboring block of the CTU adjacent to a left side.

In step S3203, the SAO parameter change part 1012 acquires the band positions of the region_1, the region_4, and the region_13, which are included in the SAO parameters related to the copied region band offset process. Then, the SAO parameter change part 1012 calculates the band positions of the region_1, the region_4, and the region_13 of the process target block, based on the acquired band positions of the region_1, the region_4, and the region_13.

In step S3204, the SAO parameter calculation part 1013 calculates band positions of a region_1, a region_4, and region_5 through region_12, and region_14 through region_16 of the process target block, based on the calculated band positions of the region_1, the region_4, and the region_13. Moreover, the SAO parameter calculation part 1013 acquires four offset absolute values and four offset signs of region_1 (region_4, or region_13) included in the SAO parameters related to the copied region band offset process. Then, the SAO parameter calculation part 1013 determines the acquired four offset absolute values and the acquired four offset signs of region_1 (region_4, or regions_13) as four offset absolute values and four offset signs for each of the region_1 through the region_16 of the process target block.

Note that in a case of conducting the region band offset process in the merge mode, steps S602 to S607 and steps S1102 to S608 in the adaptive offset process depicted in FIG. 11 are omitted, and a process result of the region band offset process in the merge mode is output.

<6. Details of Signaling Process (Step S1104) Including Merge Mode by Encoder According to the Third Embodiment>

Next, details of the signaling process (step S1104) including the merge mode by the encoder 110 according to the third embodiment will be described. Here, in a case in which the merge mode is not applied, a process for signaling SAO parameters related to the region band offset process is executed.

Figure 33:
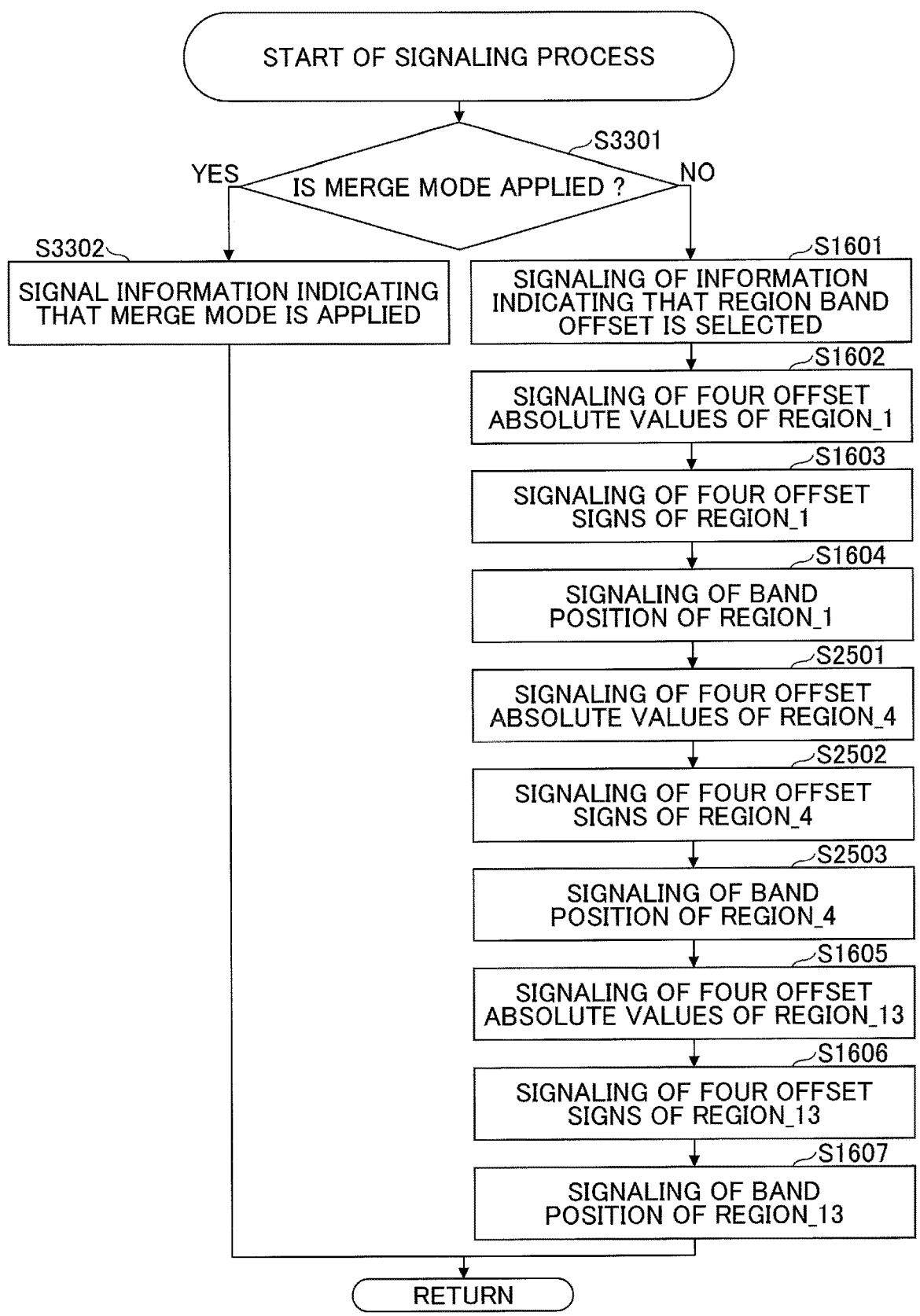
FIG. 33 is a flowchart for explaining a flow of the signaling process including the merge mode by the encoder according to the third embodiment.

FIG. 33 is a flowchart for explaining a flow of the signaling process including the merge mode by the encoder according to the third embodiment.

In step S3301, the selection part 1002 determines whether the merge mode is applied. When determining in step 3301 that the merge mode is applied, the selection part 1002 advances to step S3302.

In step S3302, the selection part 1002 signals information indicating that the merge mode is applied.

<7. Flow of Sample Adaptive Offset Process Including Merge Mode by Sample Adaptive Offset Filter of Decoder According to the Third Embodiment>

Next, a flow of the sample adaptive offset process including the merge mode by the sample adaptive offset filter 1820 of the decoder 120 according to the third embodiment will be described.

Figure 34:
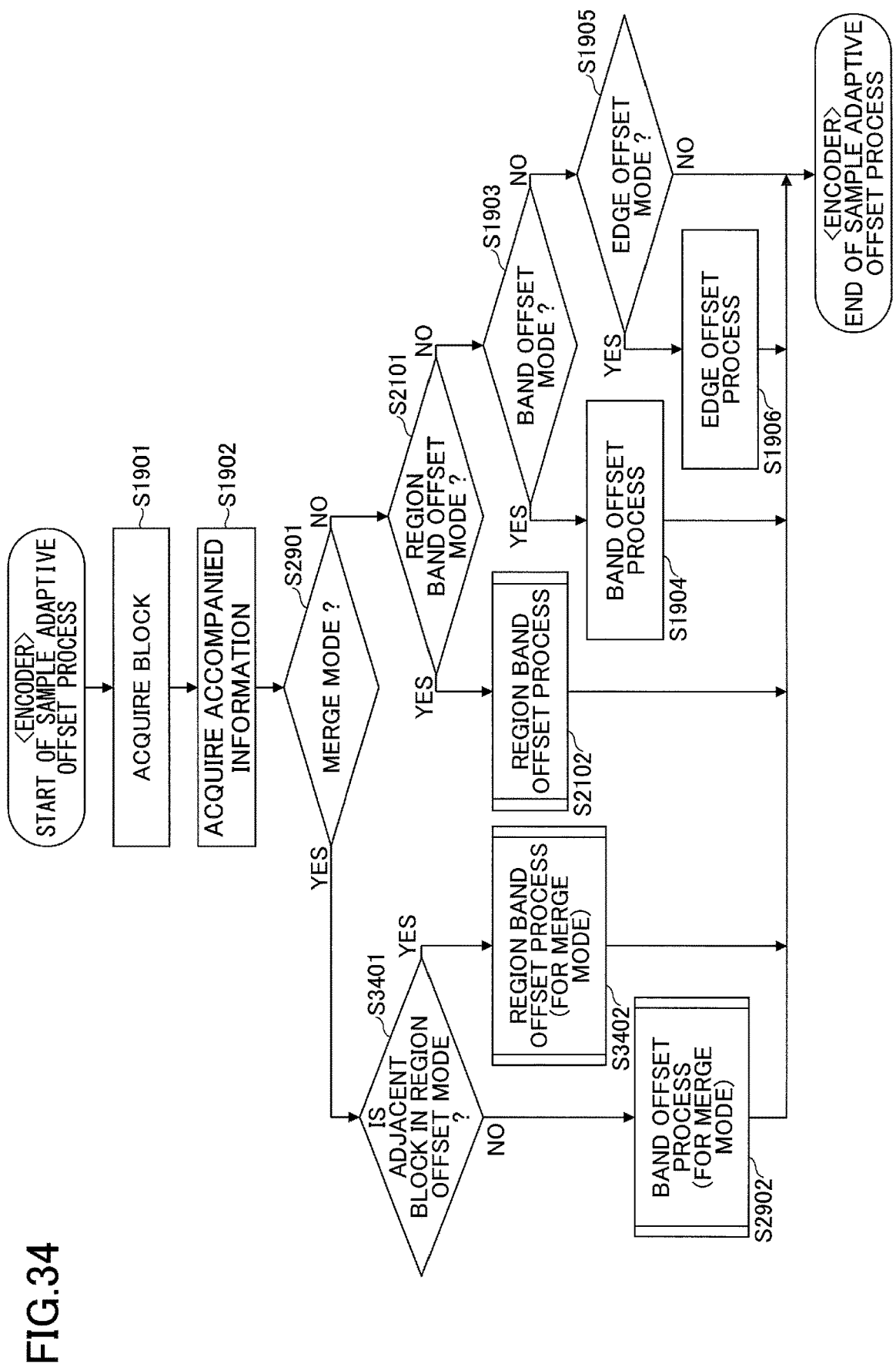
FIG. 34 is a flowchart illustrating a flow of the sample adaptive offset process including the merge mode performed by the decoder according to the third embodiment.

FIG. 34 is a flowchart illustrating a flow of the sample adaptive offset process including the merge mode performed by the decoder according to the third embodiment. Note that the same steps as those in the sample adaptive offset process including the merge mode (FIG. 21) by the decoder 120, which are described in the first embodiment, and the sample adaptive offset process (FIG. 29) performed by the general decoder 120g, are denoted by the same reference numerals, and explanations thereof will be omitted.

Different from flowcharts illustrated in FIG. 21 and FIG. 29, steps S3401 and S3402 are conducted. In step S3401, the sample adaptive offset filter 1820 determines based on the acquired accompanied information whether the offset mode of the block of the CTU adjacent to an upper side or a left side is the region band offset mode. When determining in step S3401 that the offset mode is the region band offset mode (Yes in step S3401), the sample adaptive offset filter 1820 advances to step S3402.

In step S3402, the region band offset process part 2001 performs the region band offset process in the merge mode with respect to the process target block. Details of the region band offset process in the merge mode will be described below.

<8. Details of Region Band Offset Process in Merge Mode (Step S3402) in Decoder According to Third Embodiment>

Figure 35:
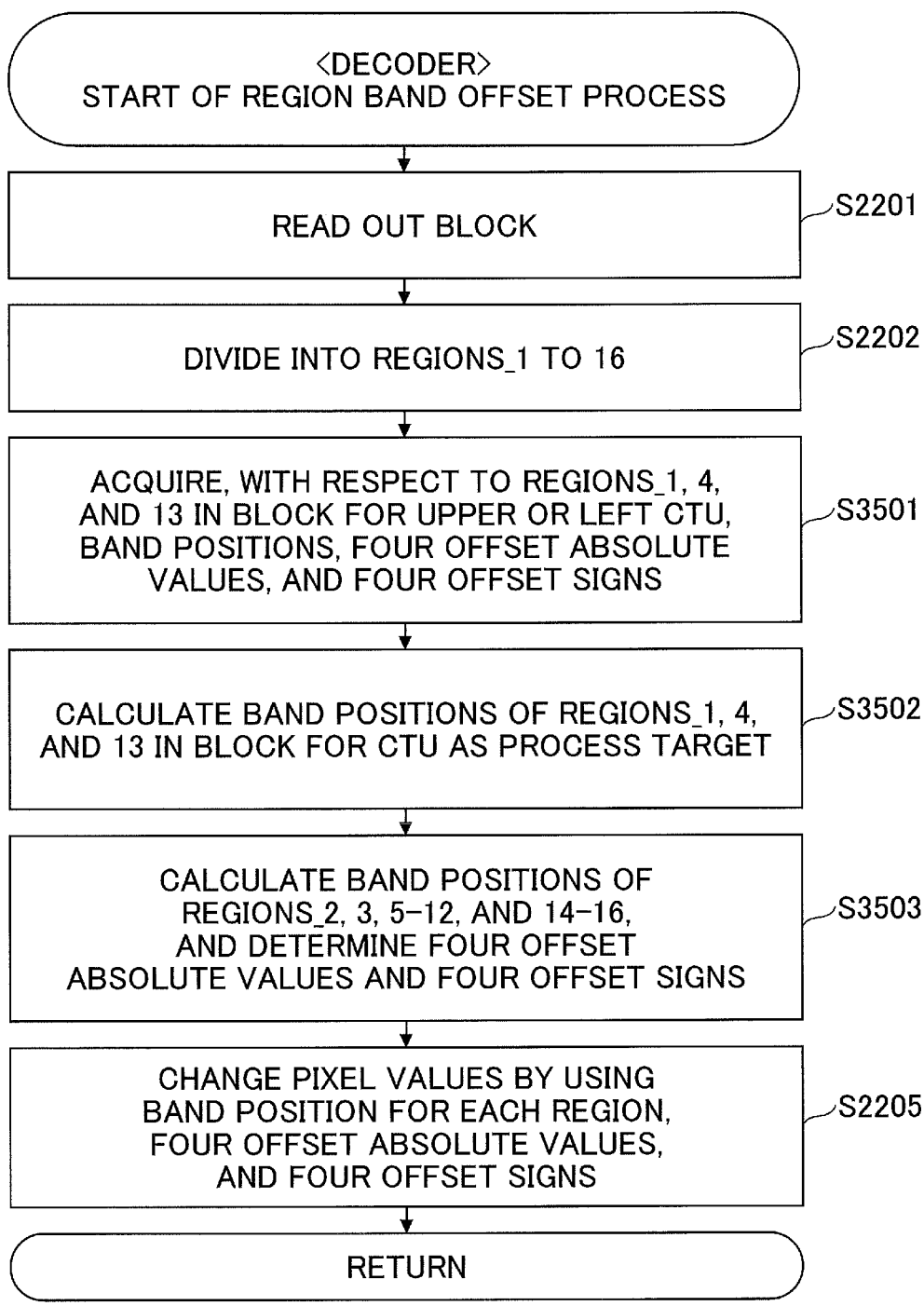
FIG. 35 is a flowchart for explaining a flow of the region band offset process in the merge mode in the decoder according to the third embodiment.

FIG. 35 is a flowchart for explaining a flow of the region band offset process in the merge mode in the decoder according to the third embodiment. Different from the region band offset process described with reference to FIG. 22, steps S3501 to S3503 are conducted.

In step S3501, the SAO parameter acquisition part 1842 acquires SAO parameters related to the region band offset process included in accompanied information concerning a block of the CTU adjacent on an upper side or a left side. Specifically, the SAO parameter acquisition part 1842 acquires band positions, four offset absolute values, the four offset signs for each of the region_1, the region_4, and the regions_13 of the neighboring block of the CTU.

In step S3502, the SAO parameter calculation part 2012 calculates band positions of the region_1, the region_4, and the region_13 of the process target block, based on the band positions of the region_1, the region_4, and the region_13 of the neighboring block of the CTU.

In step S3503, the SAO parameter calculation part 2012 calculates band positions of the region_2, the region_3, the region_5 to the region_12, and the region_14 to the region_16 of the process target block, based on the band positions of the region_1, the region_4, and the region_13 of the process target block. Moreover, the SAO parameter calculation part 2012 determines four offset absolute values and four offset signs of the region_1 (or the region_4 or the region_13) as four offset absolute values and four offset signs for each of the region_1 through the region_16 of the process target block.

By the above described manner, the pixel value change part 1843 changes pixel values for each of the region_1 through the region_16 of the process target block, by using the calculated or determined band position, four offset absolute values, four offset signs for each of the region_1 through the region_16.

<9. Summary>

As is clear from the above description, it is possible to apply the region band offset process in the merge mode in addition to the above-described second embodiment to the sample adaptive offset filter 520 of the encoder 110 according to the third embodiment. In a case of applying the merge mode, the sample adaptive offset filter 520 conducts a sample adaptive offset process in accordance with the following procedure:

divide a process target block into 16 regions, and calculate band positions of three regions (a region at an upper left corner, a region at an upper right corner, and a region at a lower left corner), based on the acquired band positions of the three regions, calculate band positions of remaining regions by conducting an interpolation process using the calculated band positions of the three regions, conduct the band offset process (region band offset process) for each of 16 regions by using the calculated band position for each of 16 regions, and signal information indicating that the region band offset process in the merge mode is conducted, and send the information as accompanied information to the decoder 120.

Moreover, it is possible to apply the region band offset process in the merge mode in addition to the above-described second embodiment to the sample adaptive offset filter 1820 of the decoder 120. In a case of applying the merge mode, the sample adaptive offset filter 1820 conducts a sample adaptive offset process in accordance with the following procedure:

acquire band positions of three regions (the region at the upper left corner, the region at the upper right corner, and the region at the lower left corner) of a neighboring block adjacent to the process target block, upon determining that the region band offset process in the merge mode is applied, divide a process target block into 16 regions, and calculate band positions of the three regions (the region at the upper left corner, the region at the upper right corner, and the region at the lower left corner) of the process target block, based on the acquired band positions of the three regions of the neighboring block, calculate band positions of remaining regions by using calculated band positions of the three regions, and conducting the band offset process (region band offset process) with respect to each of 16 regions by using calculated band positions for each of 16 regions.

As described above, the encoder 110 according to the third embodiment signals information indicating that the region band offset process in the merge mode has been performed, instead of signaling the band positions of the three regions. As a result, according to the encoder according to the third embodiment, even in a case in which the band offset process is performed on a region basis, it is possible to reduce an increase in an amount of the accompanied information.

Other Embodiments

In the above-described first embodiment and second embodiment, the four offset absolute values and four offset signs among the SAO parameters related to the region band offset process are signaled for the region_1 and the region_13 (or the region_1, the region_4, and the region_13) alone. However, SAO parameters related the region band offset process to be signaled are not limited to this parameter combination.

For example, for each of the region_1 to the region_16, a different value may be applied among four offset absolute values and among four offset signs. In this case, for each of the region_1 to the region_16, four offset absolute values and four offset signs may be signaled.

In this case, in the decoder 120, by using signaled four offset absolute values and four offset signs for each of the region_1 to the region_16, the region band offset process may be conducted.

Alternatively, a single value (the same value among the four offset absolute values) and another single value (the same code among the four offset signs) may be used. In this case, only for the region_1, the four offset absolute values and the four offset signs are signaled.

In this case, in the decoder 120, the region band offset process is conducted with respect to the region_1 through the region_16 by using the signaled four offset absolute values and the signaled four offset signs.

Moreover, in the first embodiment and the second embodiment, four offset absolute values and four offset signs are signaled as SAO parameters related to the region band offset process. However, the SAO parameters related to the region band offset process as signaling targets are not limited to these values and sings. For example, instead of signaling the four offset absolute values and the four offset sings, one offset absolute value and one offset sign alone may be signaled. However, in this case, the selecting part 1002 specifies a maximum band position and a minimum band position among band positions of regions determined in a process target block. Then, selecting part 1002 signals one offset absolute value and one offset sign for each of bands included between the specified maximum band position and specified minimum band position.

In this case, the decoder 120 refers to the signaled offset absolute value and the signaled offset sign of each of the bands, and extracts the offset absolute value and the offset sign of the band corresponding to the band position of each region. Therefore, it is possible for the decoder 120 to determine the offset absolute value and the offset sign for each region.

Moreover, in the first embodiment and the second embodiment, the region band offset process part 1001 is provided separately from the band offset process part 522. Alternatively, for example, the region band offset process part 1001 may be provided, instead of the band offset process part 522.

In this case, for example, the region band offset process part 1001 may switch to one mode for dividing a process target block into 16 regions and conducting the band offset process for each of regions or to another mode for conducting the band offset process without dividing the process target block into the 16 regions. That is, in accordance with a division number for dividing a process target block into regions, a mode is switched between the one mode for conducting the band offset process and the another mode for conducting the region band offset process.

Note, in the sample adaptive offset filter 520, both the band offset process and the region band offset process may not be always conducted. Either one of the processes may be conducted. Neither of the processes may be conducted.

According to the first embodiment, the second embodiment, and the third embodiment, it is possible to improve effect of image quality improvement in the band offset.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A coding method by a computer, the coding method comprising:
    dividing a block of a coding unit into a plurality of sub-blocks;
    determining band positions of at least two first sub-blocks among the plurality of sub-blocks; and
    calculating, among the plurality of sub-blocks, band positions of second sub-blocks other than the at least two first sub-blocks based on a positional relationship of the second sub-blocks with respect to the at least two first sub-blocks and the determined band positions for the at least two first sub-blocks in the block of the coding unit,
    wherein a band offset is conducted for each of the sub-blocks by using the band positions determined or calculated for the at least two first sub-blocks and the second sub-blocks.

2. The coding method as claimed in claim 1, wherein the at least two first sub-blocks are two sub-blocks or three sub-blocks,
    in four vertices of the block of the coding unit, among the plurality of sub-blocks, the two sub-blocks correspond to a sub-block including an upper left vertex and a sub-block including a lower left vertex, and the three sub-blocks correspond to a sub-block including the upper left vertex, and a sub-block including an upper right vertex, a sub-block including a lower left vertex.

3. The coding method as claimed in claim 2, wherein in the calculating of the band positions, the computer calculates a band position of each second sub-block located between two first sub-blocks in the at least two first sub-blocks by conducting an interpolation process using band positions of the two first sub-blocks.

4. The coding method as claimed in claim 3, wherein in the determining of the band positions, for a case in which a process target block of the coding unit is in a merge mode, the computer
    acquires the band positions of the at least two first sub-blocks used when the band offset is conducted for each sub-block with respect to a neighboring block of the coding unit adjacent to the process target block of the coding unit, and
    calculates the band positions of at least two first sub-blocks in the process target block of the coding unit, based on the acquired band positions of the at least two first sub-blocks in the neighboring block.

5. The coding method as claimed in claim 4, wherein in the determining of the band positions, in a case in which the process target block of the coding unit is in the merge mode, the computer
    calculates an average value of differences among neighboring sub-blocks adjacent to each other between two first-blocks based on a difference between band positions of the two first sub-blocks, which are acquired from the neighboring block of the coding unit adjacent to the process target block of the coding unit, and
    calculates the band positions of the at least two first sub-blocks in the process target block of the coding unit, based on the calculated average value and the acquired band positions of the two first sub-blocks.

6. The coding method as claimed in claim 1, further comprising signaling sample adaptive offset parameters, which are to be used to perform a sample adaptive offset process with respect to the block of the coding unit and in which the determined band positions of the at least two first sub-blocks are included.

7. The coding method as claimed in claim 6, wherein upon conducting the band offset for each sub-block by using a single offset value for the at least two first sub-blocks the second sub-blocks in the plurality of sub-blocks, in the signaling, the computer includes the single offset value in the sample adaptive offset parameters and signals the sample adaptive offset parameters.

8. The coding method as claimed in claim 6, wherein upon conducting the band offset for each sub-block by using first different offset values respectively for the at least two first sub-blocks and second different offset values respectively for the second sub-blocks among the plurality of sub-blocks, in the signaling, the computer includes the first different offset values respectively for the at least two first sub-blocks and the second different offset values respectively for the second sub-blocks in the sample adaptive offset parameters and signals the sample adaptive offset parameters.

9. A decoding method by a computer, the decoding method comprising:
dividing a block of a decoding unit into a plurality of sub-blocks;
acquiring band positions of at least two first sub-blocks from among the plurality of sub-blocks; and
calculating, among the plurality of sub-blocks, band positions of second sub-blocks other than the at least two first sub-blocks based on a positional relationship of the second sub-blocks with respect to the at least two first sub-blocks and the acquired band positions of the at least two first sub-blocks in the block of the decoding unit,
wherein a band offset is conducted for each sub-block by using the acquired or calculated band positions respectively for the at least two first sub-blocks and the second sub-blocks.

10. The decoding method as claimed in claim 9, wherein the at least two first sub-blocks are two sub-blocks or three sub-blocks,
in four vertices of the block of the decoding unit, among the plurality of sub-blocks, the two sub-blocks correspond to a sub-block including an upper left vertex and a sub-block including a lower left vertex, and the three sub-blocks correspond to a sub-block including the upper left vertex, and a sub-block including an upper right vertex, and a sub-block including a lower left vertex.

11. The decoding method as claimed in claim 10, wherein in the calculating of the band position, the computer calculates a band position of a second sub-block located between two of the at least two first sub-blocks by conducting an interpolation process using band positions of the two of the at least two first sub-blocks.

12. The decoding method as claimed in claim 10, wherein in the acquiring of the band positions, in a case in which a process target block of the decoding unit is a merge mode, the computer
acquires the band positions of the at least two first sub-blocks used when the band offset is conducted for each sub-block with respect to a neighboring block of the decoding unit adjacent to the process target block of the decoding unit, and
calculates band positions of at least two first sub-blocks in the process target block of the decoding unit, based on the acquired band positions of the at least two first sub-blocks used for the neighboring block of the decoding unit.

13. The decoding method as claimed in claim 12, wherein in the acquiring of the band positions, in a case in which the process target block of the decoding unit is in a merge mode, the computer
calculates an average value of differences of band positions among neighboring sub-blocks adjacent to each other between two first-blocks used for the neighboring block of the decoding unit, based on a difference between band positions of the two first sub-blocks used for the neighboring block of the decoding unit adjacent to the process target block of the decoding unit, and
calculates band positions of at least two first sub-blocks in the process target block of the decoding unit based on the calculated average value and band positions of the two first sub-blocks used for the neighboring block of the decoding block.

14. The decoding method as claimed in claim 9, wherein the computer conducts a band offset for each sub-block by using a single offset value for the at least two first sub-blocks and the second sub-blocks among the plurality of sub-blocks.

15. The decoding method as claimed in claim 9, wherein the computer conducts a band offset for each sub-block by using first different offset values respectively corresponding to the at least two first sub-blocks and second different offset values respectively corresponding to the second sub-blocks, among the plurality of sub-blocks.

16. A coding device, comprising:
a memory; and
a processor coupled to the memory and configured to perform a process including
dividing a block of a coding unit into a plurality of sub-blocks;
determining band positions of at least two first sub-blocks among the plurality of sub-blocks; and
calculating, among the plurality of sub-blocks, band positions of second sub-blocks other than the at least two first sub-blocks based on a positional relationship of the second sub-blocks with respect to the at least two first sub-blocks and the determined band positions for the at least two first sub-blocks in the block of the coding unit,
wherein a band offset is conducted for each of the sub-blocks by using the band positions determined or calculated for the at least two first sub-blocks and the second sub-blocks.

* * * * *